United States Patent [19]
Kuroda et al.

[11] Patent Number: 5,859,778
[45] Date of Patent: Jan. 12, 1999

[54] REMOTE MANAGEMENT SYSTEM

[75] Inventors: Kiyomitsu Kuroda, Otsu; Ichiro Fukuoka, Kusatsu, both of Japan

[73] Assignee: Sanyo Electric Co. Ltd., Osaka, Japan

[21] Appl. No.: 862,863

[22] Filed: May 23, 1997

Related U.S. Application Data

[63] Continuation of Ser. No. 396,429, Feb. 28, 1995, abandoned.

[30] Foreign Application Priority Data

| Feb. 28, 1994 | [JP] | Japan | 6-055049 |
| Feb. 28, 1994 | [JP] | Japan | 6-055050 |
| Mar. 17, 1994 | [JP] | Japan | 6-047514 |

[51] Int. Cl.$^6$ ........................................ G06F 19/00
[52] U.S. Cl. ............... 364/474.11; 364/146; 364/479.11
[58] Field of Search ............... 364/474.11, 132, 364/138, 140, 146, 147, 479

[56] References Cited

U.S. PATENT DOCUMENTS

| 4,369,442 | 1/1983 | Werth ................................. 364/479 X |
| 4,412,292 | 10/1983 | Sedam et al. ........................... 364/479 |
| 4,670,834 | 6/1987 | Byal et al. . |
| 4,766,548 | 8/1988 | Cedrone et al. ........................ 364/479 |
| 5,345,379 | 9/1994 | Brous et al. ............................ 364/146 |
| 5,424,940 | 6/1995 | Ousborne .............................. 364/140 |

FOREIGN PATENT DOCUMENTS

| 0221618 A1 | 5/1987 | European Pat. Off. . |
| 0429056 | 5/1991 | European Pat. Off. . |
| 0631921 | 1/1995 | European Pat. Off. . |
| 29 28 463 C2 | 2/1981 | Germany . |
| 40 04 097 A1 | 8/1991 | Germany . |
| 42 21 841 A1 | 1/1993 | Germany . |
| 6-36118 | 2/1994 | Japan . |
| 6-205900 | 7/1994 | Japan . |
| 1477241 | 6/1977 | United Kingdom . |
| 2132382 A | 7/1984 | United Kingdom . |
| 2217478 | 10/1989 | United Kingdom . |
| 2225130 A | 5/1990 | United Kingdom . |
| 2226428 | 6/1990 | United Kingdom . |
| 2239325 A | 6/1991 | United Kingdom . |
| 2258743 A | 2/1993 | United Kingdom . |
| 2276954 | 10/1994 | United Kingdom . |

OTHER PUBLICATIONS

DNC –"Entwicklung, Konzepte, Funktionen, Tendenzen" (VDI–Z 131 (Sep. 1989), No. 9, pp. 37 to 43.

*Primary Examiner*—Reba I. Elmore
*Assistant Examiner*—Sheela S. Rao
*Attorney, Agent, or Firm*—Darby & Darby

[57] ABSTRACT

A remote management system wherein a central control apparatus is connected with machines installed in a shop by communication means, so that set values of the operating conditions of each machine set in a microcomputer within the machine can be changed from the central control apparatus and, resetting of the microcomputer and restarting of the machine can be directed from the central control apparatus, thereby eliminating the need for dispatching personnel to the shop and reducing the management cost, while in case of a trouble in the machine, information indicating the occurrence of the trouble and information specifying the location of the trouble are transmitted to the central control apparatus thereby to shorten the time required for restarting the machine by the personnel and improve the management efficiency, and further featuring a controller which periodically collects information related to the operation of the machine from the microcomputer and stores the information in a memory thereof while erasing the collected data already stored in the memory of the microcomputer, thereby allowing a small memory capacity for the microcomputer and suppressing the machine cost.

22 Claims, 68 Drawing Sheets

[1st BYTE]:

```
7 6 5 4 3 2 1 0
0 0 1 1
```
(LOWER 4 BITS: TENS DIGIT OF MACHINE #)

[2nd BYTE]:

```
7 6 5 4 3 2 1 0
0 0 1 1
```
(LOWER 4 BITS: UNITS DIGIT OF MACHINE #)

[3rd BYTE]:

```
7 6 5 4 3 2 1 0
0 0 1 1 0
```
(LOWER 4 BITS: BCD0 OF LOWER MACHINE TROUBLE #)

[4th BYTE]:

```
7 6 5 4 3 2 1 0
0 0 1 1 0
```
(LOWER 4 BITS: BCD1 OF LOWER MACHINE TROUBLE #)

[7th BYTE]:

```
7 6 5 4 3 2 1 0
0 0 1 1 0
```
(LOWER 4 BITS: BCD0 OF UPPER MACHINE TROUBLE #)

[8th BYTE]:

```
7 6 5 4 3 2 1 0
0 0 1 1 0
```
(LOWER 4 BITS: BCD1 OF UPPER MACHINE TROUBLE #)

[5th, 6th BYTES], [9th, 10th BYTES]: (VACANT FRAME ··· SPARE)

| Byte | 7 6 5 4 3 2 1 0 | Description |
|---|---|---|
| [1st BYTE]: | 0 0 1 1 | (LOWER 4 BITS: TENS DIGIT OF MACHINE #) |
| [2nd BYTE]: | 0 0 1 1 | (LOWER 4 BITS: UNITS DIGIT OF MACHINE #) |
| [3rd BYTE]: | 0 0 1 1 | (LOWER 4 BITS: LOWER MACHINE COIN BCD0) |
| [4th BYTE]: | 0 0 1 1 | (LOWER 4 BITS: LOWER MACHINE COIN BCD1) |
| [5th BYTE]: | 0 0 1 1 | (LOWER 4 BITS: LOWER MACHINE COIN BCD2) |
| [6th BYTE]: | 0 0 1 1 | (LOWER 4 BITS: LOWER MACHINE COIN BCD3) |
| [7th BYTE]: | 0 0 1 1 | (LOWER 4 BITS: LOWER MACHINE STANDARD CARD BCD0) |
| [8th BYTE]: | 0 0 1 1 | (LOWER 4 BITS: LOWER MACHINE STANDARD CARD BCD1) |
| [9th BYTE]: | 0 0 1 1 | (LOWER 4 BITS: LOWER MACHINE STANDARD CARD BCD2) |
| [10th BYTE]: | 0 0 1 1 | (LOWER 4 BITS: LOWER MACHINE STANDARD CARD BCD3) |
| [11th BYTE]: | 0 0 1 1 | (LOWER 4 BITS: LOWER MACHINE MEMBER'S CARD BCD0) |
| [12th BYTE]: | 0 0 1 1 | (LOWER 4 BITS: LOWER MACHINE MEMBER'S CARD BCD1) |
| [13th BYTE]: | 0 0 1 1 | (LOWER 4 BITS: LOWER MACHINE MEMBER'S CARD BCD2) |
| [14th BYTE]: | 0 0 1 1 | (LOWER 4 BITS: LOWER MACHINE MEMBER'S CARD BCD3) |
| [15th BYTE]: | 0 0 1 1 | (LOWER 4 BITS: LOWER MACHINE MONITOR CARD BCD0) |
| [16th BYTE]: | 0 0 1 1 | (LOWER 4 BITS: LOWER MACHINE MONITOR CARD BCD1) |
| [17th BYTE]: | 0 0 1 1 | (LOWER 4 BITS: LOWER MACHINE MONITOR CARD BCD2) |
| [18th BYTE]: | 0 0 1 1 | (LOWER 4 BITS: LOWER MACHINE MONITOR CARD BCD3) |
| [19th BYTE]~[34th BYTE]: | | (DATA ON UPPER DRYER: FRAME STRUCTURES ARE EQUAL TO THOSE IN 3rd ~ 18th BYTES) |

FIG. 46

COIN-OPERATED MACHINE REMOTE MONITORING SYSTEM 1994-1-25 (TUE)
9:01:29

⟨SHOP SELECTION⟩

| 1 | OHTSU No. 1 |
| 2 | OHTSU No. 2 |
| 3 | OHTSU No. 3 |
| 4 | OHTSU No. 4 |
| 5 | OHTSU No. 5 |

SELECT MONITORING SHOP NUMBER

| 1 | 2 | 3 | 4 | 5 |

QUIT

FIG. 47

| COIN-OPERATED MACHINE REMOTE MONITORING SYSTEM |
|---|

⟨ MENU SELECTION ⟩ ... OHTSU No.1(001)

| 1 | SALES AMOUNT |
|---|---|
| 2 | OPERATIONAL CONDITIONS |
| 3 | MACHINE SET VALUE |
| 4 | UPDATE MACHINE SET VALUE (DIP-SW SETTING) |
| 5 | TROUBLE SHOOTINGN BY I/O PORT DATA |

SELECT MONITORING ITEM NUMBER

☐1 ☐2 ☐3 ☐4 ☐5

☐ QUIT

FIG. 48

COIN-OPERATED MACHINE REMOTE MONITORING SYSTEM

⟨ OPERATION MONITORING ⟩ ... OHTSU No.1(001)

| | OPERATIONAL CONDITIONS | OPERATION REMAINING TIME | TROUBLE | TROUBLE No. |
|---|---|---|---|---|
| DRYER 1 | UNDER OPERATION | 35 Min. | NO | — |
| DRYER 2 | STOP | — | NO | — |
| DRYER 3 | STOP | — | YES | E1 |
| DRYER 4 | UNDER OPERATION | 59 Min. | YES | E3 |
| DRYER 5 | UNDER OPERATION | 21 Min. | NO | — |
| ... | ... | ... | ... | ... |

VIEW TROUBLE DETAILS   CANCEL TROUBLE   RETURN TO MENU   QUIT

FIG. 49

COIN-OPERATED MACHINE REMOTE MONITORING SYSTEM

... OHTSU No. 1 (001)

〈 SALES MONITORING 〉

| | SALES |
|---|---|
| DRYER 1 | ¥2481900 |
| DRYER 2 | ¥1697200 |
| ... | ... |

VIEW DETAILS    RETURN TO MENU    QUIT

FIG. 50

| | SALES |
|---|---|
| DRYER 1 | ¥2481900 |
| DRYER 2 | ¥1697200 |
| ... | ... |

COIN-OPERATED MACHINE REMOTE MONITORING SYSTEM

⟨ SALES MONITORING ⟩

...OHTSU No.1(001)

⟨DRYER⟩   SCD 6070GC

| | COIN | STANDARD CARD | MEMBER'S CARD | MONITOR CARD |
|---|---|---|---|---|
| UPPER | 133 | 5927 | 4222 | 1232 |
| LOWER | 8624 | 2724 | 341 | 1616 |

VIEW DETAILS    RETURN TO MENU    QUIT

FIG. 51

| COIN-OPERATED MACHINE REMOTE MONITORING SYSTEM | | | | | | | |
|---|---|---|---|---|---|---|---|
| 〈 SET VALUE MONITORING 〉 | | | | …OHTSU No. 1(001) | | | |
| | DRYER 1 | DRYER 2 | | | | | |
| OPERATION MODE | MANUAL | MANUAL | — | — | — | — | — |
| OPERATION TIME | 10 Min | 10 Min | — | — | — | — | — |
| BASIC RATE | ¥ 100 | ¥ 100 | — | — | — | — | — |
| COIN PORT | ¥100&¥50 | ¥100&¥50 | — | — | — | — | — |
| UPPER/LOWER | UPPER & LOWER | UPPER & LOWER | | | | | |
| ROTATIONAL SPEED FINE ADJUSTMENT | ±0 revs | ±3 revs | | | | | |

RETURN TO MENU    QUIT

FIG. 52

<DRYER 3>

TROUBLE IS CANCELLED

```
[1st BYTE]:  7 6 5 4 3 2 1 0
             ☐☐☐☐|0|0|1|1|    (LOWER 4 BITS: TENS DIGIT OF MACHINE #)

[2nd BYTE]:  7 6 5 4 3 2 1 0
             ☐☐☐☐|0|0|1|1|    (LOWER 4 BITS: UNITS DIGIT OF MACHINE #)

[3rd BYTE]:  7 6 5 4 3 2 1 0
             ☐☐☐☐|0|0|1|1|    (LOWER 4 BITS: BITS 0~3 OF LOWER MACHINE I/O PORTS)

[4th BYTE]:  ☐☐☐☐|0|0|1|1|    (LOWER 4 BITS: BITS 4~7 OF LOWER MACHINE I/O PORTS)

[5th BYTE]:  ☐☐☐☐|0|0|1|1|    (LOWER 4 BITS: BITS 8~11 OF LOWER MACHINE I/O PORTS)

[6th BYTE]:  ☐☐☐☐|0|0|1|1|    (LOWER 4 BITS: BITS 12~15 OF LOWER MACHINE I/O PORTS)

[7th BYTE]:  ☐☐☐☐|0|0|1|1|    (LOWER 4 BITS: BITS 16~19 OF LOWER MACHINE I/O PORTS)

[8th BYTE]:  ☐☐☐☐|0|0|1|1|    (LOWER 4 BITS: BITS 20~23 OF LOWER MACHINE I/O PORTS)

[9th BYTE]~[14th BYTE]: (DATA ON UPPER DRYER : FRAME STRUCTURES ARE EQUAL TO
                         THOSE IN 3rd~8th BYTES)
```

| COIN-OPERATED MACHINE REMOTE MONITORING SYSTEM |

⟨ TROUBLE SHOOTING BY I/O PORTS ⟩ ... OHTSU No.1(001)
(DRYER 3)

| OUTPUT PORT LEVEL | 1 0 1 1 1 0 1 0 1 0 1 0 1 0 1 1 1 0 1 |
| INPUT PORT LEVEL | 1 0 1 1 0 1 1 1 0 1 0 1 0 1 1 1 1 1 0 0 |

DIAGNOSTIC REPORT

MONITORED SIGNAL (INPUT LEVEL) INDICATES STOP OF ROTATION (0) AGAINST DRUM ROTATION INSTRUCTION (DRIVE OUTPUT ; 1) ... CONFIRM DRUM MOTOR, DRIVE SYSTEM & SENSE CIRCUIT OF MONITORED SIGNAL

| FORWARD PAGE | | QUIT |

FIG. 59

〈 COIN-OPERATED MACHINE REMOTE MONITORING SYSTEM 〉 ... OHTSU No. 1

〈 MACHINE SET VALUE UPDATING 〉

SELECT SETTING METHOD NUMBER

| 1 | INDIVIDUAL SETTING |
| 2 | COLLECTIVE SETTING BY MACHINE TYPE (COLLECTIVE SETTING ON SAME TYPE MACHINES) |
| 3 | CLOTHES-WASHER 1 (COLLECTIVE SETTING ON MACHINES WITH SAME VALUE SET BY DIP-SW) |

[1] [2] [3]

[QUIT]

FIG. 60

| | COIN-OPERATED MACHINE REMOTE MONITORING SYSTEM |
|---|---|

⟨ MACHINE SET VALUE UPDATING ⟩ ... OHTSU No.1

[ INDIVIDUAL SETTING ]

| 1 | CLOTHES-WASHER | 1 |
|---|---|---|
| 2 | CLOTHES-WASHER | 2 |
| 3 | DRYER | 1 |
| 4 | DRYER | 2 |
| 5 | DRYER | 3 |

SELECT SETTING MACHINE NUMBER

| 1 | | 2 | | 3 | | 4 | | 5 |

| QUIT |

F I G. 62

COIN-OPERATED MACHINE REMOTE MONITORING SYSTEM

《MACHINE SET VALUE UPDATING》

[COLLECTIVE SETTING BY MACHINE TYPE]

...OHTSU No.1

| 1 | SCW7707(CLOTHES-WASHER) |
| 2 | SCW7770(CLOTHES-WASHER) |
| 3 | SCD6070GC(DRYER) |
| 4 | SCD6071(DRYER) |
| 5 | SCD6072(DRYER) |

SELECT SETTING MACHINE
TYPE NUMBER

[1] [2] [3] [4] [5]

[QUIT]

FIG. 63

⟨COIN-OPERATED MACHINE REMOTE MONITORING SYSTEM⟩

⟨MACHINE SET VALUE UPDATING⟩ ...OHTSU No.1
[COLLECTIVE SETTING BY MACHINE TYPE] ...SCD6070GC (DRYER)
SET NUMERALS IN ITEMS BELOW

- ● BASIC RATE(CHARGE FOR USING)... ☐☐☐☐ YEN
- ○ OPERATION TIME ☐☐ Min.
- ○ ACCEPTABLE MONEY ... 1:¥100, 2:¥50+¥100, 3:¥50+¥100+¥500, 4:¥50+¥100+¥500+¥1000
- ○ OPERATION MODE ... 1 : COIN , 2 : CARD, 3 : COIN & CARD , 4 : MANUAL
- ○ ROTATIONAL SPEED FINE ADJUSTMENT
  (DRUM ROTATIONAL SPEED) ... ☐☐ revs
- ○ UPPER / LOWER ... 1 : OPERATE BOTH , 2 : STOP UPPER ,
  3 : STOP LOWER , 4 : STOP BOTH

QUIT

FIG. 64

```
┌─────────────────────────────────────────────────────────────┐
│ COIN-OPERATED MACHINE REMOTE MONITORING SYSTEM              │
│                                                             │
│  〈 MACHINE SET VALUE UPDATING 〉          ... OHTSU No.1   │
│  【 COLLECTIVE SETTING ON ALL                               │
│                  MACHINES IN SHOP 】                        │
│                                                             │
│      SET NUMERALS IN ITEMS BELOW                            │
│  ─────────────────────────────────────────────────────────  │
│  ● BASIC RATE(CHARGE FOR USING)... □□□□ YEN                 │
│  ○ ACCEPTABLE MONEY ... 1:¥100, 2:¥50+¥100, 3:¥50+¥100+¥500, 4:¥50+¥100+¥500+¥1000 │
│  ○ OPERATION MODE ... 1 : COIN, 2 : CARD, 3 : COIN & CARD, 4 : MANUAL │
│                                                             │
│                                                    [QUIT]   │
└─────────────────────────────────────────────────────────────┘
```

FIG. 67

```
           7 6 5 4 3 2 1 0
[1st BYTE]: [0|1|1|1|0|0|1]   ("y":79Hex)
[2nd BYTE]: [0|1|0|0|0|0|1|0]   ("B":42Hex)

[3rd BYTE]~[(n-1)th BYTE]:   (MACHINE TYPE CODE REPRESENTED BY 7BIT ASCII:
                              EX. SCD-6070GC[10 BYTES],SCW7080[7 BYTES])

[n'th BYTE]: [0|1|1|1|1|1|1|1]   (7FHex:MACHINE TYPE CODE COMPLETION CODE)

[(n+1)th BYTE]~[(n+10)th BYTE]:   (EQUAL TO 3rd~12th BYTES OF DTC RETURN DATA
                                   FOR MACHINE SET VALUE MONITORING REQUEST)

[(n+11)th BYTE]: [0|1|1|1|1|1|1|0]   ("~":7EHex:DATA COMPLETION CODE)
```

FIG. 68

```
         7 6 5 4 3 2 1 0
[1st BYTE]:  [0|1|1|1|0|0|0|1]   ("y":79Hex)

[2nd BYTE]:  [0|1|0|0|0|0|1|1]   ("C":43Hex)

[3rd BYTE]~[12th BYTE]:   (EQUAL TO 3rd ~ 12th BYTES OF DTC RETURN DATA
                           FOR MACHINE SET VALUE MONITORING REQUEST)

[13th BYTE]: [0|1|1|1|1|1|1|0]   ("~":7EHex:DATA COMPLETION CODE)
```

REMOTE MANAGEMENT SYSTEM

This is a continuation, of application Ser. No. 08/396,429, filed Feb. 28, 1995, now abandoned.

BACKGROUND OF THE INVENTION

1. Field of the Invention

The present invention relates to a system for remotely managing a machine by means of a central control apparatus such as a personal computer or the like by connecting the machine controlled by a control device, e.g., a microcomputer with the central control apparatus via communication means.

2. Description of the Related Art

In a laundrette, for example, wherein a plurality of clothes-washers and a plurality of dryers installed are used by the payment with coins or prepaid cards, when a management system that carries out centralized monitoring of the laundry machine to check the presence of failures, presence of troubles, and the sales amount and other information thereby to control the machine is introduced, the efficiency of management is improved because of the reduction of the number of personnel who go around the shops to inspect the laundry machine or to check the sales amount, etc. and also owing to the elimination of the necessity for visiting the shops.

In a remote management system disclosed in the Japanese Patent Application No.5-1820, for example, operations of a plurality of laundry machines such as clothes-washers and dryers set in the laundrettes are controlled by a microcomputer that takes in signals from rotational speed sensors, thermistors, micro switches, and the like respectively installed in several parts of each machine such as motors, drums, coin boxes and the like. Each laundry machine is provided with a plurality of switch sets each comprising a plurality of DIP switches, so that a combination of ON/OFF states of the DIP switches in each switch set determines the fine adjustment of the motor rotational speed, charges, etc.

The microcomputer controls the operations of the laundry machine according to the signals received from the sensors, stores the data such as the operation state, remaining time of operation, sales amount and the like, and transmits the data to a data controller (hereinafter called as the DTC) arranged per shop according to a request from a central control apparatus. Each DTC is connected to the central control apparatus using a personal computer disposed in a management company via a public telephone line.

In such a remote management system of the prior art as above, when the central control apparatus transmits a request signal for monitoring the operation state, remaining time of operation, sales amount, etc. to the DTC, the DTC feeds a transmission request to the microcomputer of the subject machine. The microcomputer returns the requested data to the DTC and the DTC transmits the received data to the central control apparatus via the public telephone line. On the other hand, in the event of a trouble such as a failure, an abnormality of the machine, stealing of the sales or the like, the microcomputer of the laundry machine in trouble stops the operation of the machine and outputs a transmission request for the central control apparatus to the DTC. When the DTC makes a response, the microcomputer transmits data notifying the occurrence of the trouble to the DTC. The DTC calls the central control apparatus in order to transmit the received trouble data and, when the central control apparatus responds, transmits the data indicating the occurrence of the trouble. Upon receipt of the data, the central control apparatus gives a screen display, an alarm, etc., to inform the personnel of the trouble being occurred.

However, in the remote management system of the prior art, to change the set values according to revising of the rate of charges, or the using conditions of the laundry machine requires the dispatch of the personnel, who in turn manipulates the DIP switches to change the combination of the ON/OFF states as well as the set values. This results in high management costs. Also because the personnel must operate a number of DIP switches for each laundry machine, the management is eventually carried out low in efficiency.

Likewise, in the remote management system of the prior art, because only the information indicating the occurrence of the trouble in the machine is transmitted to the central control apparatus, the restoration of the troubled portion by the personnel takes much time before the troubled portion is located, leading to the deterioration in the efficiency of management.

Further in the remote management system of the prior art, it is obliged to send the personnel to the shop to reset the control device such as the microcomputer and restore the machine to the normal operable state every time the machine is brought in trouble regardless of the type of the trouble, therefore increasing costs for management.

Also in the remote management system of the prior art, because the microcomputer installed in the machine must store the data related to the operation of the machine until a transmission request from the central control apparatus is received, a memory of a large capacity is necessitated, making the machine and also the overall system cost high.

SUMMARY OF THE INVENTION

The present invention aims at solving such problems of the prior art as described above. A first object of the invention is to provide a remote management system that makes it possible to change data stored in a memory in a control device of a machine which stores related data to the operation of the machine from a remote central control apparatus of a management company, without dispatching personnel to the site of the machine, thereby decreasing the management cost and improving the management efficiency.

A second object of the invention is to provide a remote management system that makes it possible to locate a troubled portion of a machine on the basis of the output data from a control device controlling the machine to various units of the machine and input data from the units of the machine to the control device, thereby reducing the working time of the personnel and the management cost, and improving the management efficiency.

A third object of the invention is to provide a remote management system that makes it possible to reset a control device controlling the operation of a machine and to restart the machine, upon request from a remote central control apparatus, thereby decreasing the management cost and improving the management efficiency, which leads to the reduction in the system cost.

A fourth object of the invention is to provide a remote management system that allows it to use a control device having a small memory capacity for a machine, by installing a controller that periodically collects data related to the operation of the machine from the control device controlling the machine, thereby lowering the machine cost and reducing the system cost.

The above and further objects and features of the invention will more fully be apparent from the following detailed description with accompanying drawings.

BRIEF DESCRIPTION OF THE DRAWINGS

FIG. 12 is a frame structure diagram of data returned from the DTC to the central control apparatus;

FIG. 14 is a frame structure diagram of data returned from the DTC to the central control apparatus;

FIG. 46 is a diagram showing an initial screen of a display device of the central control apparatus;

FIG. 47 is a diagram showing a menu screen;

FIG. 48 is a diagram showing an operation monitoring screen;

FIG. 49 is a diagram showing a sales amount monitoring screen;

FIG. 50 is a diagram showing a sales amount monitoring screen (in detail);

FIG. 51 is a diagram showing a set value monitoring screen;

FIG. 52 is a diagram showing a display screen at the central control apparatus after cancellation of a trouble;

FIG. 56 is a frame structure diagram of data returned from the DTC in response to an I/O port monitoring request command;

FIG. 57 is a diagram showing a screen of the result of a diagnosis (failure found) by the I/O port monitoring;

FIG. 59 is a diagram showing a machine set value updating screen;

FIG. 60 is a diagram showing a screen for individual setting of the machine;

FIG. 62 is a diagram showing a screen for collective setting of the machine by the type;

FIG. 63 is a diagram showing a screen of items for collective setting of the machine by the type;

FIG. 64 is a diagram showing a screen for collective setting of all machines in a shop;

FIG. 67 is a frame structure diagram of the machine set value updating request command (by the type of machine); and FIG. 68 is a frame structure diagram of the machine set value updating request command (all machines collectively).

DESCRIPTION OF THE PREFERRED EMBODIMENT

The invention will be described specifically below with reference to the drawings that show the preferred embodiment thereof.

Figure 1:
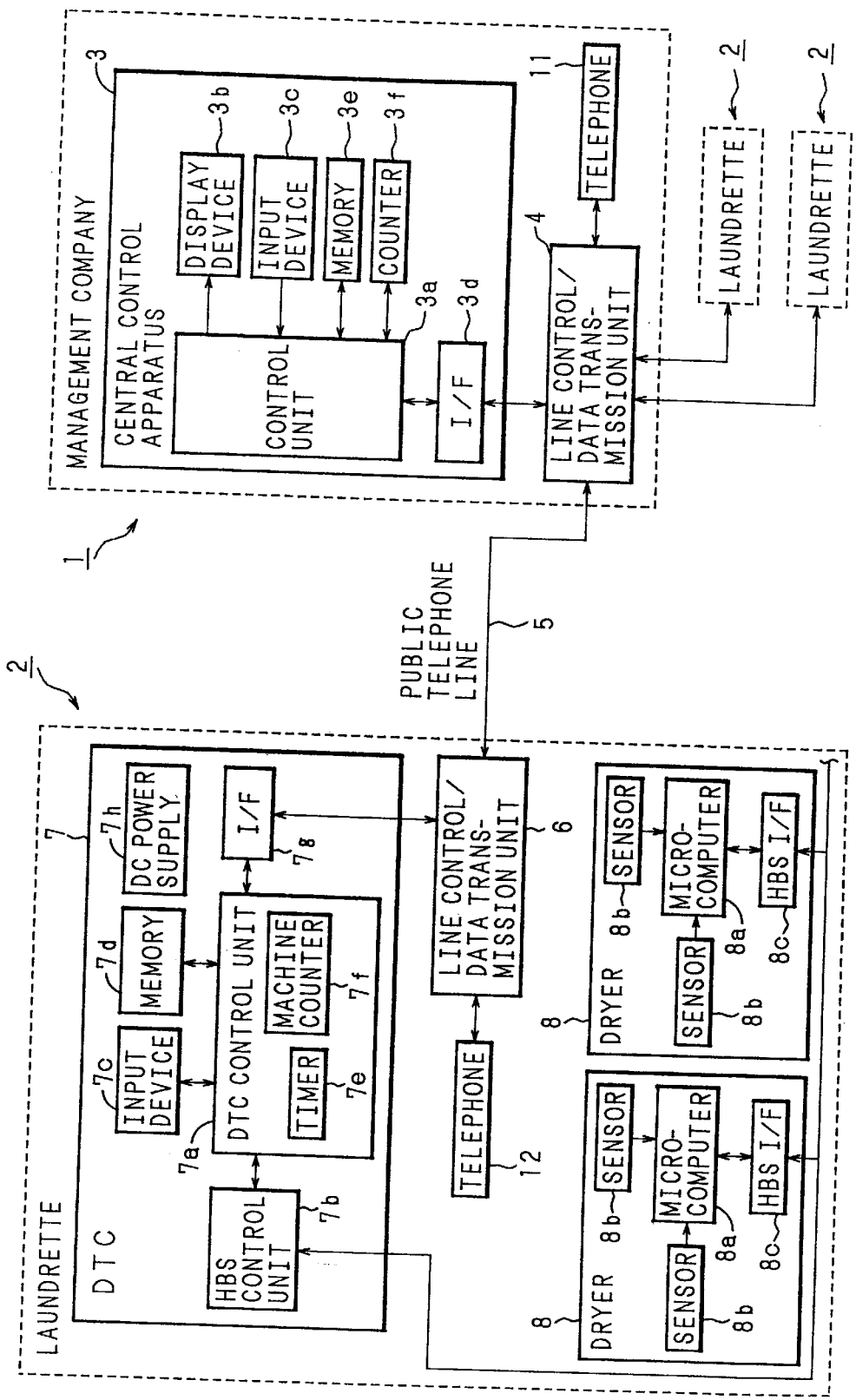
FIG. 1 is a block diagram showing the configuration of a remote management system according to the invention.

FIG. 1 is a block diagram showing the configuration of a remote management system according to the invention. In the drawing, numeral 2 denotes a laundrette, and numeral 1 denotes a management company that operates a plurality of laundrettes 2, 2, . . . . The laundrette 2 is equipped with a plurality of dryers 8, 8, . . . and clothes-washers (not shown in the drawing) as laundry machines arranged therein, and each dryer 8 is installed with a microcomputer 8a that controls the drying operation and an interface (hereinafter abbreviated as I/F) 8c for home bus system (hereinafter abbreviated as HBS) in conformity with the HBS standard. The microcomputer 8a starts the drying operation according to a starting instruction by means of inputting of the charge e.g., the insertion of coins and by means of a start button to be described later, and controls the drying operation according to signals from sensors 8b, 8b, . . . such as a rotational speed sensor, a temperature sensor, and the like. The microcomputer 8a also transmits such data as the sales amount, rotational speed, temperatures, abnormality in inputting of charges, abnormality in the rotational speed or temperatures, etc. from the HBS I/F 8c to a DTC (Data Transmission Controller) in response to a periodical data transmission request from the DTC 7 or when the above failure or abnormality is brought about. The HBS I/F's 8c, 8c . . . of all the dryers 8, 8, . . . are connected to a HBS control unit 7b provided in the DTC 7 via a twisted pair 9, and the HBS control unit 7b controls the transmission of data from the DTC 7 to the dryers 8, 8, . . . and the transmission of data from the dryers 8, 8, . . . to the DTC 7, etc.

The HBS control unit 7b exchanges the data to be transmitted to the dryer 8 and the data to be received from the dryer 8 with a DTC control unit 7a that controls the operation of the DTC 7. The DTC control unit 7a has a timer 7e for transmitting a data transmission request at every predetermined time interval to the microcomputer 8a of each dryer 8 and a machine counter 7f which counts the number of the dryers 8 every time the transmission is completed for the purpose of preventing the duplicate transmission of the data transmission request to the same dryer 8. Connected to the DTC control unit 7a are an input unit 7c for setting information such as the name of the laundrette wherein the DTC 7 is installed, the telephone number thereof and the like, a memory 7d for storing the information set at the input unit 7c and data received from the dryers 8, 8, . . . , and an I/F 7g such as an RS-232C. The DTC 7 has a built-in DC power source 7h to ensure the remote control even in the event of a power failure. The order of priority for communications with the dryers 8, 8, . . . is defined in the HBS control unit 7b, whereby the DTC 7 transmits a data transmission request command sequentially from the HBS control unit 7b to each dryer 8 at every predetermined time interval according to the order of priority, and stores the received data from each dryer 8 in the memory 7d at corresponding specified addresses.

The I/F 7g of the DTC 7 is connected to one end of a public telephone line 5 via a line control/data transmission unit 6, for example, a modem. Another end of the public telephone line 5 is connected to an I/F 3d of a central control apparatus 3 using a personal computer via a line control/data transmission unit 4 of the management company 1. There are telephone sets 11, 12 connected to the line control/data transmission unit 4 of the management company 1 and the line control/data transmission unit 6 of the laundrette 2, respectively, for vocal communications.

The central control apparatus 3 comprises a control unit 3a such as a CPU, a display device 3b such as a CRT, an input device 3c such as a keyboard, a memory 3e for storing data transmitted from the DTC 7, data to be displayed on the display device 3b, a trouble code (E1, E2, or E7 in the embodiment) for identifying a trouble of the kind that permits the immediate automatic resumption of the dryer 8 without a confirmation from an operator after handling of the trouble, level patterns at input/output ports of the microcomputer 8a during the normal operation of the dryer 8, updating set values inputted at a setting screen through the input device 3c to be transmitted to the microcomputer 8a via the DTC 7, and other data, and a machine counter 3f to obtain the machine number used in specifying the dryer 8 that, requires to cancel the trouble. Upon inputting of a data transmission request command such as a sales amount monitoring request, an operation state monitoring request or the like from the input device 3c, the control unit 3a transmits data to the DTC 7 of the laundrette 2 via the I/F 3d and the line control/data transmission unit 4 and reads, via the I/F 3d, data received at the line control/data transmission unit 4 from the DTC 7 of the laundrette 2, thereby displaying the data on the display device 3b, while comparing the data with the data stored in the memory 3e, with executing a processing corresponding to the result of the comparison.

Figure 2:
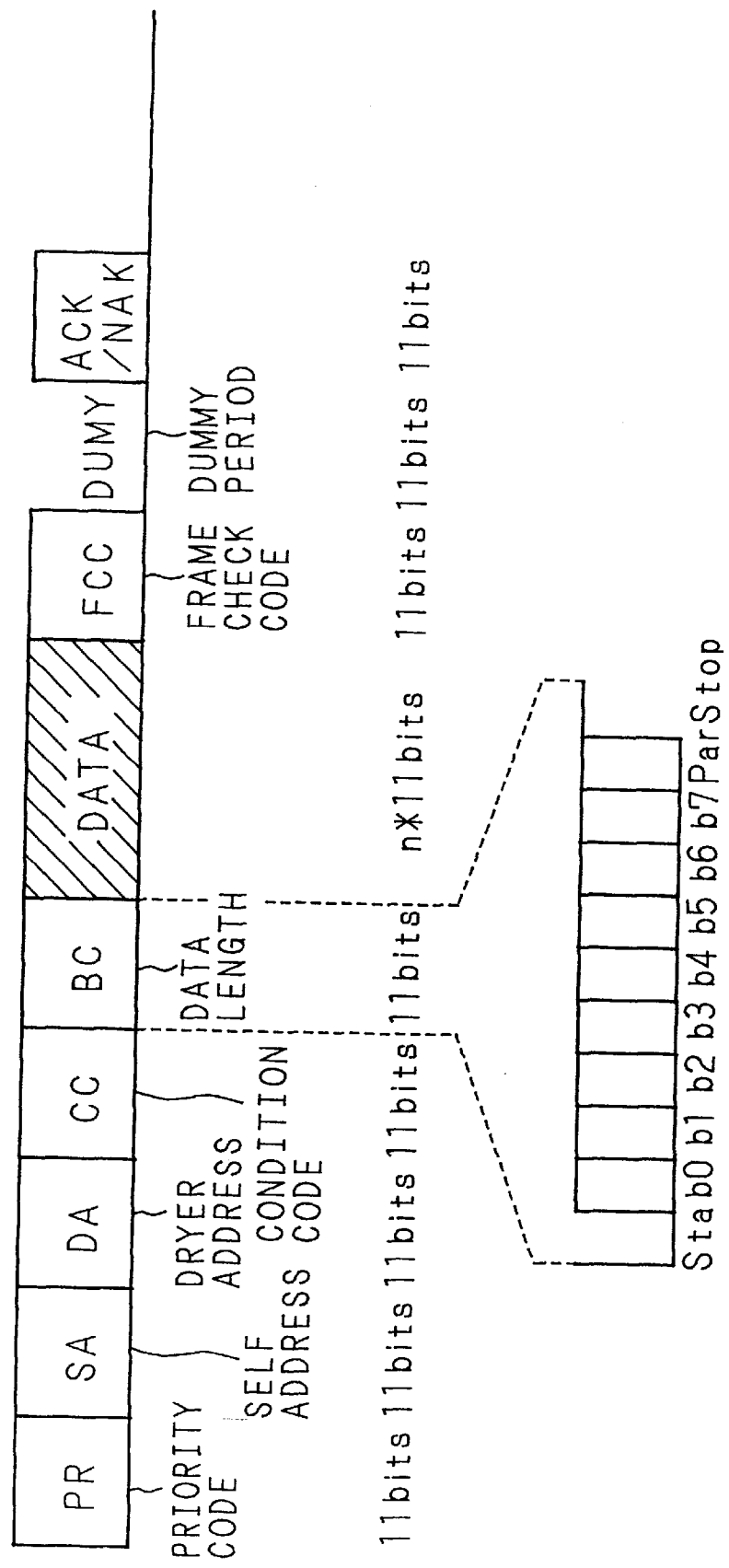
FIG. 2 is a data format used in data communications between a DTC and dryers.

FIG. 2 is a data format that is used in data communications between the DTC 7 and the dryer 8 in conformity with the HBS standard. As shown in FIG. 2, the data comprises a priority code (PR) indicating the order of priority of communications, a self address (SA), a destination address (DA), a control code (CC) and a data length (BC) indicating the length of the following data, each with 11 bits long, data (DATA) of bits of an integral multiplication (n) of 11, a frame check code (FCC), a dummy period (DUMY) and an acknowledge response (ACK)/not, acknowledge response (NAK), each with 11 bits long.

Table 1 is a list, of addresses assigned to the dryers 8, 8, . . . and the DTC 7. In this embodiment, addresses formed by combining upper addresses O through F and lower addresses 2, A, 6 and E are assigned to thirty-two dryers 8, 8, . . . and one DTC 7 as shown in Table 1. Table 2 through Table 9 show the frame structures of commands exchanged between the dryer 8 and the DTC 7 in conformity with the HBS standard. Communications between the dryer 8 and the DTC 7 are carried out in such a way that a command by the data format as shown in Table 2 through Table 9 is transmitted from the DTC 7 to the dryer 8 and a response is returned from the dryer 8 to the DTC 7 similarly.

Figure 3:
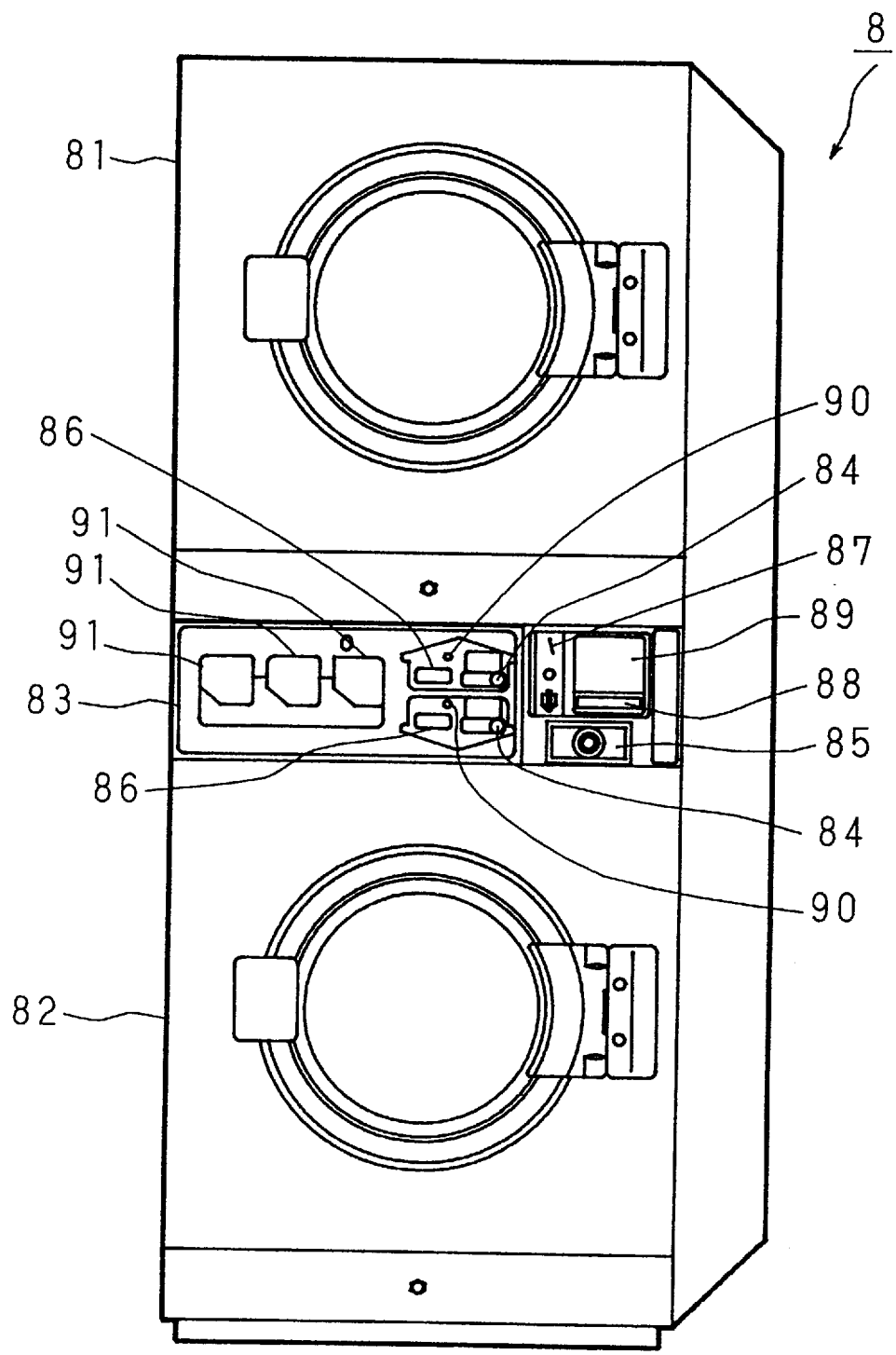
FIG. 3 is a front view of the dryer shown in FIG. 1.

FIG. 3 is a front view of the dryer 8 shown in FIG. 1, and numerals 81 and 82 denote upper and lower drying chambers, respectively. Each of the drying chambers 81, 82 includes an outer bath and a rotary drum pivoted to the outer bath (both not shown in the drawing). The objects to be dried, namely, laundries are accommodated in the rotary drum by opening a front door. An operation panel 83 has a coin slot 87 and a card slot 88 for driving the upper and lower drying chambers 81, 82, an indicator 89 for indicating the amount of coins inserted or the remaining rates of the card, a coin box 85 that stores the coins inserted, start buttons 84, 84 for the upper and the lower drying chambers 81, 82, respectively, remaining time indicators 86, 86, operation lamps 90, 90 and indicators 91, 91, 91 for displaying the operation states, temperatures and presence/absence of abnormalities, etc. of the drying chambers 81, 82.

Figure 4:
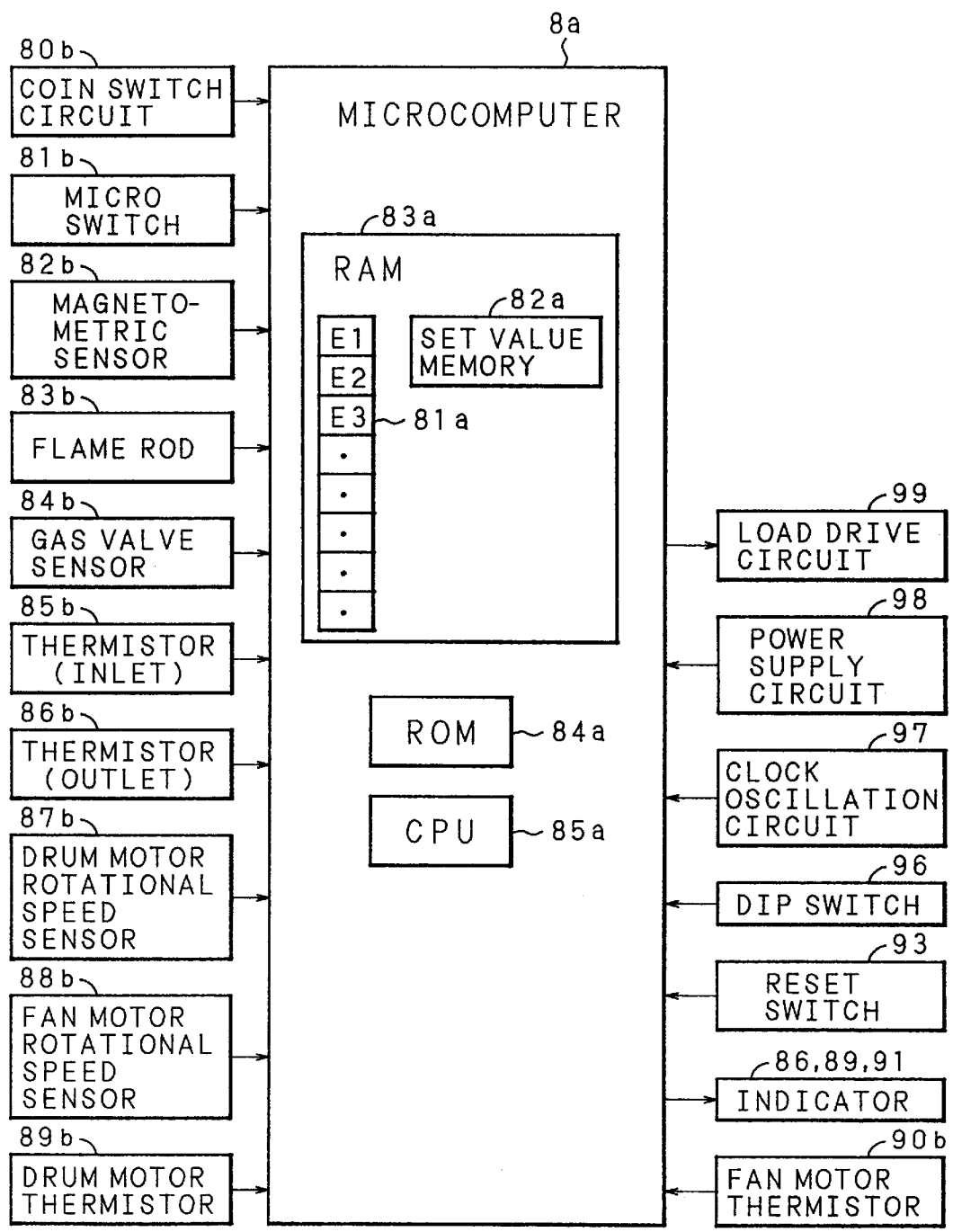
FIG. 4 is a block diagram of a control system of the dryer shown in FIG. 3.

FIG. 4 is a block diagram showing a control system of the dryer 8 in FIG. 3, and numeral 8a denotes the microcomputer. An input port of the microcomputer 8a receives a coin insertion signal from a coin switch circuit 80b, a coin jamming signal from a magnetometric sensor 82b, an abnormality detection signal from a micro switch 81b generated when the coin box 85 is taken out, an ignition success/failure signal from a flame rod 83b, temperature signals from thermistors 85a, 86b installed at an air inlet port and an air discharge port of the rotary drum, a valve ON/OFF signal from a gas valve sensor 84b, rotational speed signals from a drum motor rotational speed sensor 87b and a fan motor rotational speed sensor 88b, and motor temperature signals from a drum motor thermistor 89b and a fan motor thermistor 90b.

Further, the input port of the microcomputer 8a receives a setting signal for fine adjustment of the drum rotational speed, a charge setting signal, or the like which are from a DIP switch 96, a reset signal from a reset switch 93 to cancel the interruption of the drying operation, the supply of power from a power supply circuit 98 and a clock from a clock oscillation circuit 97.

The microcomputer 8a has a RAM 83a including a register assigned to trouble detection flags 81a for indicating occurrence of a trouble by the trouble type among plural types which will be described later, and also including a set value memory 82a for storing values set by the DIP switches 96, and storing inputted data from a plurality of sensors 8b in the other area. The microcomputer 8a also has a ROM 84a which stores plural programs, i.e., a control program for the drying operation, a transmission program to transmit data to the DTC 7, programs to handle the trouble corresponding to the kind of the trouble caused, etc., and further has a CPU 85a which controls the drying operation according to the programs stored in the ROM 84a. Moreover, the CPU 85a judges the kind of the trouble occurring during the operation of the dryer 8, sets one of the trouble detection flags 81a corresponding to the kind of the occurring trouble, with requiring the DTC 7 to call the central control apparatus 3. On the other hand, when a trouble cancellation request is transmitted from the central control apparatus 3 via DTC 7, the CPU 85a clears the trouble detection flag 81a. Additionally, the CPU 85a transmits data to the DTC 7 required at predetermined time intervals by the DTC 7, or transmits data related to the operation and irregularly required from the DTC 7 responsive to a data transmission request from the central control apparatus 3 being called due to occurrence of a trouble, or updates stored contents in the set value memory 82a to a value transmitted together with a set value updating instruction from the central control apparatus 3 via the DTC 7.

Figure 5:
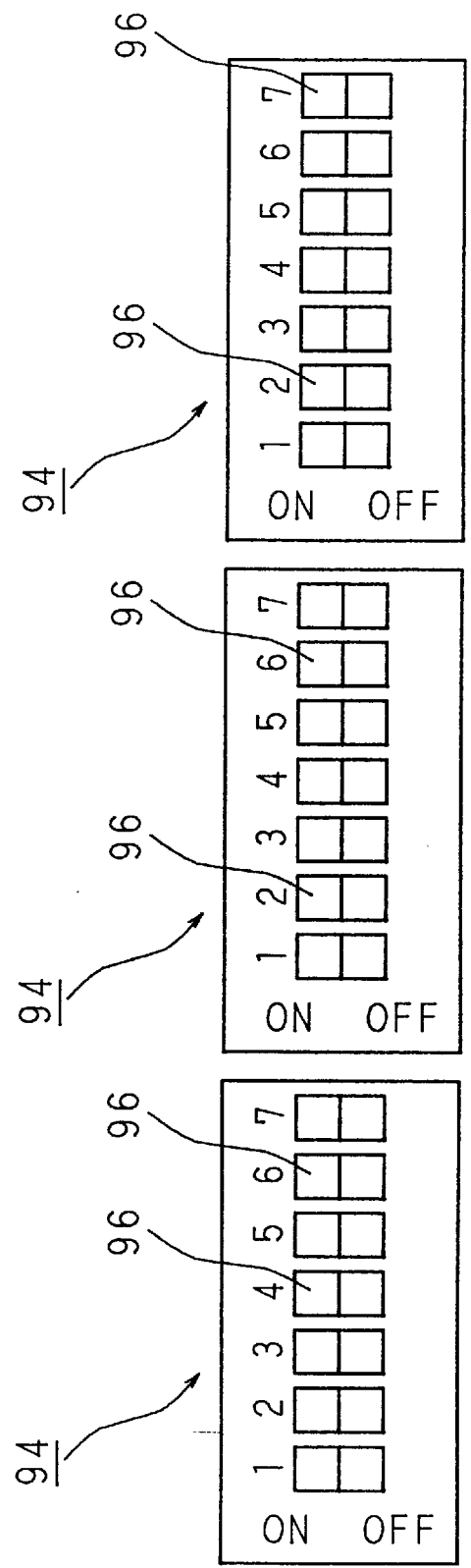
FIG. 5 is a front view of the DIP switch shown in FIG. 4.
Figure 6:
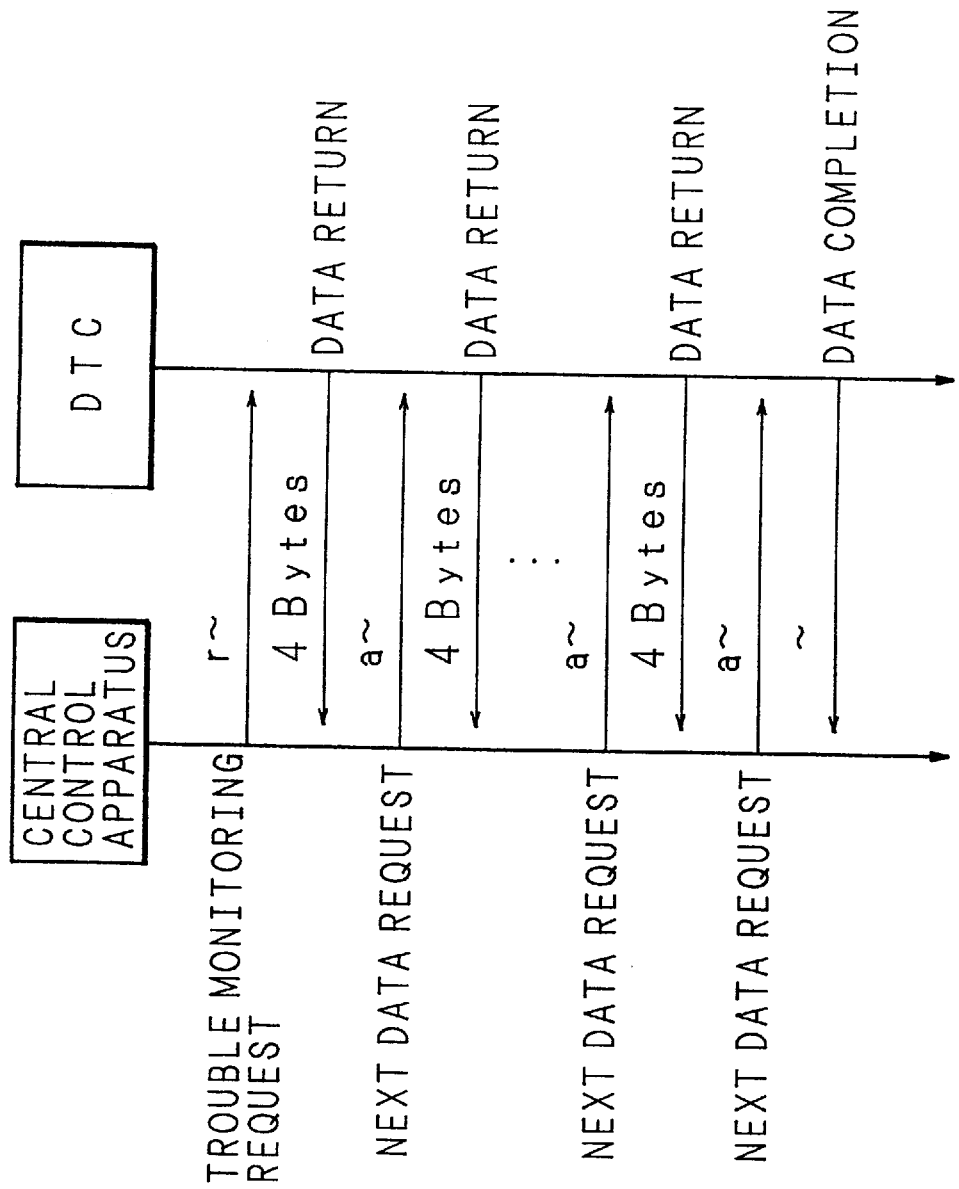
FIG. 6 is a sequence diagram of data communications between a DTC and a central control apparatus.
Figure 7:
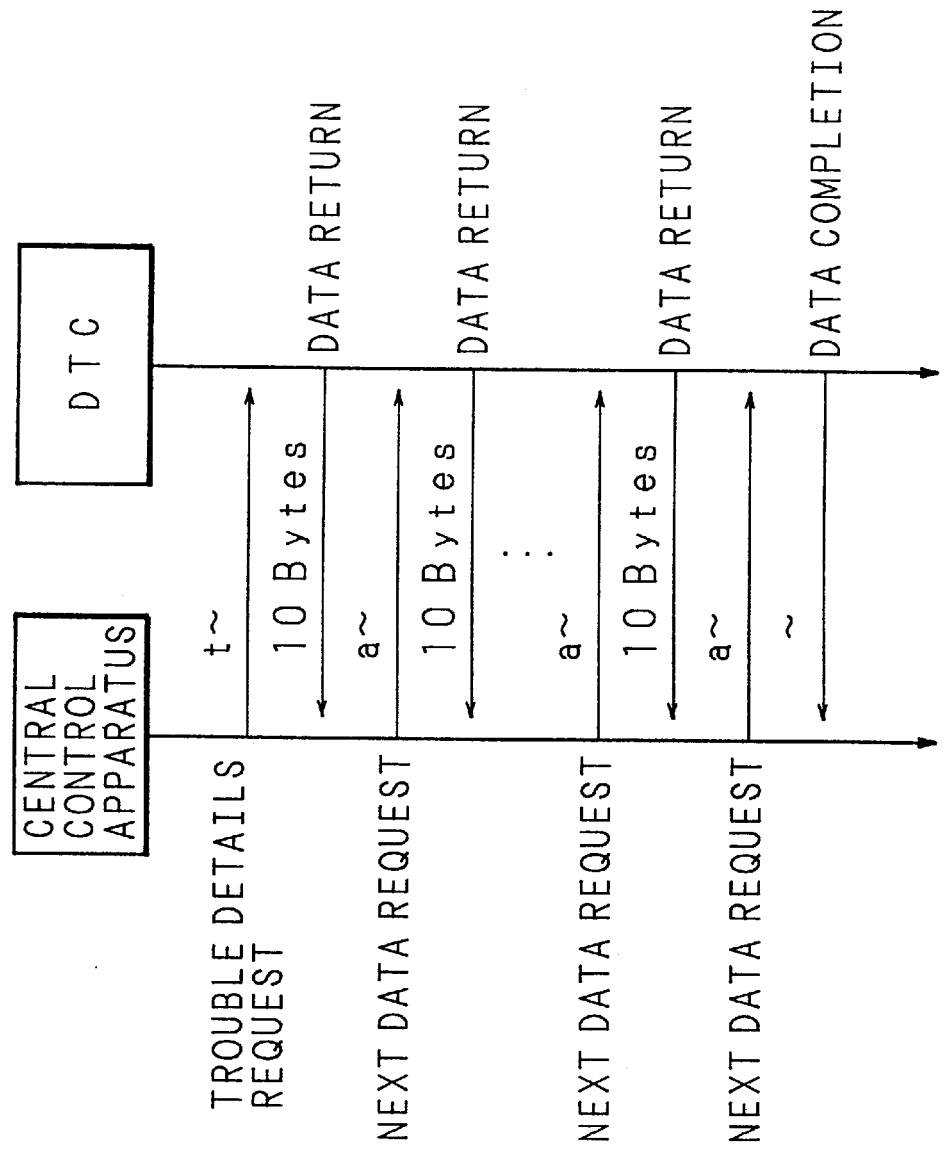
FIG. 7 is a sequence diagram of data communications between the DTC and the central control apparatus.
Figure 8:
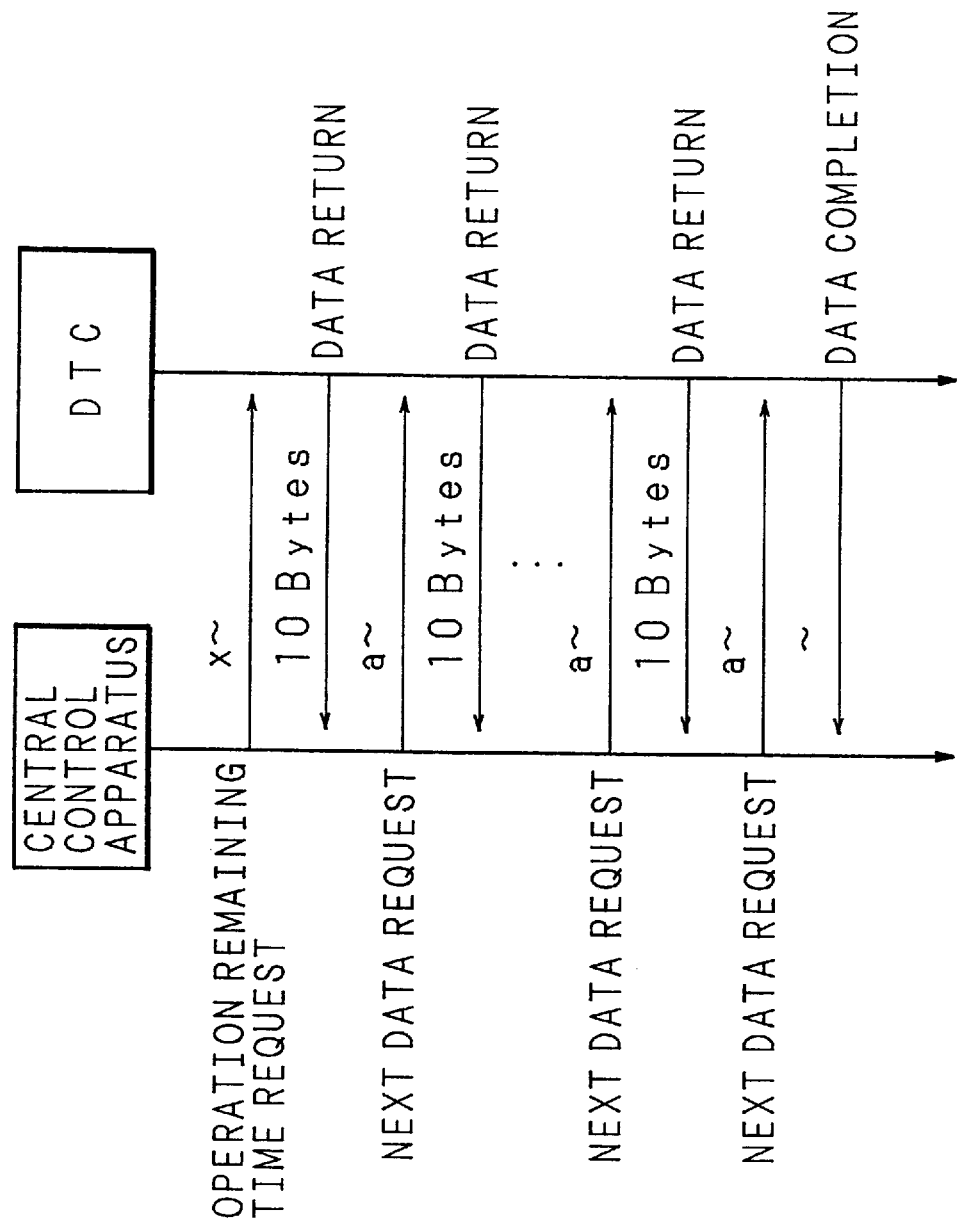
FIG. 8 is a sequence diagram of data communications between the DTC and the central control apparatus.
Figure 9:
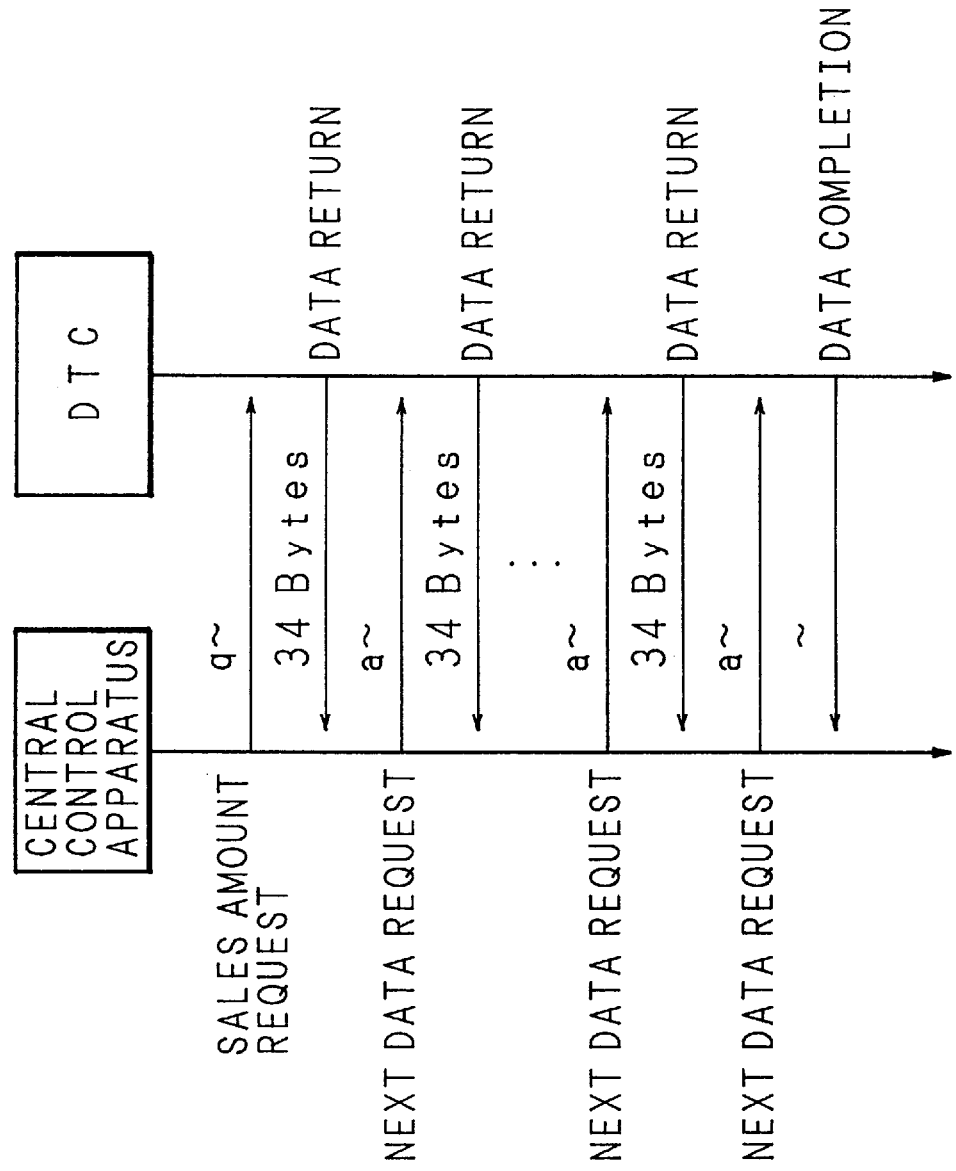
FIG. 9 is a sequence diagram of data communications between the DTC and the central control apparatus.
Figure 10:
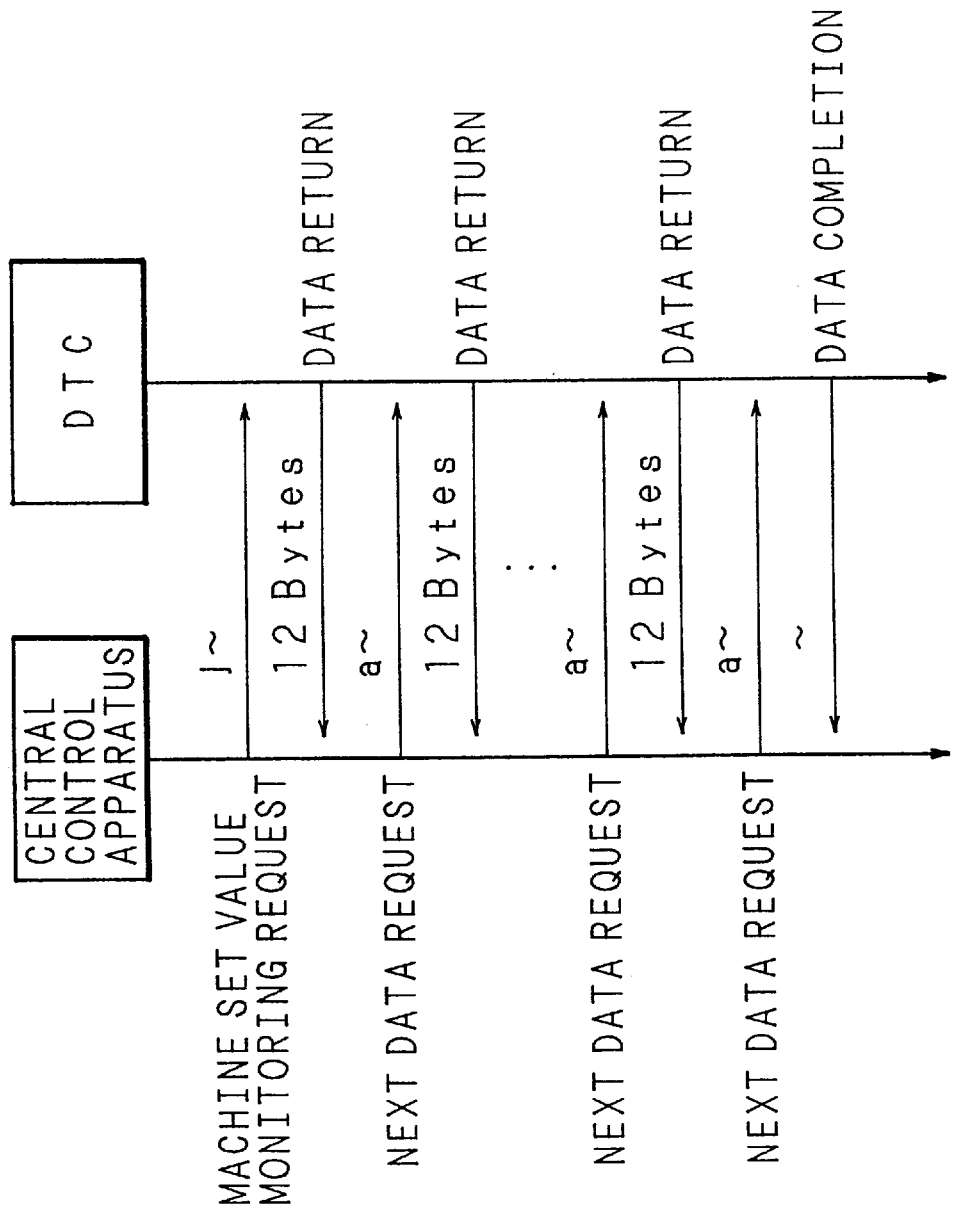
FIG. 10 is a sequence diagram of data communications between the DTC and the central control apparatus.
Figure 11:
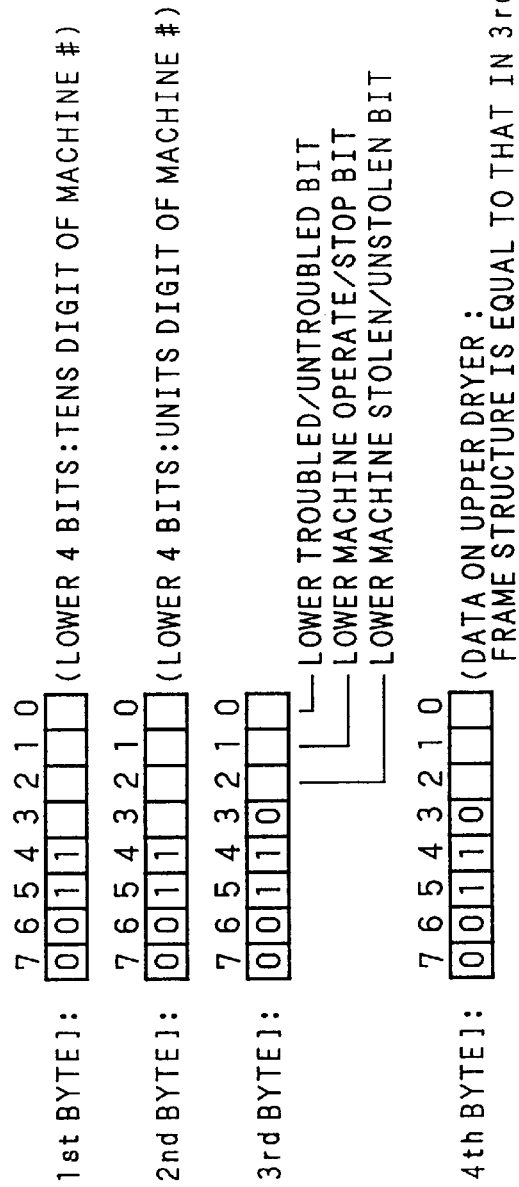
FIG. 11 is a frame structure diagram of data returned from the DTC to the central control apparatus.
Figure 13:
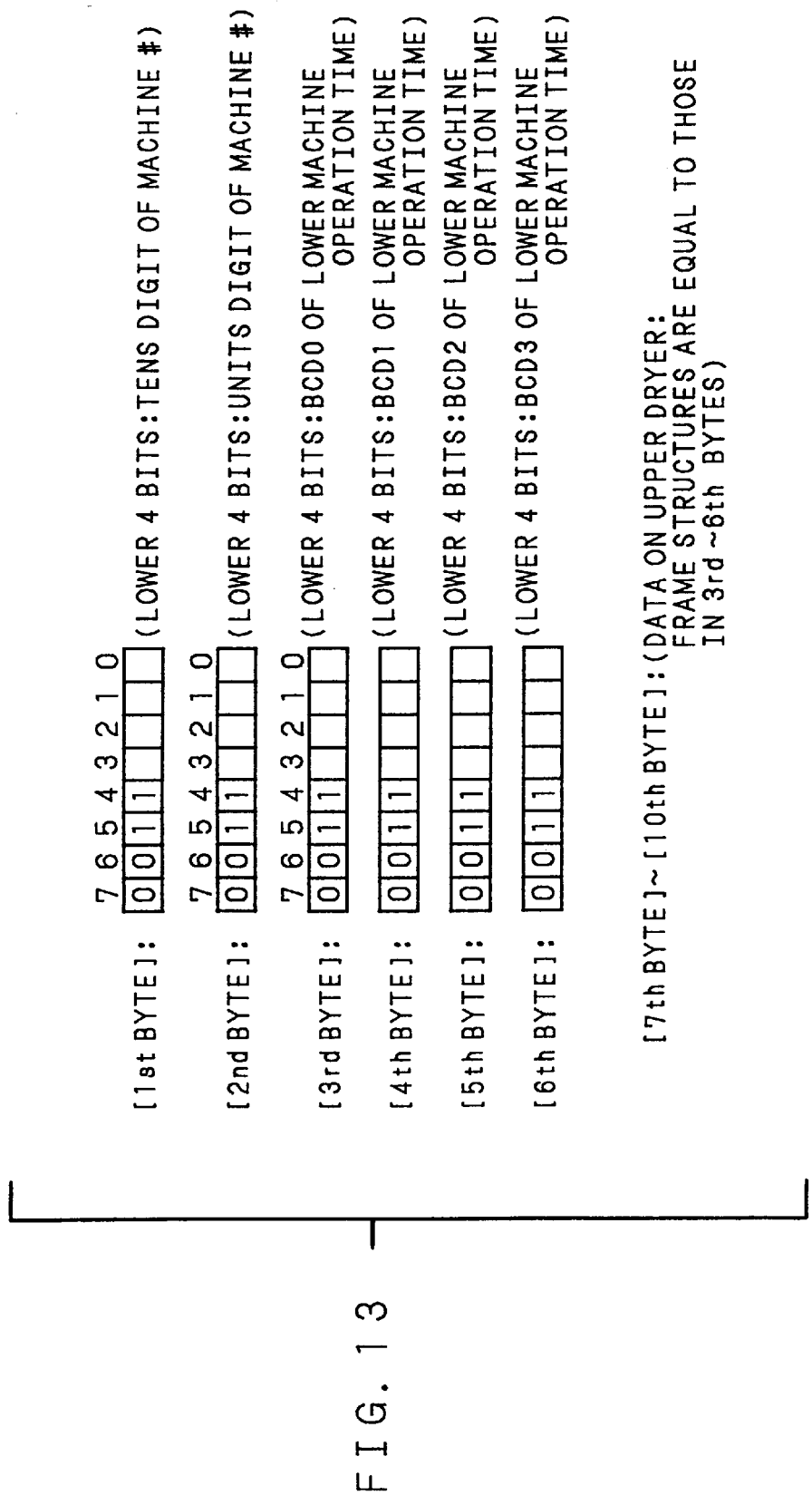
FIG. 13 is a frame structure diagram of data returned from the DTC to the central control apparatus.
Figure 15:
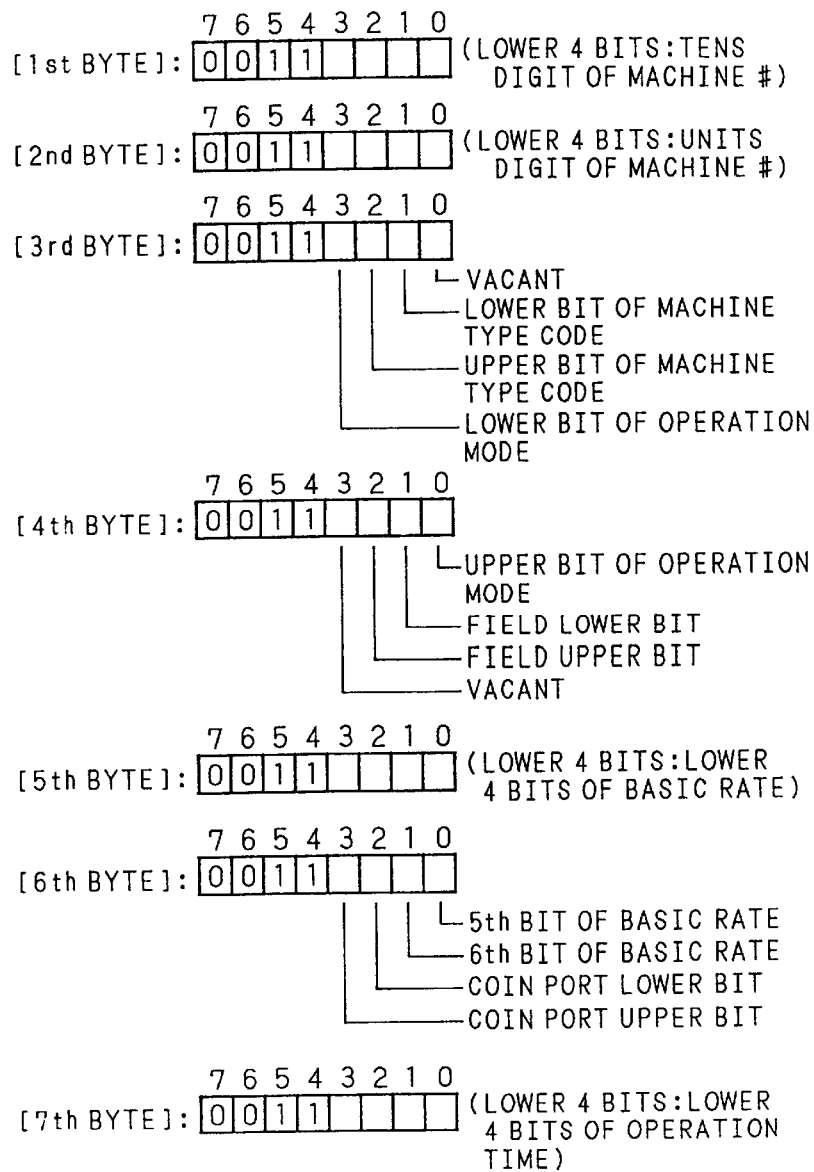
FIG. 15 is a frame structure diagram of data returned from the DTC to the central control apparatus.
Figure 16:
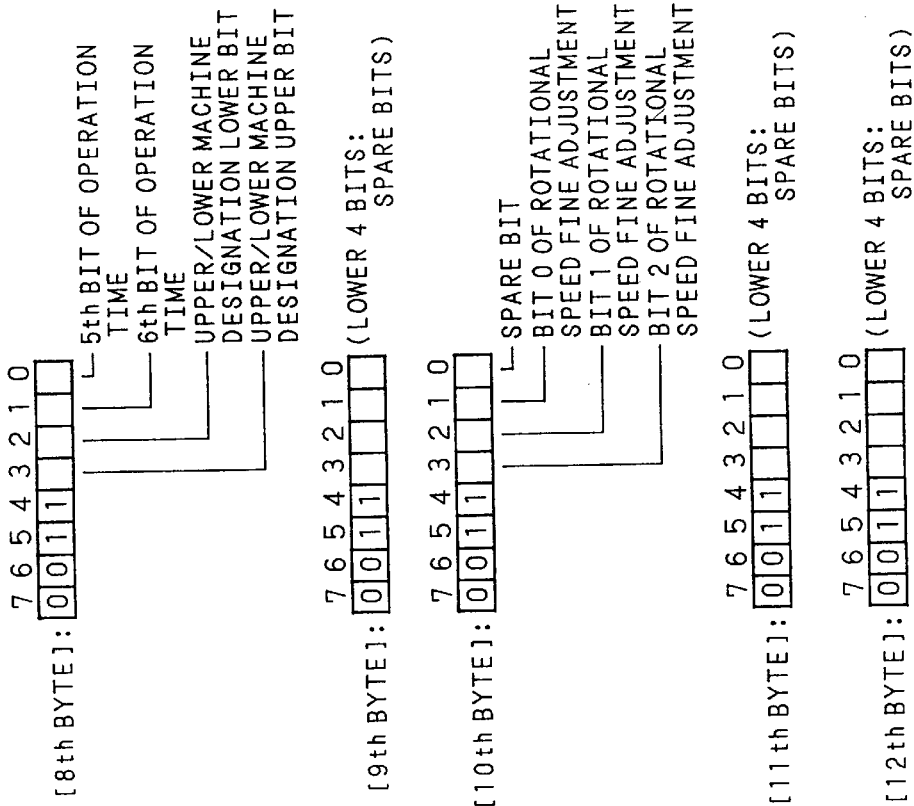
FIG. 16 is a frame structure diagram of data returned from the DTC to the central control apparatus.

FIG. 5 is a front view of the DIP switch 96 shown in FIG. 4. The dryer 8 is provided with a plurality of switch groups 94, 94, . . . for setting the amount whereby the drum rotational speed is to be finely adjusted, charges and other items, so that a desired value is set by a combination of ON/OFF states of the plurality of DIP switches 96, 96 . . . of each switch group 94. The set value is inputted through the input port of the microcomputer 8a and is stored in a set value memory 82a provided in the microcomputer 8a.

The microcomputer 8a, in accordance with signals inputted through the input port and set values stored in the set value memory 82a, outputs instruction signals into a load drive circuit 99 through an output port thereof. The load drive circuit 99 outputs electrical signals corresponding to the instruction signals to the drum motor, the fan motor, the gas valve, etc. The microcomputer 8a makes the display of the amount of money paid or the remaining rates of a card, remaining operation time, operation state, temperatures, presence/absence of abnormalities, etc. on the indicators 86, 89, 91 (refer to FIG. 3) based on the signals inputted from the input port. At the same time, the microcomputer 8a transmits these data to the DTC 7 (refer to FIG. 1) in response to the periodical transmission request from the DTC 7 or a monitoring request from the central control apparatus 3.

The microcomputer 8a is also provided with the trouble detection flag 81a of 1-bit length for each of a plurality of types of abnormalities and, when an abnormality is detected through a signal inputted thereto via the input port, the microcomputer 8a sets the corresponding trouble detection flag 81a, with a message of the abnormality on the indicator 91. At the same time, the microcomputer 8a outputs an instruction to stop the operation of the dryer 8 in a predetermined procedure corresponding to the type of the abnormality and the operation state of the dryer 8. As a result, the microcomputer 8a suspends the operation of the dryer 8 until the reset signal is inputted from the reset switch 93 or a trouble canceling instruction is transmitted from the central control apparatus 3 of the management company 1 by the operator as will be described later, thereby to clear the trouble detection flag 81a. The microcomputer 8a transmits a request as well as data related to the abnormality to the DTC 7 similarly to the procedure described previously.

Table 10 and Table 11 show examples of the types of troubles or abnormalities, criteria for determining the troubles and procedures to stop the operation.

For example, when sufficient coins are inserted and the start button 84 is pressed, the microcomputer 8a gives an instruction signal of starting drying operation to the load drive circuit 99 to start drying operation thereby to rotate the drum motor and the fan motor and to open the gas valve to supply the gas. Thereafter, an igniting operation is conducted. In case where the ignition success signal is not fed from the flame rod 83b to the input port despite the igniting action, the microcomputer 8a repeats the igniting operation. When five consecutive igniting operations fail and no ignition success signal is inputted, the microcomputer 8a determines it as an ignition failure, sets the trouble detection flag 81a assigned to the trouble code E1 and, at the same time, executes the basic procedure to immediately shut the gas valve and stop the operation of both motors, thereby to inhibit the operation of the dryer 8.

In case where the thermistor 86b provided at the air outlet of the rotary drum generates an abnormal temperature signal due to clogging of a lint filter or other causes when the microcomputer 8a is in the drying operation mode, the microcomputer 8a determines that the drum is overheated, sets the trouble detection flag 81a assigned to the trouble code E4 and closes the gas valve to extinguish the fire. Then, the microcomputer 8a drives both motors for the remaining operation time to supply the air from outside to the drum thereby cooling the drum before stopping the operation.

As described previously, the DTC 7 periodically transmits the data transmission request to the microcomputers 8a, 8a, ..., stores various data transmitted from the microcomputers 8a, 8a, ... at the addresses in the memory 7d assigned to the dryers 8, respectively, and transmits the data stored in the memory 7d to the central control apparatus 3 in response to a transmission request from the central control apparatus 3 of the management company 1. When the stored data includes information indicating the abnormality of the dryers 8, 8, ... or the occurrence of troubles such as the stealing of the sales money, the DTC 7 calls the central control apparatus 3 of the management company 1 to transmit the information indicating the occurrence of the trouble to the central control apparatus 3 after the line 5 is connected.

FIGS. 6 through 10 are sequence diagrams of data communications between the DTC 7 and the central control apparatus 3 via the public telephone line 5, and FIGS. 11 through 16 are frame structure diagrams of the data returned from the DTC 7 to the central control apparatus 3 in response to a request from the central control apparatus 3. When the central control apparatus 3 transmits a trouble monitoring request (r) to monitor whether a trouble such as the abnormality of the dryer 8 and stealing of the sales money is given rise to, a detail request code (t) to monitor details of the trouble, a remaining operation time request code (x) to monitor the remaining operation time of the dryer 8, a sales amount request code (q) to monitor the sales amount of the dryer 8 or a machine set value monitoring request code (j) to monitor the values set by the DIP switch 96 of each dryer 8, along with a data completion code (~) to the DTC 7, the DTC 7 returns the data related to the dryer 8 with the highest priority in the predetermined frame structures shown in FIG. 11 through FIG. 16. According to a next data request (a) and the data completion code (~) both transmitted from the central control apparatus 3 to the DTC 7, the DTC 7 returns back the data related to the dryer 8 of the second highest priority. The procedure is repeated according to the order of priority of the dryers 8, and the data communications finish when the DTC 7 returns the data completion (~) in response to the next data request (a).

Among Table 10 and Table 11, for both the ignition failure (E1) described previously and an accidental fire (E2) wherein accidental fire and ignition are repeated during the drying operation or the ignition is not attained even after the retrial subsequent to the accidental fire, such a criterion is set for safety that determines the detection of five consecutive failures as the occurrence of a trouble. However, the igniting operation tends to be unstable and five igniting operations often fail to get flame. Moreover, in many cases, the detected trouble has no relation to the abnormality of the machine leading to accidents. In the case of a drum motor rotation irregularity (E7) wherein the rotational speed of the drum motor is beyond a permissible range, it may be sometimes caused by the decrease in the weight of laundries due to drying, by the fluctuation in the motor rotation, etc., that is, based on the erroneous detection without any actual troubles in the machine.

Therefore, the remote management system of the invention is arranged in such a configuration that, when a trouble of the dryer 8 is detected and accordingly the trouble detection flag 81a is set, the dryer 8 can be reset, by transmitting a flag clearing request from the central control apparatus 3 of the management company 1, as will be described later. At this time, whether the flag is allowed to be promptly cleared is determined without a confirmation from the operator based on the type of the detected trouble. Further in the remote management system of the invention, the operation of the dryer 8 is automatically stopped when the trouble detection flag 81a is set and the operation is automatically started again when the trouble detection flag 81a is cleared as is so recognized that the trouble is solved. This makes it possible to reset the dryer 8 without dispatching personnel to the laundrette 2. Accordingly, the occurrence of accidents during resetting and restarting of the machine can be avoided, and further, the shop can be turned to be an unmanned one, contributing to reduction of management costs.

The remote management system of the invention is also adapted to operate in such a procedure that the DTC 7 disposed in each laundrette 2 periodically collects data from the dryers 9 and stores the data, and also collects data from the dryers 8 and transmits the data to the central control apparatus 3 following a request from the central control apparatus 3 of the management company 1. When requested by the central control apparatus 3, the DTC 7 transmits the data from the dryer 8 to the central control apparatus 3 with priority to the periodical collection of data. Because this procedure is effective to reduce the memory capacity of the microcomputer which controls the operation of the dryer 8, the machine cost is decreased and the state of the dryer 8 is managed at real time.

FIG. 17 through FIG. 23 and FIG. 29 through FIG. 32 are flowcharts showing the operation in the central control apparatus 3 of the remote management system according to the invention. The central control apparatus 3 checks the presence of a call from the DTC 7 to the line control/data transmission unit 4 resulting from the occurrence of a trouble (step S1), and displays an initial screen on the display device 3b when there is no call.

FIG. 46 shows the initial screen described previously. Names of laundrettes 2 where the DTC's 7 are installed are listed at the right, middle portion of the screen, allowing the personnel to select a laundrette through manipulation of keys or by touching the number displayed at the bottom of the screen with the mouse.

When a line connection is requested by selecting the laundrette (step S2), the central control apparatus 3 calls the line control/data transmission unit 6 of the selected laundrette 2 from the line control/data transmission unit 4 to connect the public telephone line (step S3) and carries out a trouble monitoring process (step S4), a remaining operation time monitoring process (step S5), a sales amount monitoring process (step S6) and a machine set value monitoring process (step S7) (these processes will be described later), so that the subject data is fed back from the DTC 7 of the laundrette 2. If there is a call on the line control/data transmission unit 4 of the management company 1 from the DTC 7 of the laundrette 2 due to the occurrence of a trouble in the step S1, the central control apparatus 3 connects the line 5 with the line control/data transmission unit 6 of the laundrette 2 where the calling DTC 7 is installed (step S8) and executes a trouble monitoring process (step S9).

Figure 24:
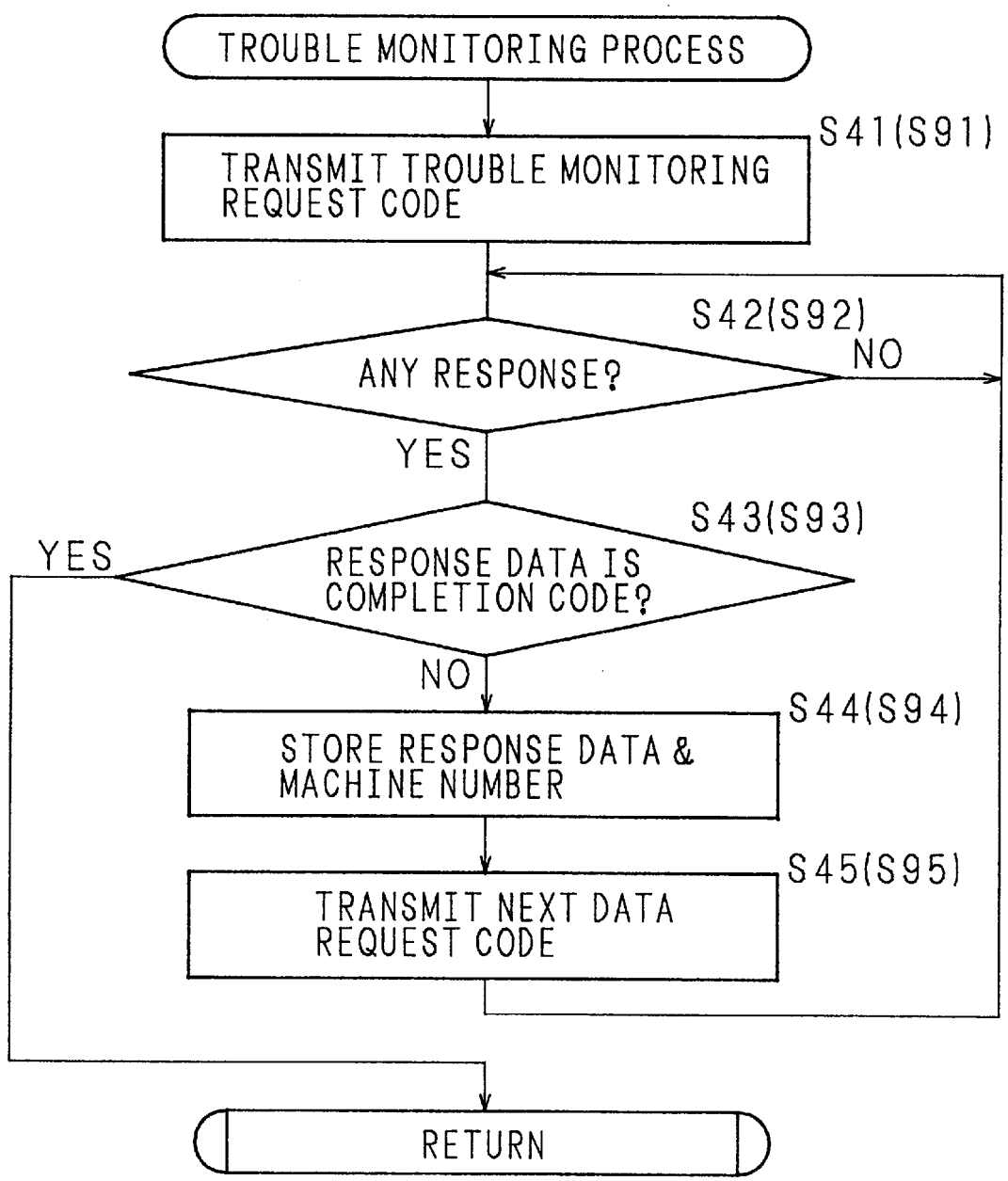
FIG. 24 is a flowchart of the procedure in a trouble monitoring process.
Figure 25:
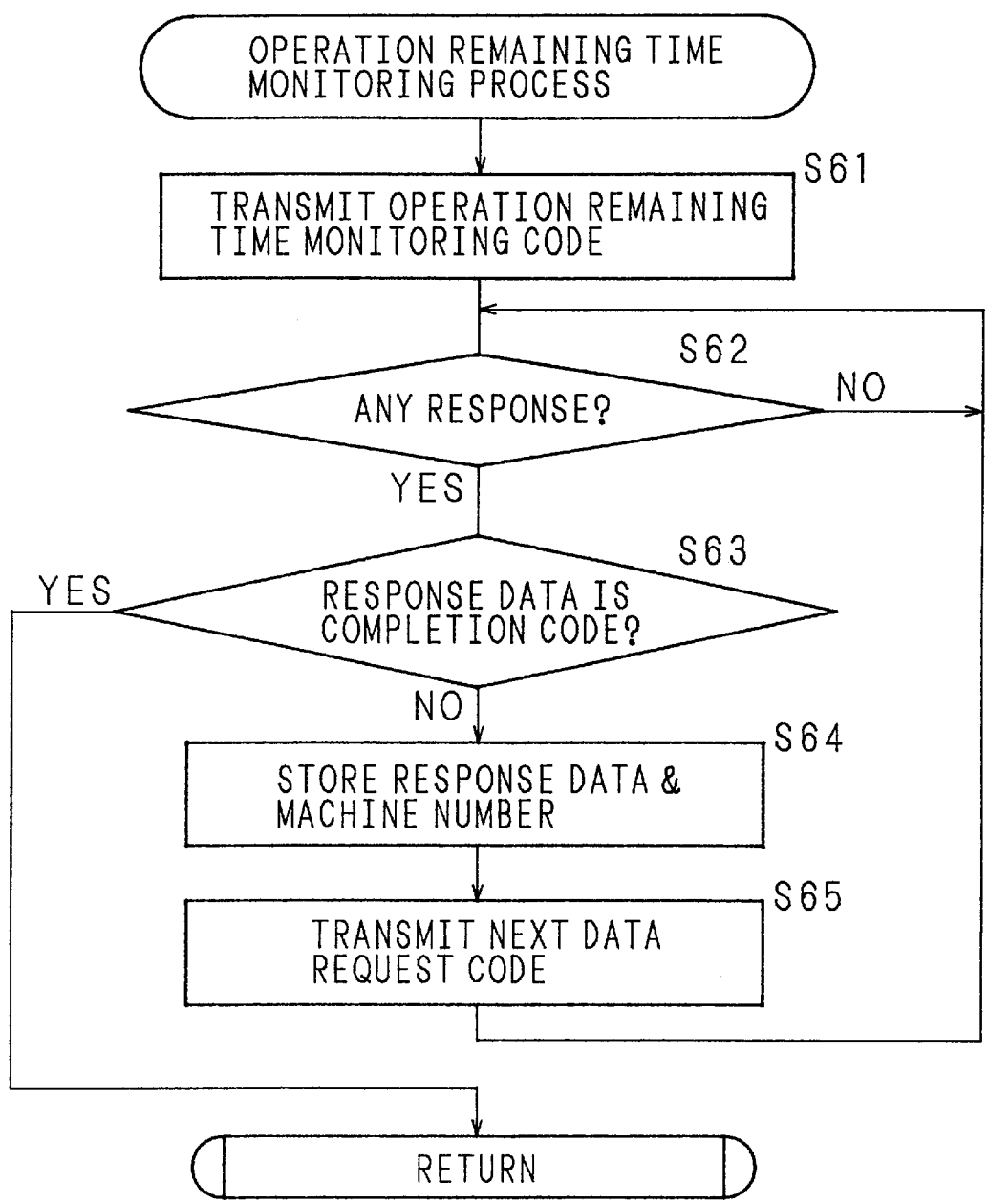
FIG. 25 is a flowchart of the procedure in a remaining operation time monitoring process.
Figure 26:
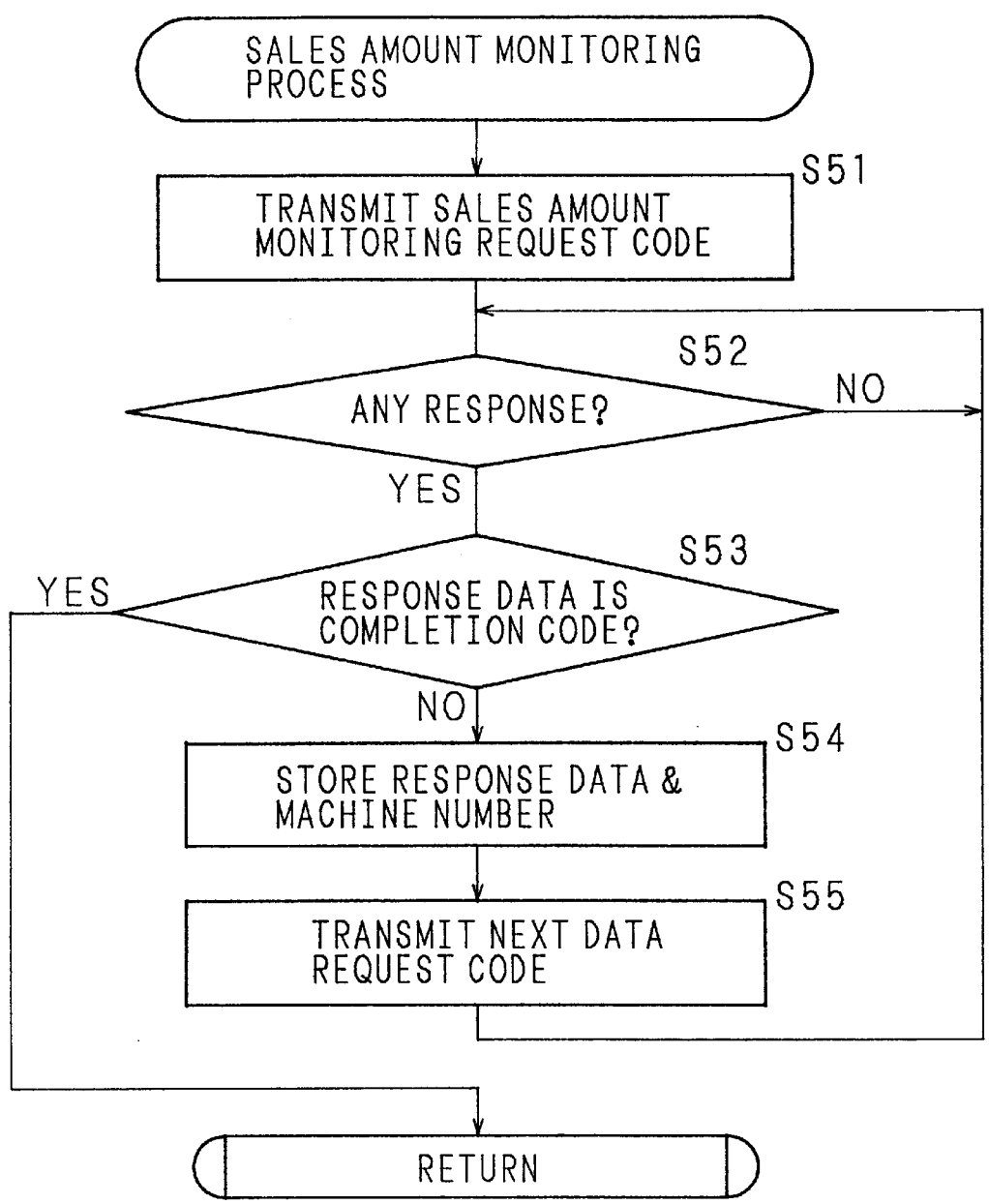
FIG. 26 is a flowchart of the procedure in a sales amount monitoring process.
Figure 27:
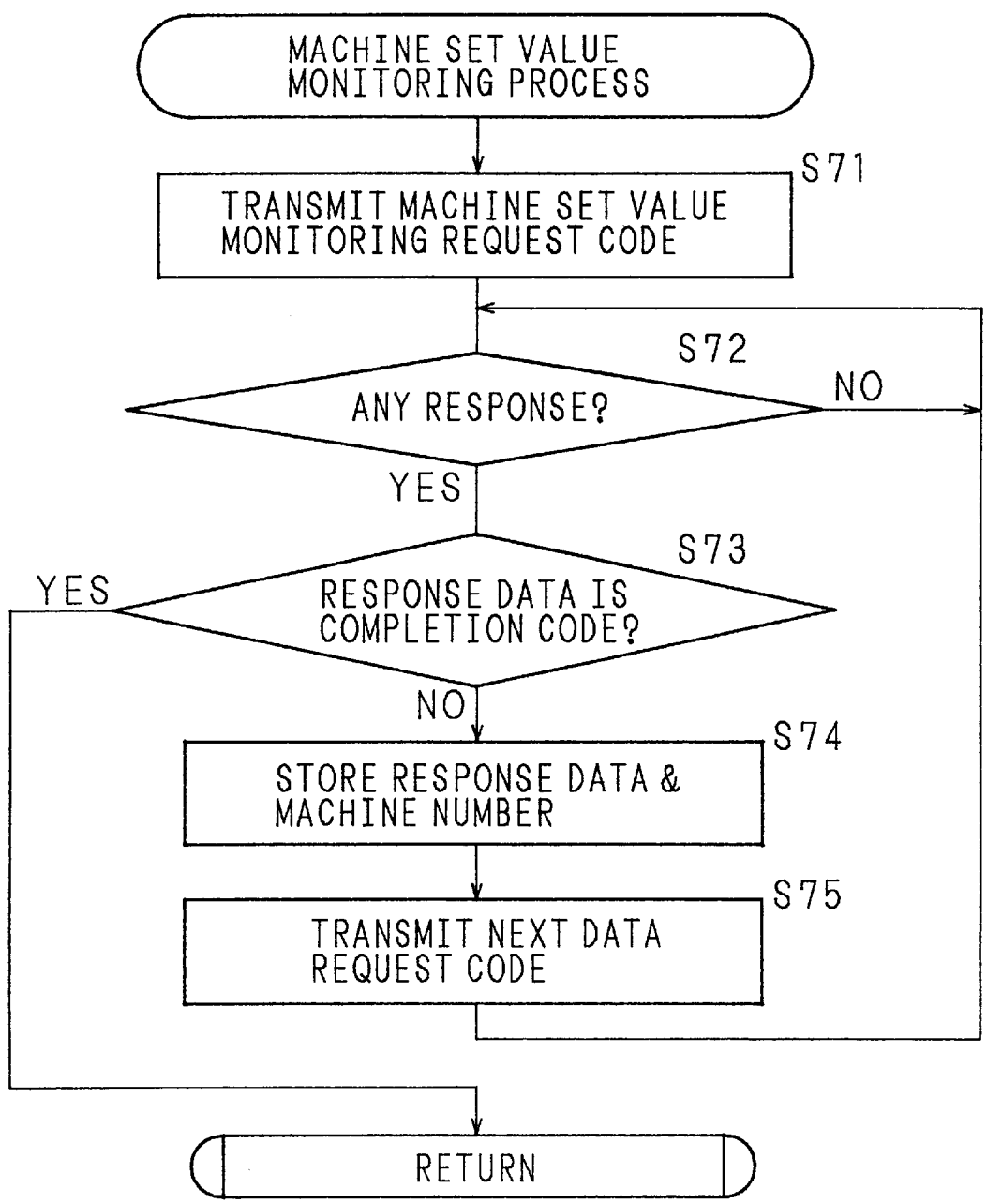
FIG. 27 is a flowchart of the procedure in a machine set value monitoring process.

FIG. 24 is a flowchart showing the procedure of the trouble monitoring process, FIG. 25 is a flowchart showing the procedure of the remaining operation time monitoring process, FIG. 26 is a flowchart showing the procedure of the sales amount monitoring process and FIG. 27 is a flowchart, showing the procedure of the machine set value monitoring process. Because the trouble monitoring process in steps of S4 and S9 are carried out in the similar way, both steps will be described together.

In the trouble monitoring process, as shown in FIG. 24, the central control apparatus 3 transmits the trouble monitoring request code (r) to the DTC 7 (steps S41, S91) and waits for the DTC 7 to make a response (steps S42, S92). Upon receiving the response from the DTC 7, the central control apparatus 3 checks the response to see whether it is an completion code (~) (steps S43, S93) and, when it is not the completion code, the central control apparatus 3 stores the response data together with the machine number in the memory 3e (steps S44, S94) and transmits the next data request code (a) (steps S45, S95). When the completion code is received as the response from the DTC 7 after the repeated transmission of the next data request codes and storing of the response data (steps S43, S93), the central control apparatus 3 terminates the trouble monitoring process and returns to a main routine shown in FIG. 17.

Figure 17:
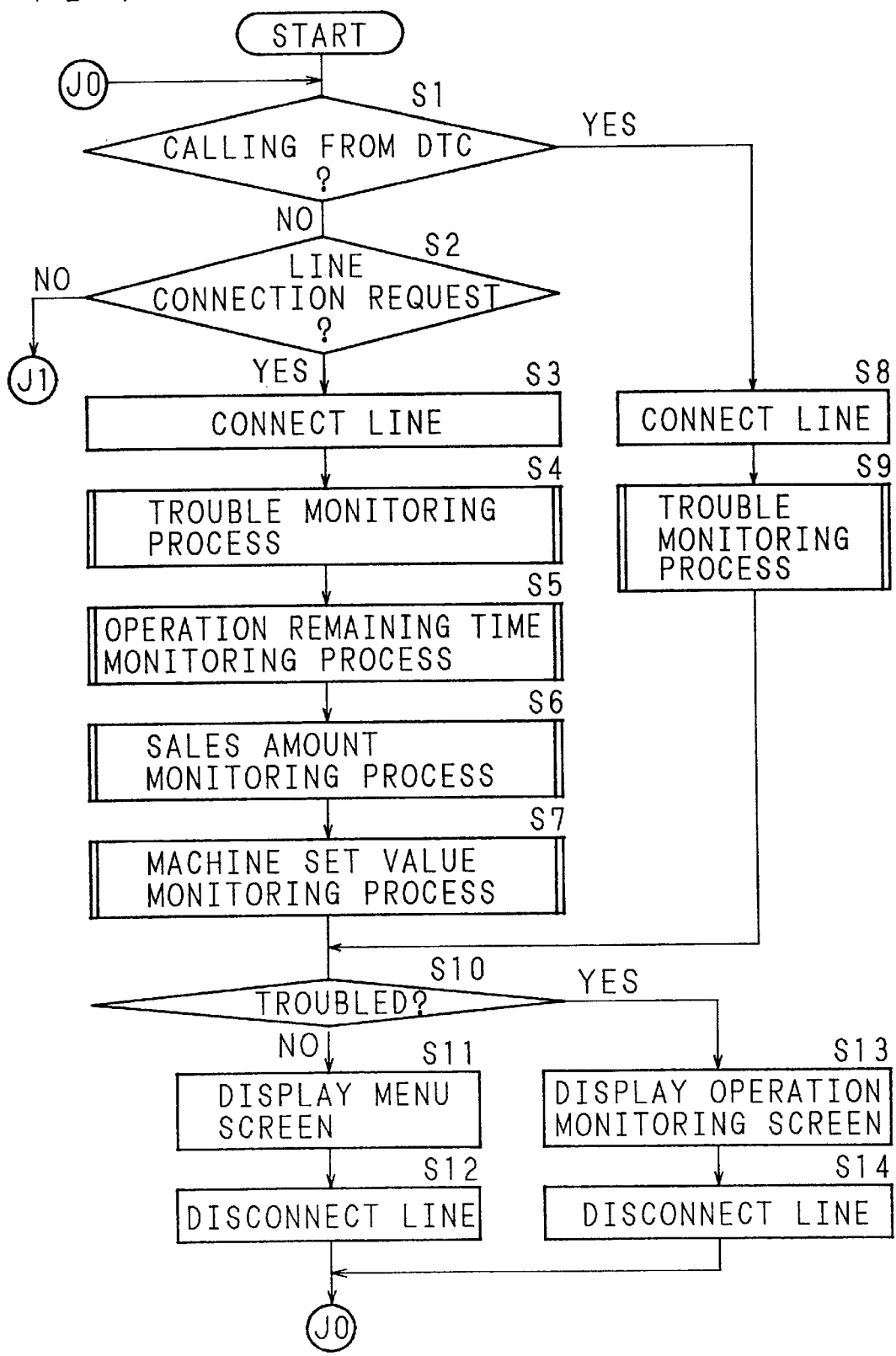
FIG. 17 is a flowchart of the operation in the central control apparatus of the remote management system of the invention.

In the remaining operation time monitoring process, sales amount monitoring process and machine set value monitoring process, as shown in FIGS. 25, 26, 27, the central control apparatus 3 transmits the remaining operation time monitoring request code (x), sales amount monitoring request code (q) and machine set value monitoring request code (j) to the DTC 7 (steps S51, S61, S71) and stores the response data together with the machine number in the memory 3e in the same way as the above-mentioned trouble monitoring process before returning to the main routine of FIG. 17 upon receiving the completion code (~) from the DTC 7 (steps S52 through S55, S62 through S65, S72 through S75).

When the trouble monitoring process (steps S4, S9), remaining operation time monitoring process (step S5), sales amount monitoring process (step S6) and machine set value monitoring process (step S7) are completed, the central control apparatus 3 detects whether the data stored in the memory 3e includes trouble data (step S10). When no trouble data is included, the central control apparatus 3 displays a menu screen, which is to be described later, on the display device 3b (step S11), then disconnects the line 5 from the DTC 7 (step S12) and returns to the step S1. When the trouble data is included, on the other hand, the central control apparatus 3 displays an operation monitoring screen to be described later on the display device 3b (step S13), then disconnects the line 5 with the DTC 7 (step S14) and returns to the step S1. Thus the line 5 is disconnected after the menu screen or the operation monitoring screen is displayed, thus suppressing the using frequency of the line 5 as low as possible.

FIG. 47 and FIG. 48 show the menu screen and operation monitoring screen, respectively. As shown in FIG. 47, the menu screen displays menus, i.e., monitoring of the sales amount, monitoring of the operation, checking of set values, updating of set values of the machine and a trouble diagnosis by the I/O port. When one of these menus is selected, the sales amount monitoring screen, operation monitoring screen, machine set value monitoring screen or trouble shooting screen by the I/O port is displayed on the display device 3b by the central control unit 3a based on the data stored in the memory 3e.

In the operation monitoring screen, as shown in FIG. 48, the operation state (run/stop), remaining operation time and presence/absence of troubles are displayed for each dryer 8 in response to a command input of the trouble monitoring and remaining operation time monitoring, and displays the type of the trouble (trouble code) for which the trouble detection flag 81a is set. As the personnel selects the number of the dryers 8 in trouble and selects the "CANCEL TROUBLE" displayed at the bottom of the screen, the central control apparatus 3 clears the set trouble detection flag 81a as will be described later, so that the dryer 8 is automatically restarted when the trouble is completely treated.

Figure 18:
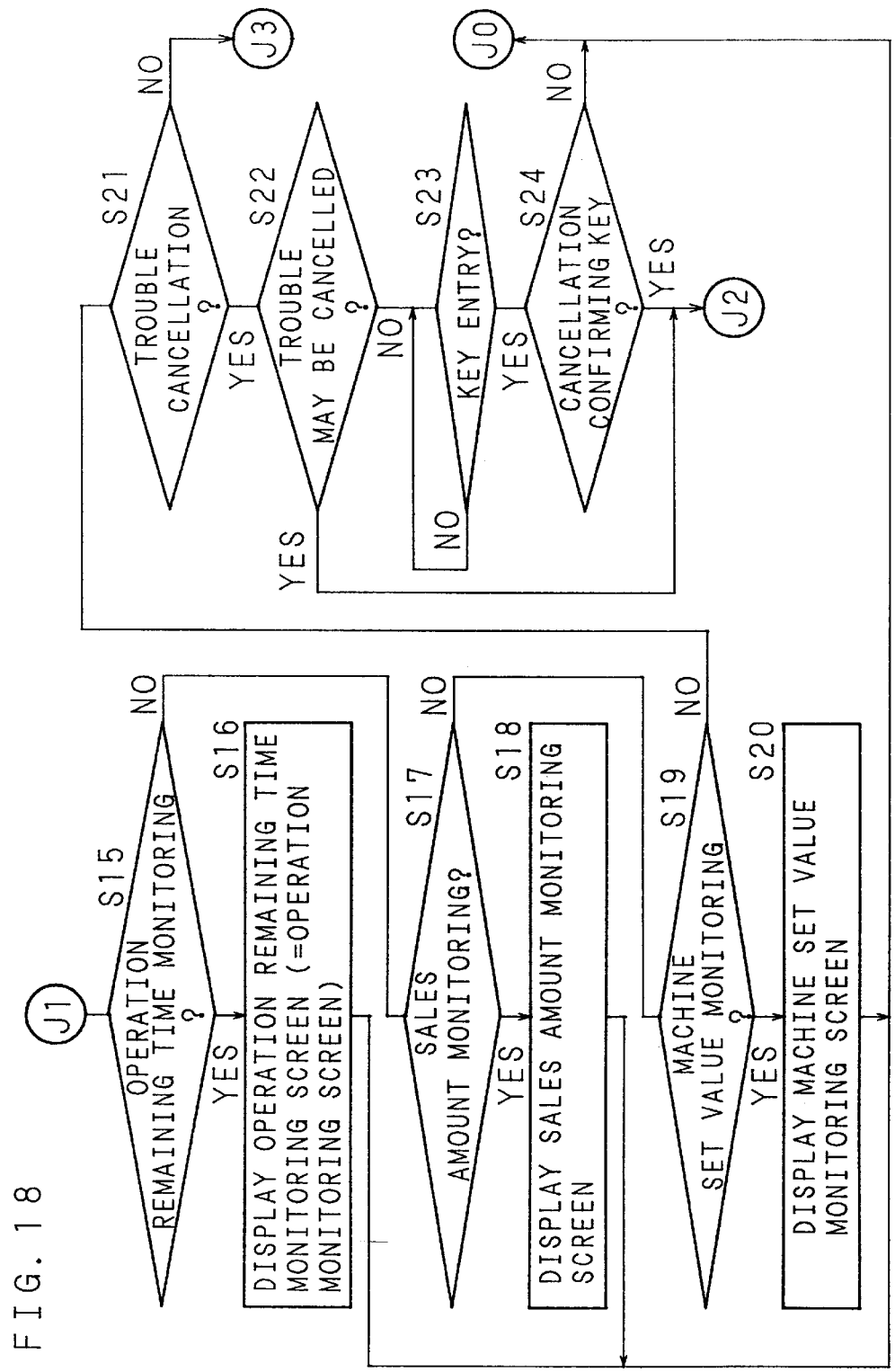
FIG. 18 is a flowchart of the operation in the central control apparatus of the remote management system of the invention.
Figure 19:
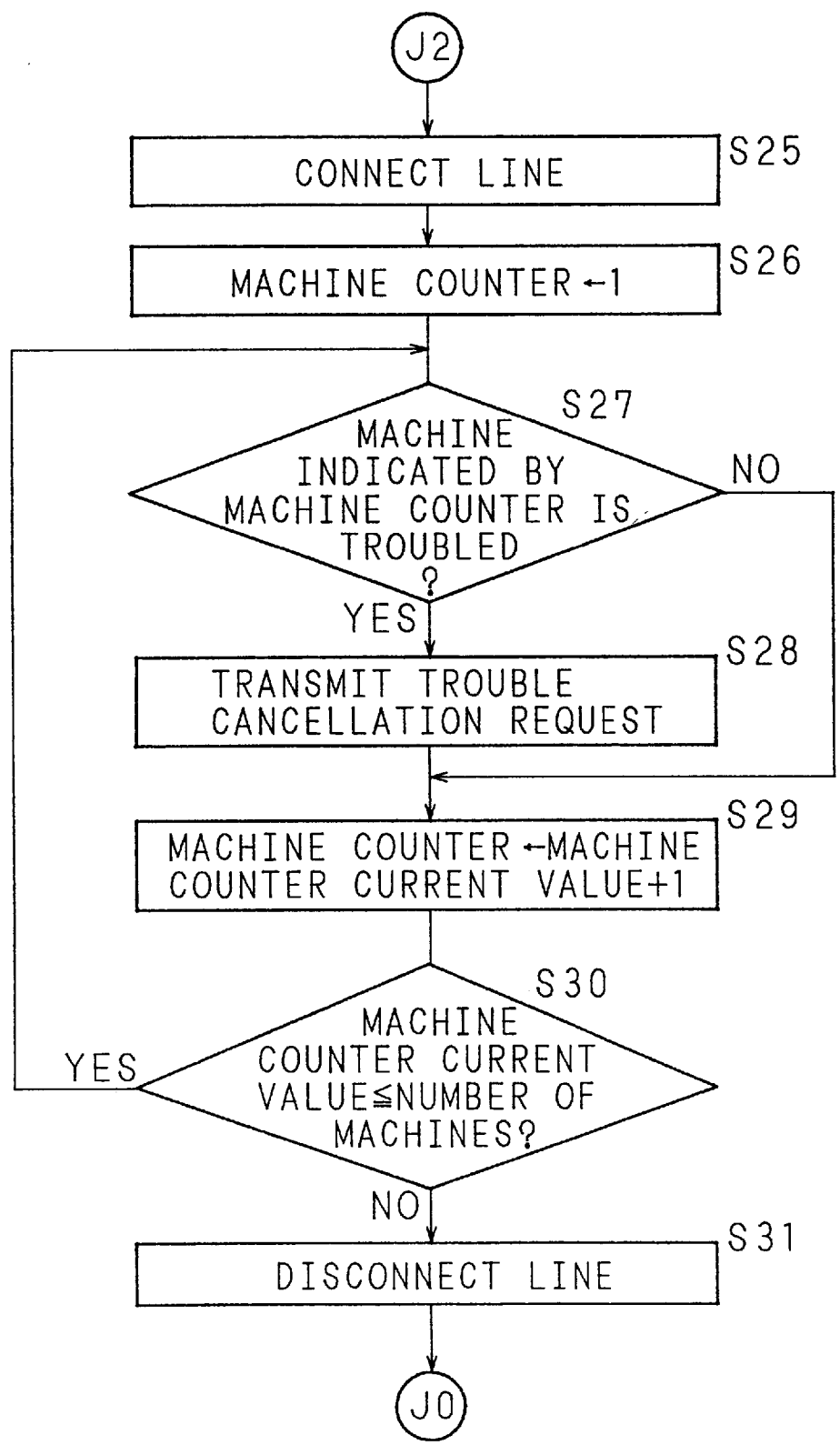
FIG. 19 is a flowchart of the operation in the central control apparatus of the remote management system of the invention.
Figure 20:
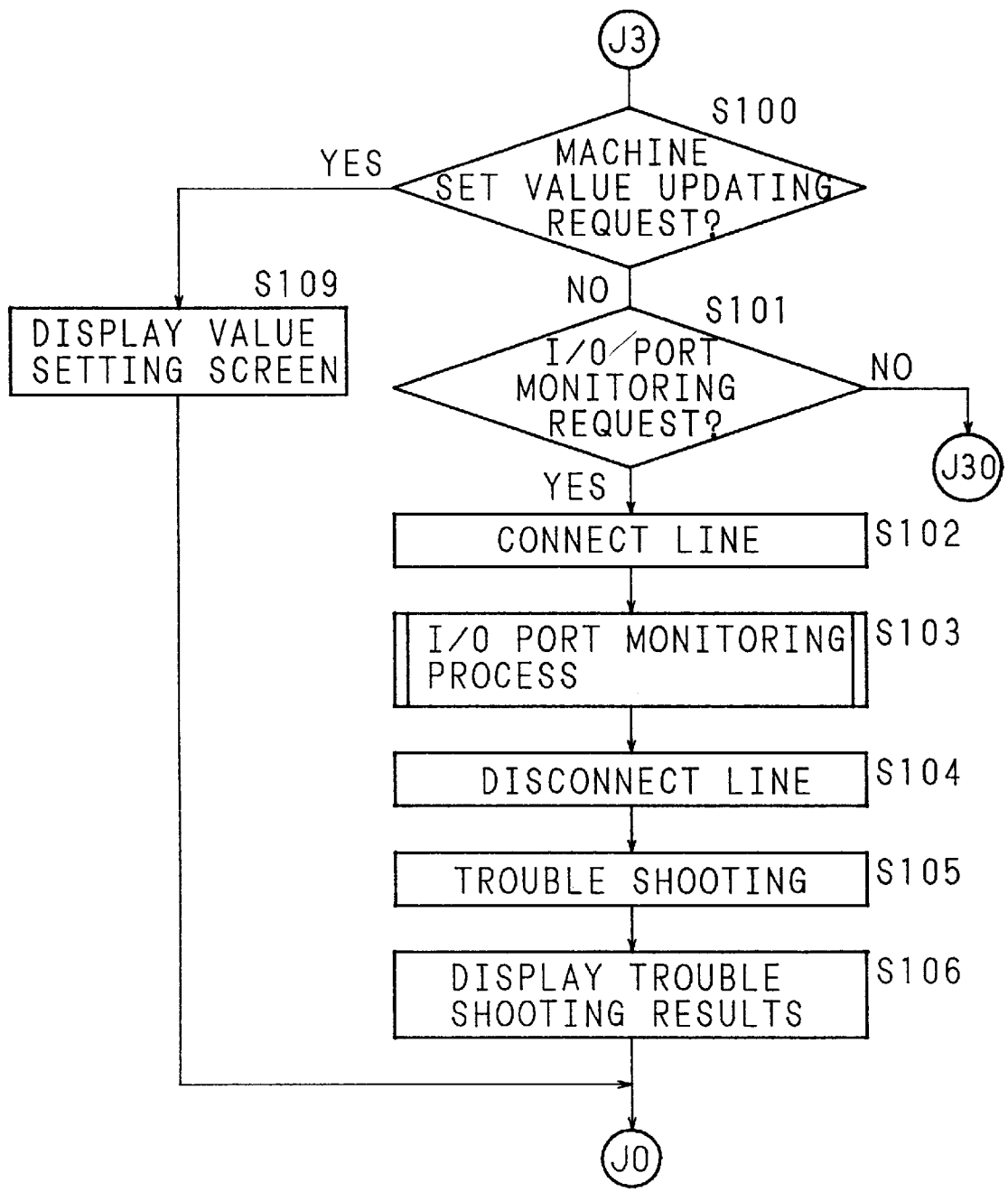
FIG. 20 is a flowchart of the operation in the central control apparatus of the remote management system of the invention.

After the menu screen or the operation monitoring screen is displayed and the line 5 is disconnected (steps S11, S12 or steps S13, S14), the operation proceeds in the following procedure. As indicated in FIG. 18, it is checked whether a key to monitor the remaining operation time is pressed on the input device 3c on the menu screen (step S15). When the key is manipulated, the remaining operation time monitoring screen serving also as the operation monitoring screen is displayed (step S16) and the procedure returns to the step S1. In case where no manipulation of the key to monitor the operation is present in the step S15, it is checked whether a key to select the sales amount monitoring is manipulated on the input device 3c on the menu screen (step S17). If the key operation is detected, the sales amount monitoring screen is displayed (step S18) and then the procedure returns to the step S1.

FIG. 49 and FIG. 50 show the sales amount monitoring screens. When the sales amount monitoring is selected on the menu screen, the total sales amount of every dryer 8 disposed in the laundrette 2 is displayed as shown in FIG. 49. When the dryer number and the "VIEW DETAILS" are selected in this screen, the sales amount paid with coins and the sales amount by cards are displayed for each of the upper and lower dryers as shown in FIG. 50.

In case where no key input for the selection of the sales amount monitoring is made in the step S18, it is checked whether a key input to select the machine set values monitoring is present on the input device 3c on the menu screen (step S19) and, when the key input is present, the machine set value monitoring screen is displayed (step S20) and the procedure returns to the step S1.

FIG. 51 shows the machine set value monitoring screen. Preset values such as machine specifications, operation time and types of coins acceptable (coin port), basic rates set by the DIP switch 96 and set values such as to finely adjust the rotational speed of the drum set by the DIP switch 96 are displayed for every laundrette 2 and for each dryer 8.

In case where the operation monitoring screen is displayed in the steps S13 and S16, the operation proceeds to step S21, where it is checked whether the "CANCEL TROUBLE" is selected on the operation monitoring screen (step S21). When the "CANCEL TROUBLE" is selected, the kind or type of the trouble to be canceled is checked. More specifically, it is checked whether it is the kind of troubles allowing the prompt clearing of the trouble detection flag 81a without a confirmation from the operator which are preliminarily stored in the memory 3e of the central control apparatus 3 (for example, E1 and E2 or E7 shown in Tables 10 and 11) (step S22). When the trouble is coincident with the kind, the line 5 is immediately connected to transmit a flag clearing request to the DTC 7 (step S25). When the trouble is detected not to agree with the kind stored in the memory 3e in the step S22, that is, when the trouble detection flag 81a should not be cleared without an instruction of the operator, a message asking the operator to confirm the cancellation of the trouble is displayed on the screen and the system enters in a waiting mode until the operator manipulates a key (step S23). When a key is depressed on the input device 3c, whether it is a cancellation confirmation key input is checked (step S24). When it is the cancellation confirmation key, the operation proceeds to step S25. Otherwise, the procedure returns to the step S1.

In case where the trouble is one of the kinds of troubles that allow the automatic resumption of the operation of the dryer 8 without the confirmation input from the operator, as the line is connected in the step S25, the central control apparatus 3 sets a value one to the machine counter 3f thereof (step S26) and checks whether the value of the machine counter 3f agrees with the number of the dryers 8 selected with the trouble to be canceled (step S27). When the both values agree, the central control apparatus 3 transmits the trouble cancellation requesting command together with the value of the counter 3f, namely, the machine number added thereto to the DTC 7 (step S28) and increments the value of the counter 3f by one after receiving a response indicating the completion of the flag clearing from the DTC 7 (step S29). If the values do not agree in the step S27, the central control apparatus 3 skips to the step S29 and increments the value of the counter 3f by one. Then the central control apparatus 3, comparing the current value of the machine counter 3f with the total number of the dryers 8 in the laundrette 2 (step S30), repeats the operations from the steps S27 to S29 until these values agree. When the values agree with each other, the central control apparatus 3 disconnects the line 5 (step S31) and returns to the step S1.

Figure 52:
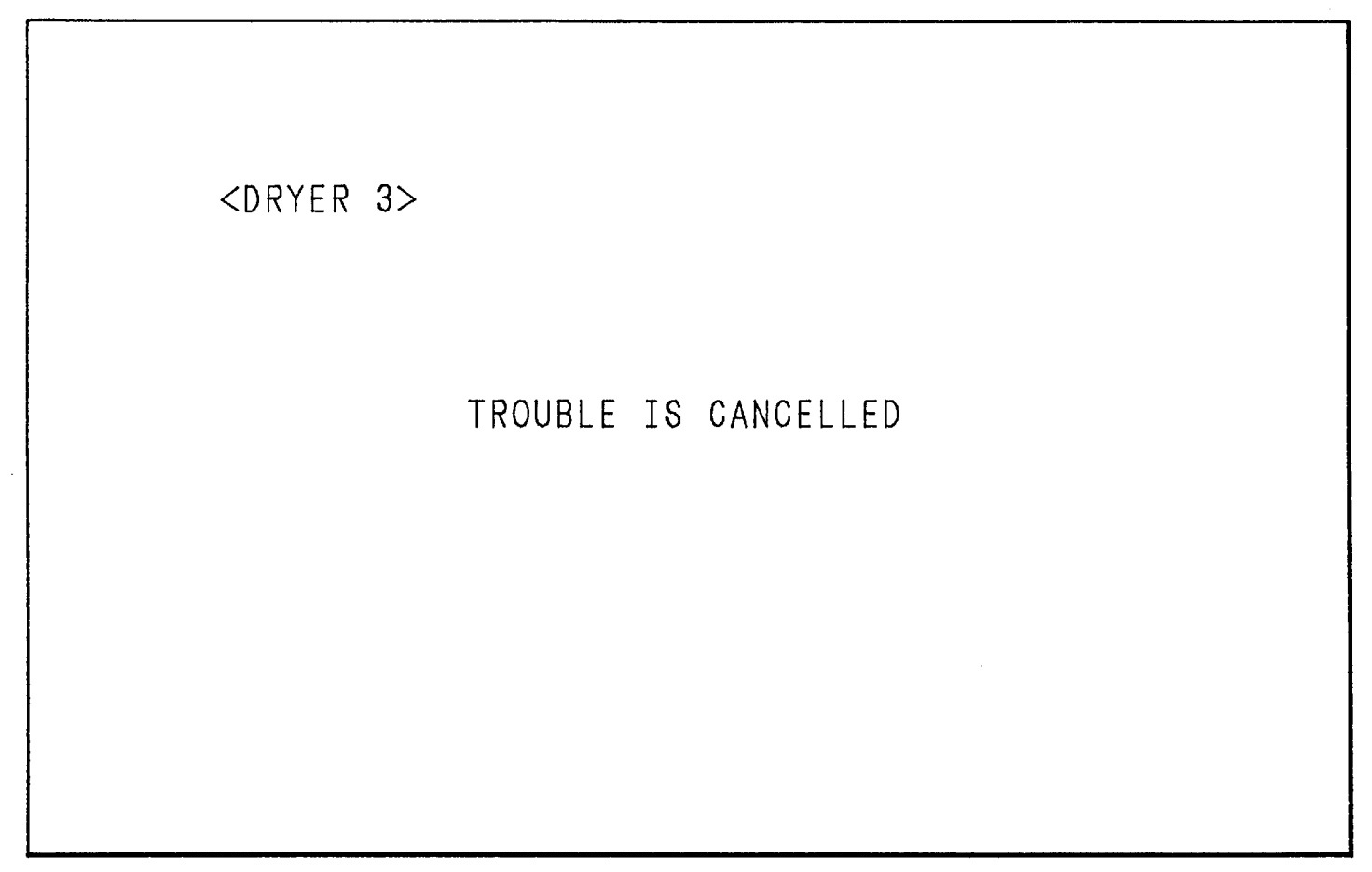

FIG. 52 shows the display screen of the central control apparatus 3 after the trouble is canceled. As shown in FIG. 52, the central apparatus 3 displays the number of the dryers 8 that transmitted the trouble canceling request together with a message that the trouble has been canceled, after receiving a response from the DTC 7.

Figure 53:
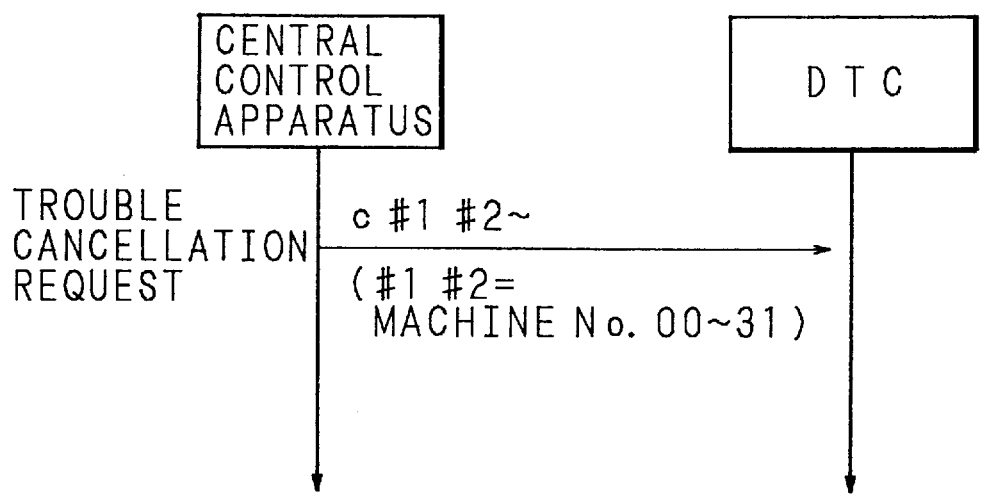
FIG. 53 is a sequence diagram of data communications between the central control apparatus and the DTC.
Figure 54:
FIG. 54 is a frame structure diagram of a trouble cancellation requesting command from the central control apparatus to the DTC.

FIG. 53 is a sequence diagram of data communications via the public telephone line 5 between the central control apparatus 3 and the DTC 7, and FIG. 54 is a frame structure diagram of the trouble cancellation requesting command transmitted from the central control apparatus 3 to the DTC 7 as described previously. As shown in FIG. 54, the trouble cancellation requesting command comprising the first byte holding at trouble canceling request code (c), the lower four bits of both the second the third bytes respectively holding the value of the second digit and the value of the tens and units of the number of the dryers with the trouble to be canceled, and the fourth byte holding the data completion code is transmitted from the central control apparatus 3 to the DTC 7 as shown in FIG. 53.

When the canceling of the trouble is not selected in the step S21, the central control apparatus 3 proceeds to the step S100 and detects whether a machine set value updating request is made on the menu screen (step S100). When the request is not made, it is checked whether the diagnosis by way of monitoring the I/O port of the microcomputer 8a is made on the menu screen (step S101). When the request is made, the central control apparatus 3 connects the line 5 (step S102) and executes the I/O port monitoring process (step S103).

Figure 28:
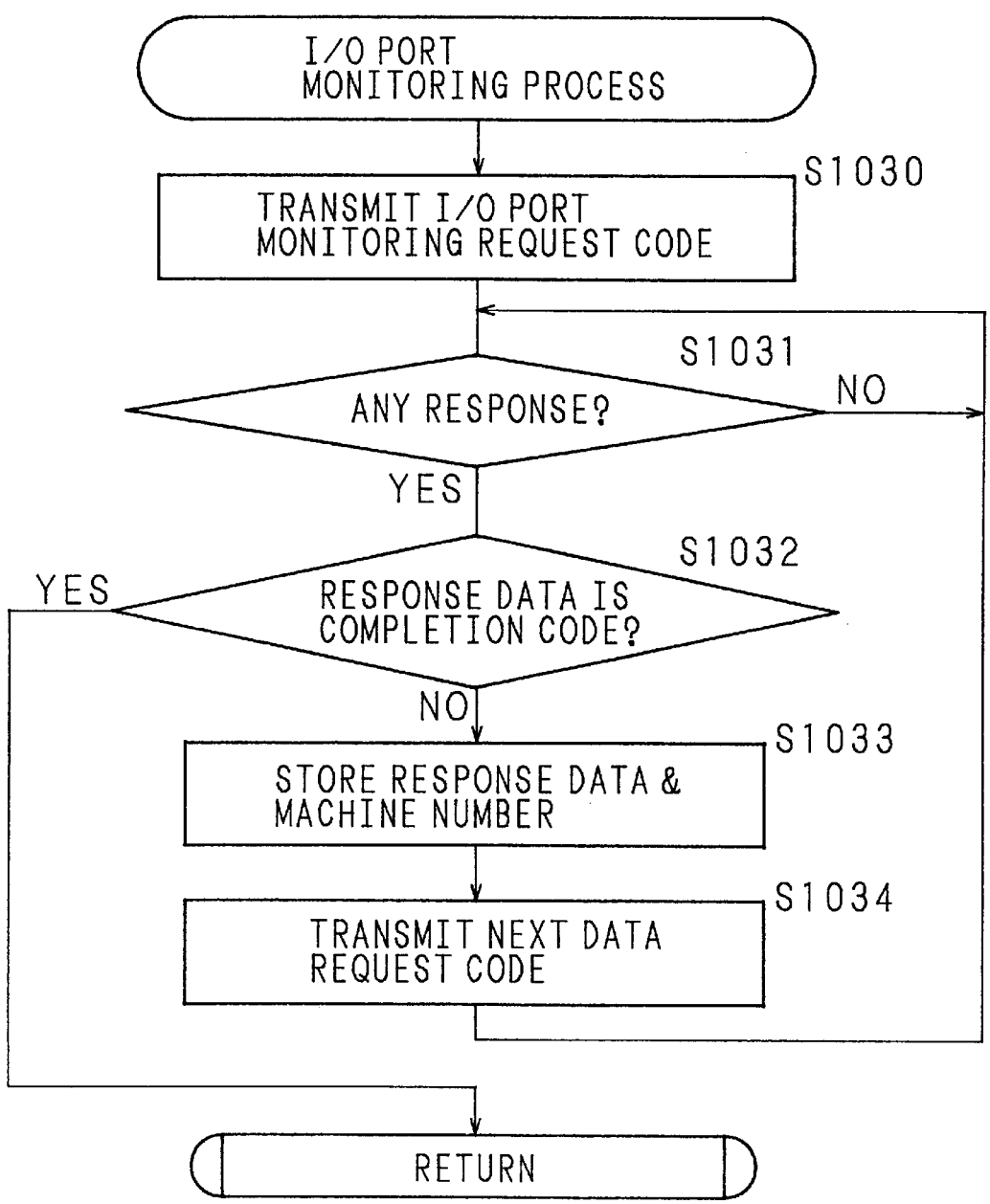
FIG. 28 is a flowchart of the procedure in an I/O (Input/Output) port monitoring process.

FIG. 28 is a flowchart showing the procedure of the I/O port monitoring process. The central control apparatus 3 transmits the I/O port monitoring request code to the DTC 7 (step S1030) and waits until the DTC 7 responds (step S1031). When the DTC 7 responds, the central control apparatus 3 judges whether the response is the completion code (step S1032) and, stores the response data of the DTC 7 and the machine number in the memory 3e unless it is the completion code (step S1033). Then the central control apparatus 3 transmits the next data request code to the DTC 7 (step S1034). The central control apparatus 3 subsequently and repeatedly performs the process of transmitting the next data request code and storing the response data of the DTC 7 and, when the response of the DTC 7 is the completion code (step S1032), completes the I/O port monitoring process and returns to the start.

When the I/O port monitoring process is completed, the line 5 is disconnected (step S104). The memory 3e of the central control apparatus 3 contains a pattern of the input/output levels of the I/O port of the microcomputer 8a during the normal operation of the dryer 8 stored therein beforehand, and the control unit 3a of the central control apparatus 3 compares the I/O port level pattern transmitted from each dryer 8 and the normal pattern stored in the memory 3e thereby diagnosing the abnormality of parts of the dryer 8 (step S105). For instance, although an instruction signal to drive the load of the dryer 8 is outputted from the output port of the microcomputer 8a, if the signal from the sensor at the load is not inputted to the input port, the I/O port level pattern is turned to be different from the normal pattern and therefore it can be diagnosed that the abnormality is given rise to a part related to the load of the abnormal pattern. A message showing the result of the trouble shooting (diagnostic report) is displayed on the display device 3b of the central control apparatus 3 (step S106) and the operation returns to the step S1.

Figure 58:
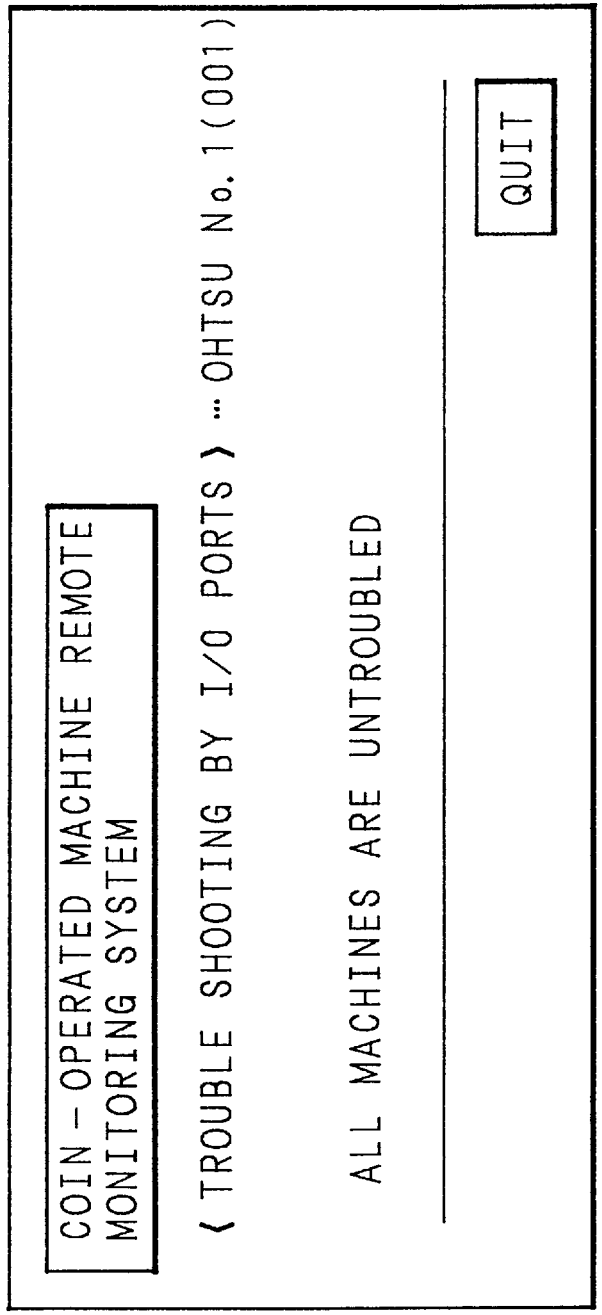
FIG. 58 is a diagram showing a screen of the result of a diagnosis (no failure found) by the I/O port monitoring.

FIG. 57 and FIG. 58 show screens displaying the result of diagnoses by the I/O port monitoring, FIG. 57 showing a screen in the case of a trouble and FIG. 58 showing a case without a trouble. When the input level corresponding to the output level of the microcomputer 8a to the drum of the dryer 8 is different from the normal pattern as shown in FIG. 57, for example, the laundrette name where the dryer 8 is installed, the number of the dryers 8 and the input/output level of the I/O port are displayed on the screen and, at the same time, the state of the output/input level and the position to be inspected in a part where the abnormality is detected are displayed as the diagnosis report. When all the dryers 8, 8 . . . of the laundrette 2 subjected to the I/O port monitoring show no abnormality as indicated in FIG. 58, on the other hand, normality message is displayed as the result of the trouble shooting.

Figure 55:
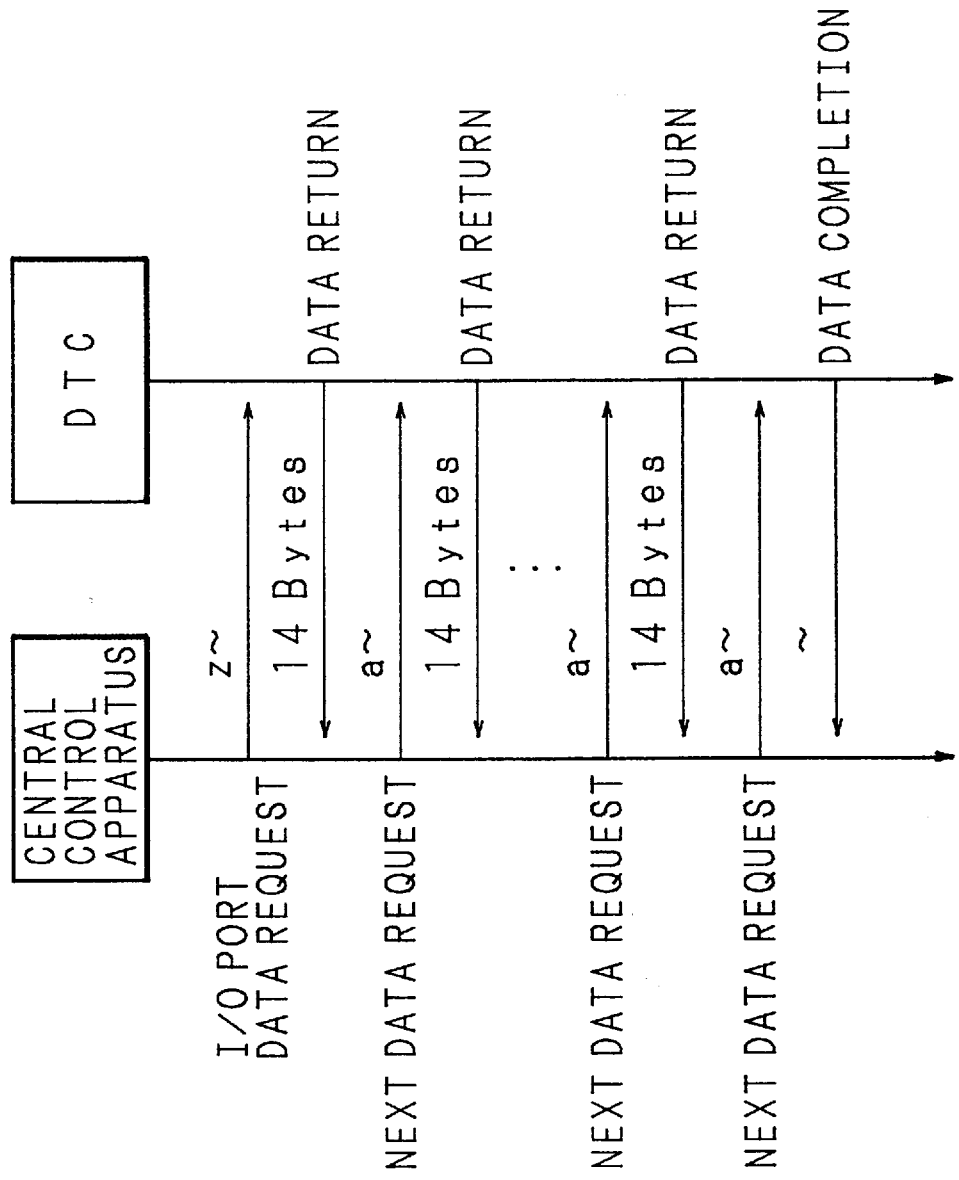
FIG. 55 is a sequence diagram of data communications related to monitoring of an I/O port between the central control apparatus and the DTC.

FIG. 55 is a sequence diagram of data communications related to the I/O port monitoring carried out between the central control apparatus 3 and the DTC 7 via the public telephone line 5, and FIG. 56 is a frame structure diagram of data returned by the DTC 7 in response to the I/O port monitoring request. As shown in FIG. 55, when the central control apparatus 3 transmits the I/O port monitoring request code (z) and the data completion code (~), the DTC 7 returns the I/O port data of the dryer 8 having the highest priority. The returned data is 14 bytes long, as is clearly shown in FIG. 56, with the first and the second bytes representing the number of the dryers 8, the third through eighth bytes representing the I/O port level of the lower drying chamber 82 and the ninth through fourteenth bytes representing the I/O port level of the upper drying chamber 81. When the DTC 7 returns the data of the dryer 8 of the second highest priority in response to the next data request from the central control apparatus 3, and the data completion code (~) is returned alone, the central control apparatus 3 completes the communication.

When the machine set value updating is requested in the step S100, the central control apparatus 3 displays the machine set value updating screen to be described later, on the display device 3b (step S109).

FIG. 59 shows the machine set value updating screen. This screen displays a menu for separate setting for each individual machine, collective setting by the type of machine and collective setting of all machines in the laundrette, from which the operator selects one of the selection methods through the input device 3c in the central control apparatus 3.

Figure 21:
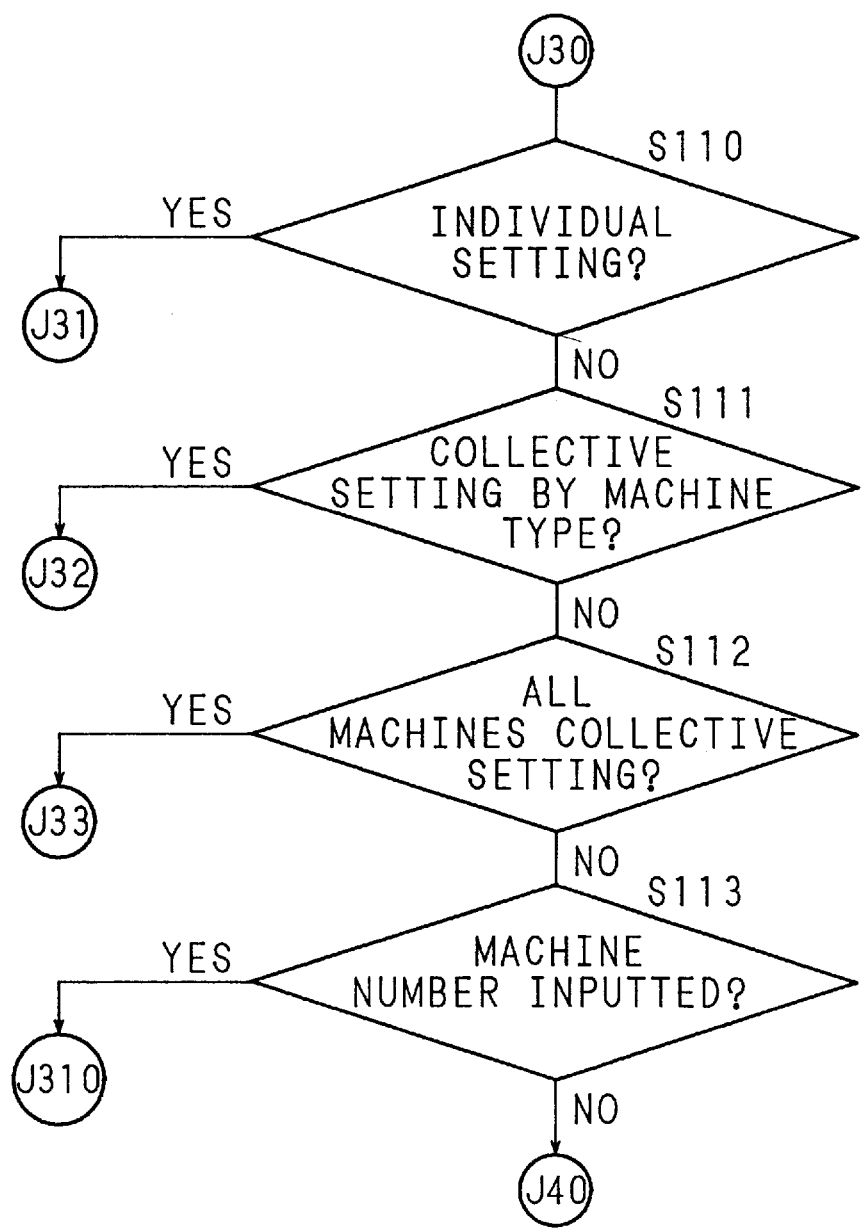
FIG. 21 is a flowchart of the operation in the central control apparatus of the remote management system of the invention.
Figure 22:
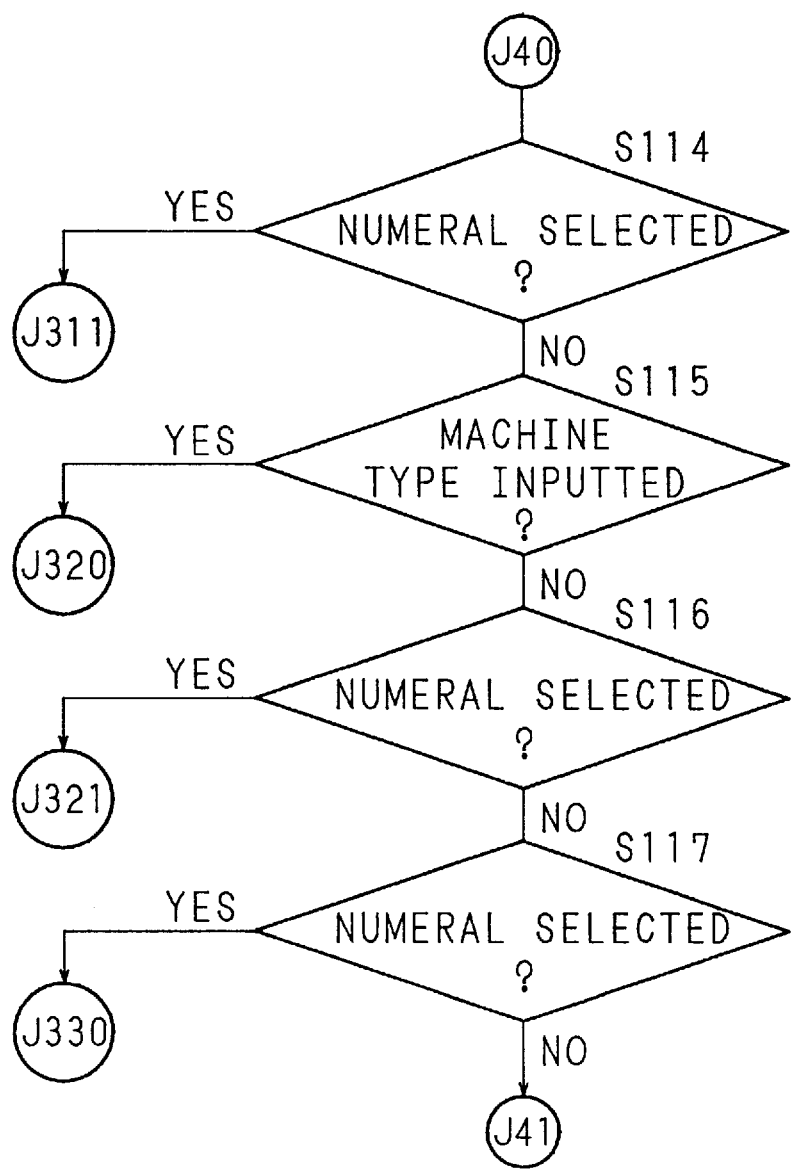
FIG. 22 is a flowchart of the operation in the central control apparatus of the remote management system of the invention.
Figure 29:
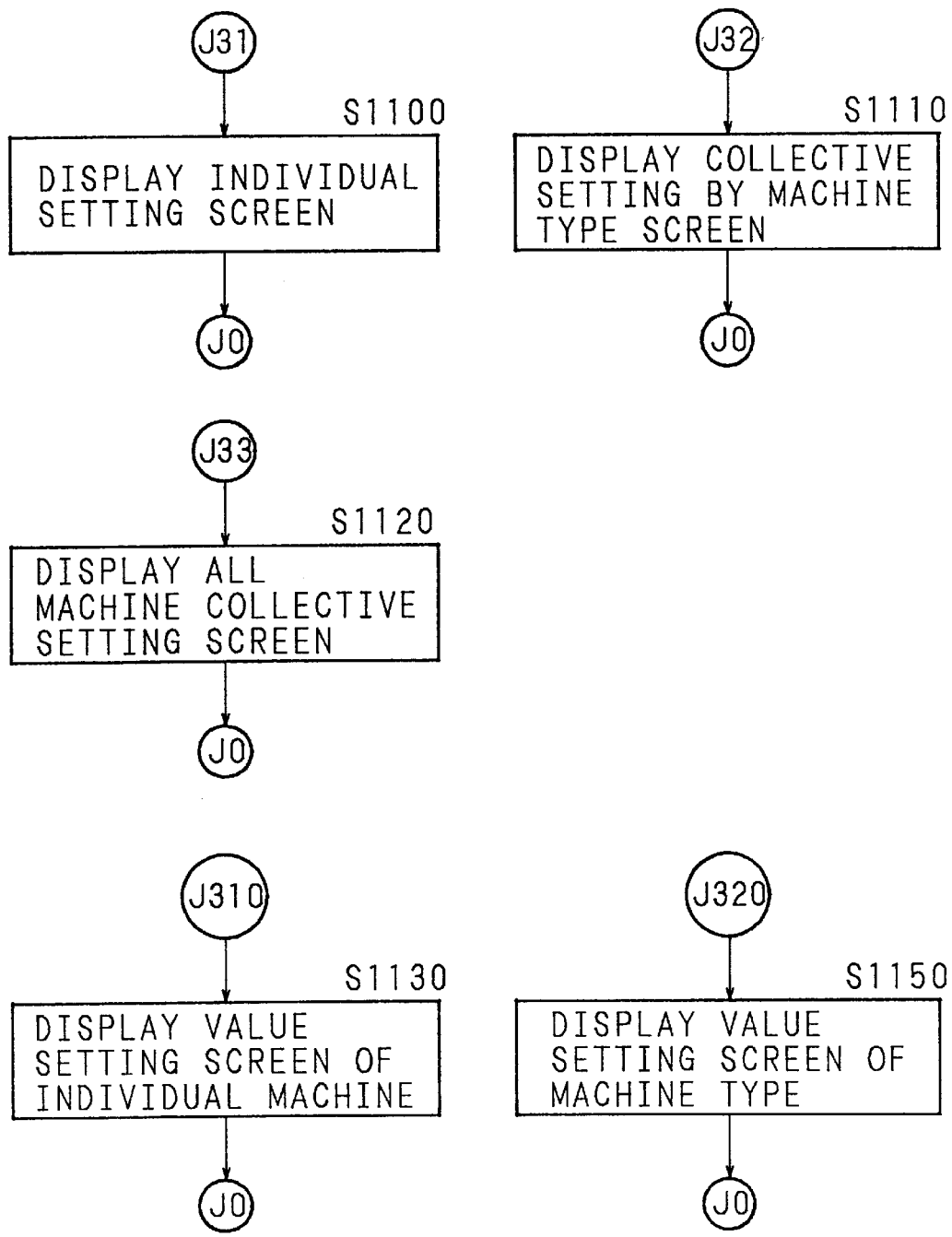
FIG. 29 is a flowchart of the operation in the central control apparatus of the remote management system of the invention.

The central control apparatus 3 detects if the individual setting is selected (step S110), the collective setting by the machine type is selected (step S111) or the collective setting of all machines (step S112) is selected on the menu screen as shown in FIG. 21, and displays the individual setting screen, the collective setting screen by the machine type or the collective setting screen of all machines as shown in FIG. 29 according to the selected setting method (steps S1100, S1110, S1120).

FIG. 60, FIG. 62 and FIG. 64 show machine selection screens for the individual setting, a machine type selection screen for the collective setting by the machine type and a setting screen for the collective setting of all machines, respectively. As shown in FIG. 60 and FIG. 62, the machine selection screen for the individual setting and the machine type selection screen for the collective setting by the machine type display the number and the type or model name of the machine (clothes-washer, dryer) installed in the laundrette. The setting screen for the collective setting of all machines display setting items, numerical value setting blanks and others as shown in FIG. 64.

In the individual setting screen or in the collective setting screen by the machine type, it is detected which dryer number or machine type is selected (steps S113, S115) and the screen of the setting items corresponding to the selected dryer or the machine type is displayed (steps S1130, S1150).

Figure 61:
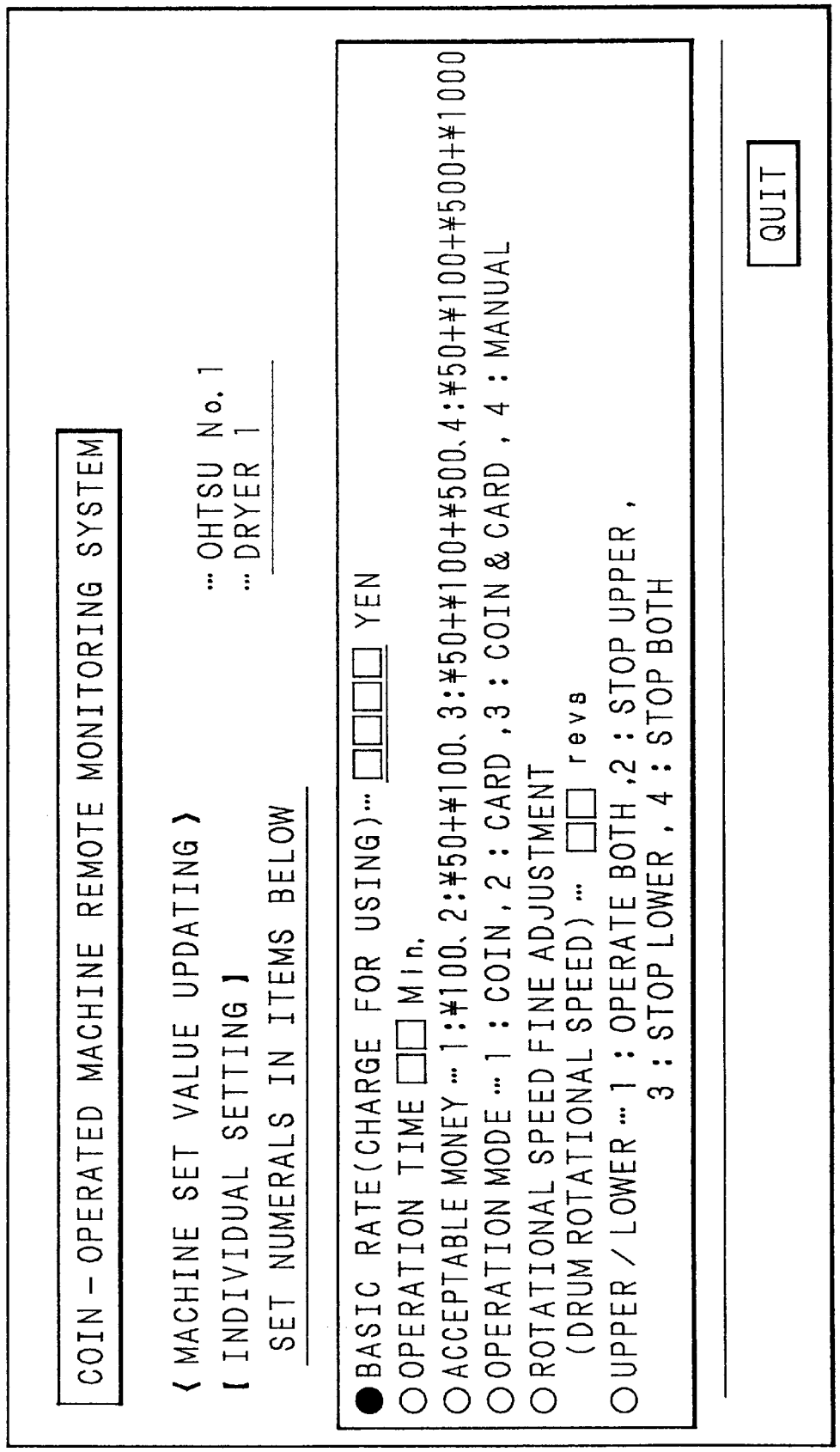
FIG. 61 is a diagram showing a screen of items for individual setting of the machine.

FIG. 61 and FIG. 63 show the setting screens for the individual setting and the collective setting by the machine type, respectively. As shown in these drawings, the screen displays the selected dryer number or the machine type and the setting items, etc. The central control apparatus 3 detects whether a numeral is selected in the individual setting item screen, the setting item screen by the machine type or the collective setting screen of all machines (steps S114, S116, S117). If a numeral is selected, the central control apparatus 3 carries out the operations described below to change the set value stored in the set value memory 82a of the microcomputer 8a.

Figure 30:
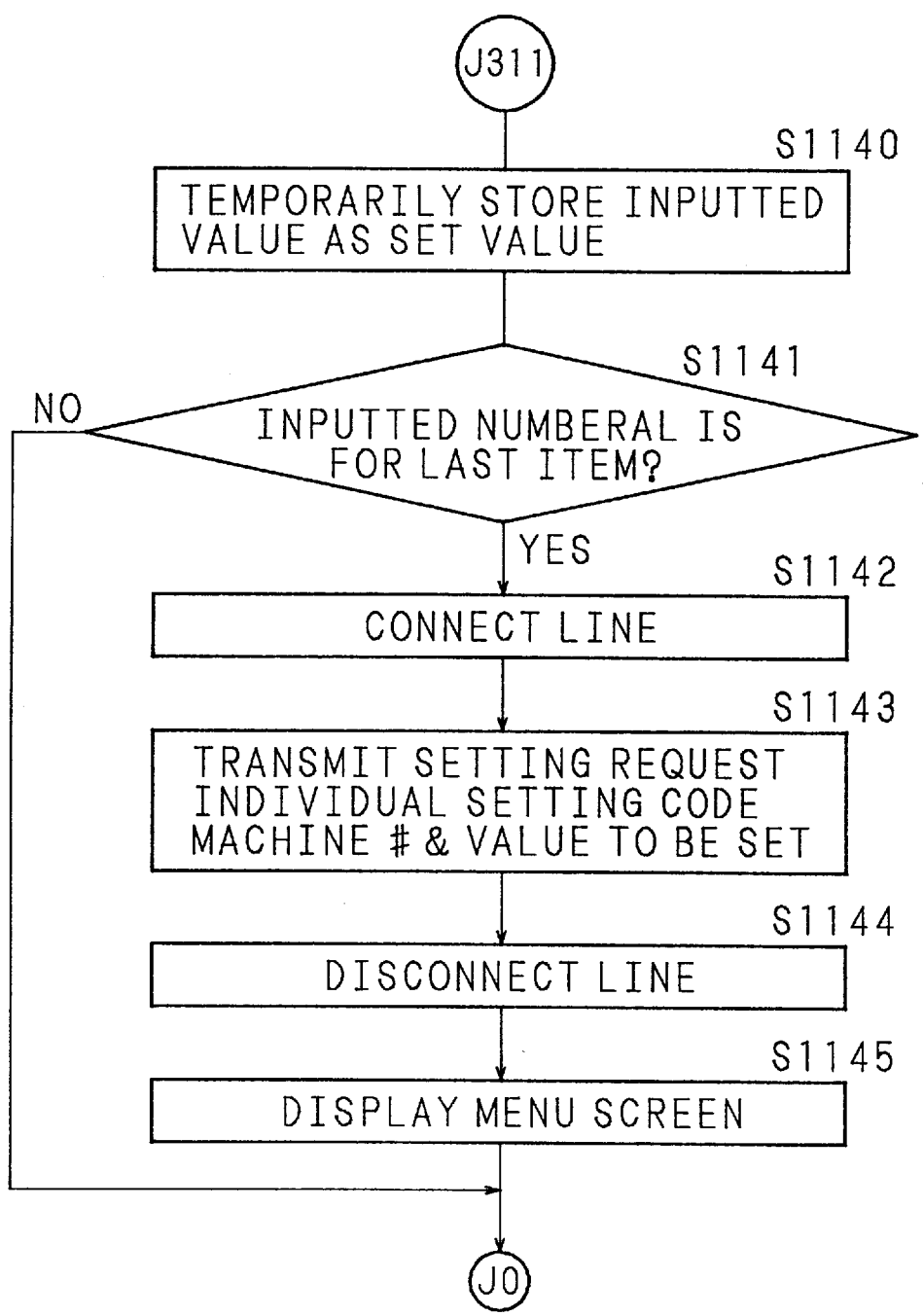
FIG. 30 is a flowchart of the operation in the central control apparatus of the remote management system of the invention.
Figure 31:
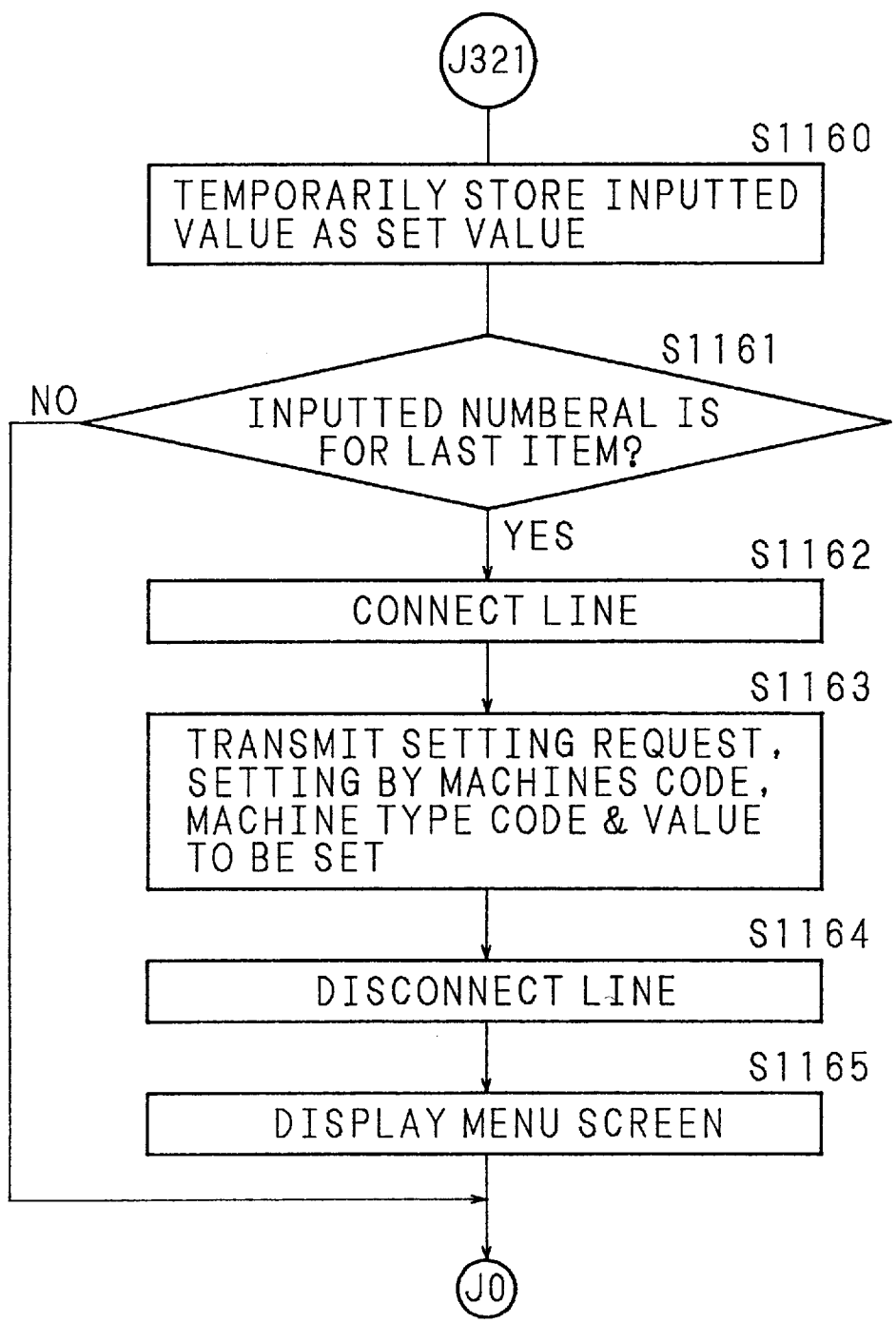
FIG. 31 is a flowchart of the operation in the central control apparatus of the remote management system of the invention.
Figure 32:
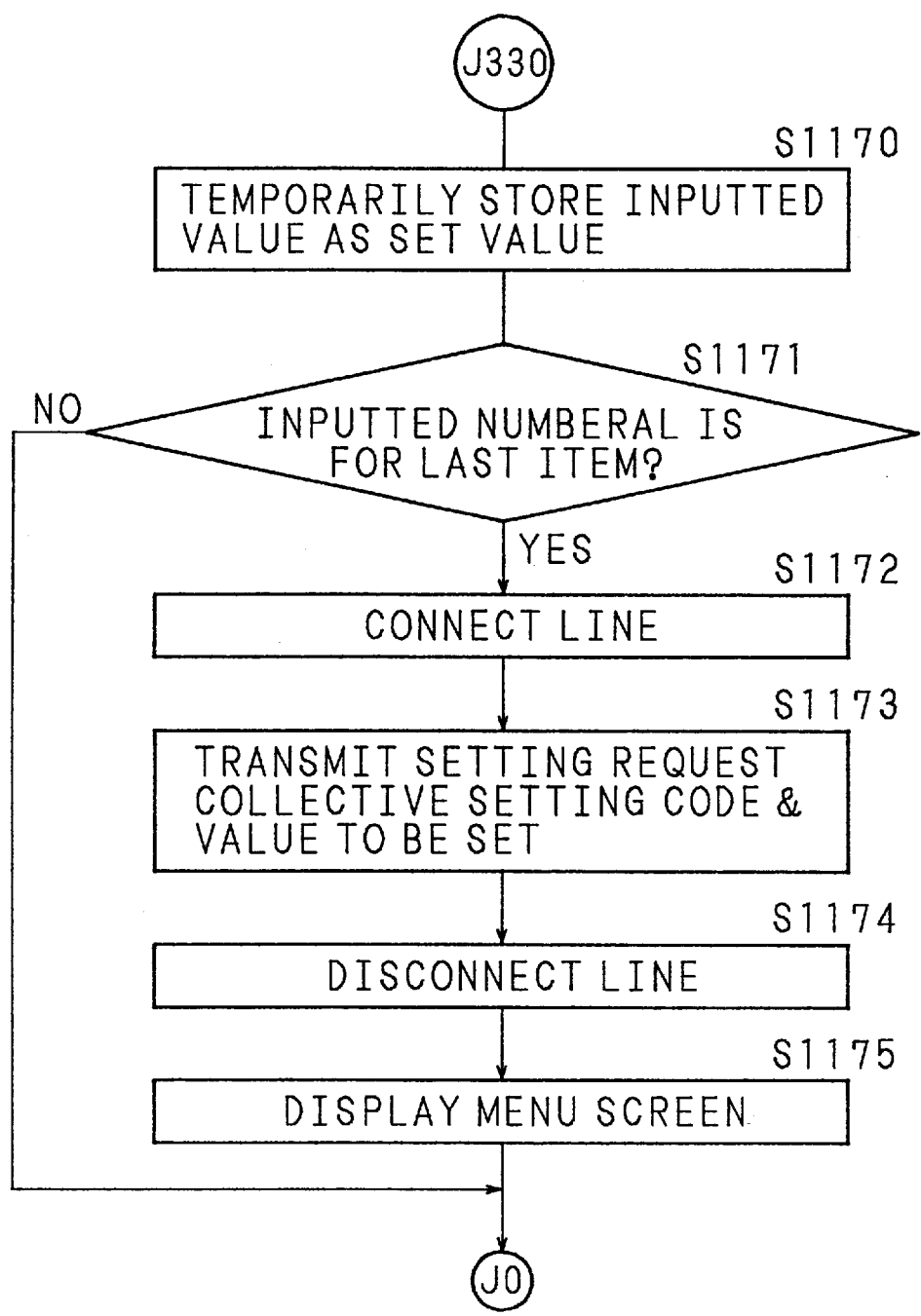
FIG. 32 is a flowchart of the operation in the central control apparatus of the remote management system of the invention.

As shown in FIG. 30, FIG. 31, FIG. 32, the central control apparatus 3 temporarily stores the input value in the memory 3e as the set value (steps S1140, S1160, S1170), detects whether the current input item is the last item or not (steps S1141, S1161, S1171) and repeats the temporary storage of the set value until a numeral is inputted for the last item. When it is detected in the step S1141 (S1161, S1171) that a numeral is inputted for the last item, the central control apparatus 3 connects the line 5 with the DTC 7 (steps S1142, S1162, S1172). Then the central control apparatus 3 transmits the value setting request, individual setting code, machine number and set value in the case of the individual setting, the value setting request, setting code by the machine type, machine type code and the set value in the case of the setting by the machine type, or value setting request, the collective setting code and the set value in the case of the collective setting of all machines to the DTC 7 (steps S1143, S1163, S1173), disconnects the line 5 (steps S1144, S1164, S1174), displays the menu screen (steps S1145, S1165, S1175) and returns to the step S1.

Figure 65:
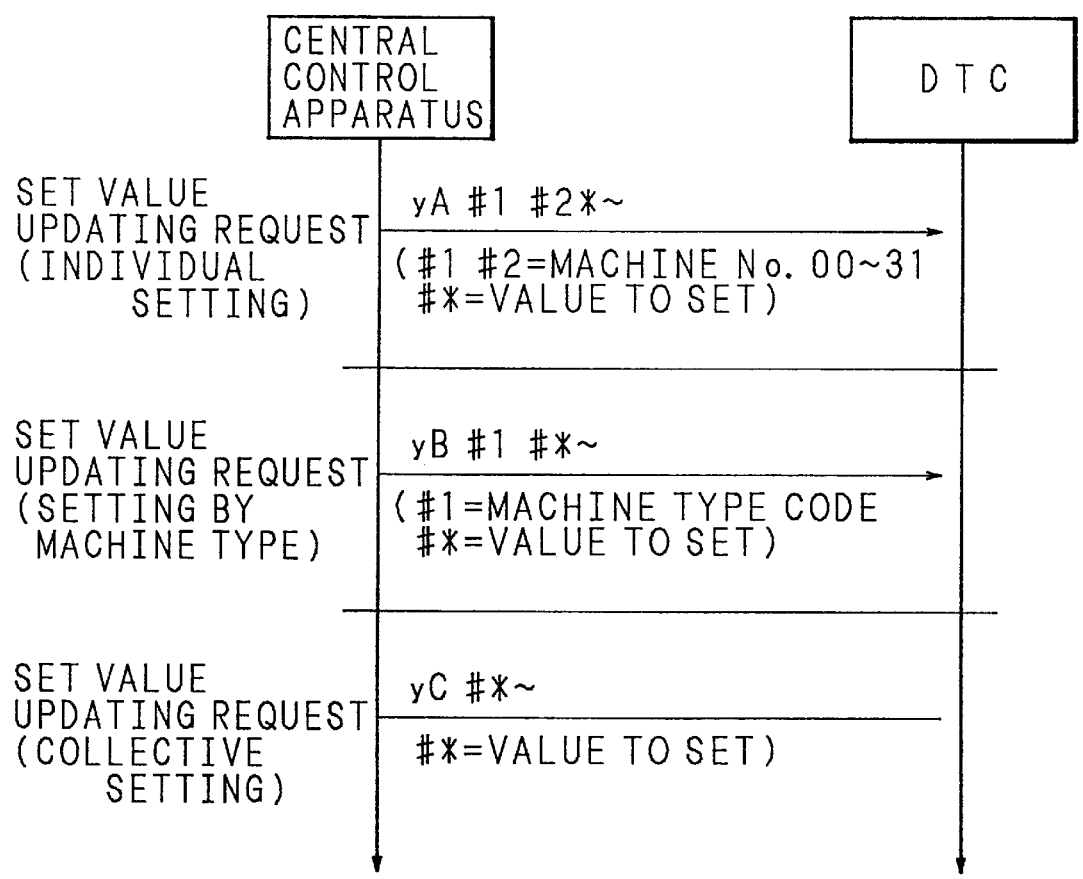
FIG. 65 is a sequence diagram of data communications related to the machine set value updating request between the central control apparatus and the DTC.
Figure 66:
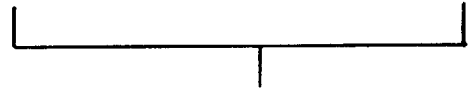
FIG. 66 is a frame structure diagram of the machine set value updating request command (individual)

FIG. 65 is a sequence diagram of data communications for the machine set value updating via the public telephone line 5 between the central control apparatus 3 and the DTC 7. FIG. 66, FIG. 67 and FIG. 68 are frame structure diagrams of the machine set value updating request command. As shown in FIG. 65, the central control apparatus 3 transmits the setting request code (y), individual setting code (A), machine number (#1#2) and set value (#*) in the case of the individual setting, the setting request code (y), machine type setting code (B), machine code (#1) and set value (#*) in the case of the setting by the machine type, or the setting request code (y), collective setting code (C) and the set value (#*) in the case of the collective setting of all machines to the DTC 7 in the frame structure as shown in FIGS. 66, 67, 68.

Figure 23:
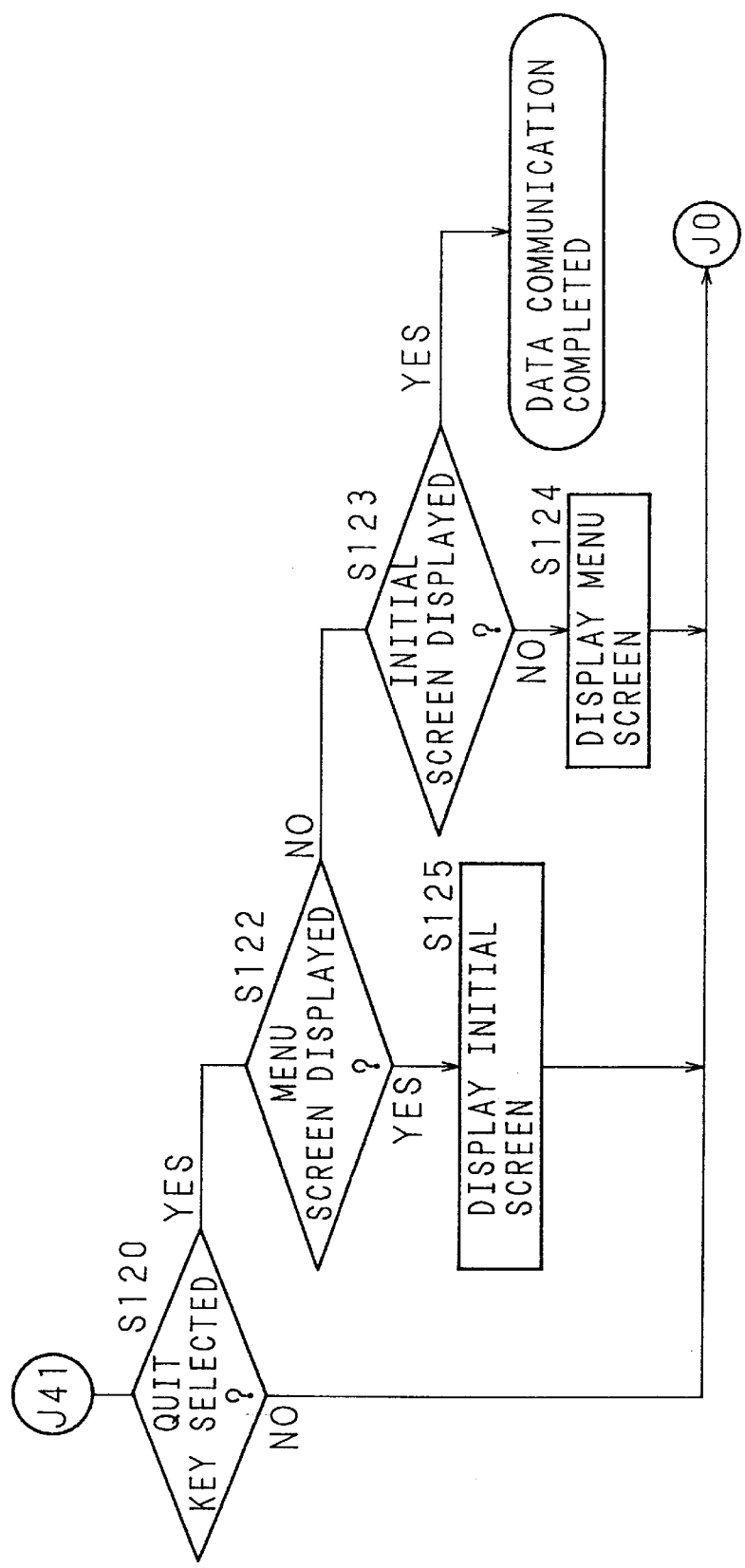
FIG. 23 is a flowchart of the operation in the central control apparatus of the remote management system of the invention.

Upon completion of these operations, the central control apparatus 3 detects whether a quit key is selected as shown in FIG. 23 (step S120) and, when the quit key is not selected, returns to the step S1. When the quit key is selected in the step S120, and if the display device 3b displays the menu screen (step S122), the initial screen is displayed (step S125). When the menu screen is not displayed in the step S122, the central control apparatus 3 detects whether the display device 3b displays the initial screen (step S123) and, unless the initial screen is not displayed, displays the menu screen. Therefore, the initial screen is displayed in the step S125 after the quit key is selected in the menu screen.

Figure 33:
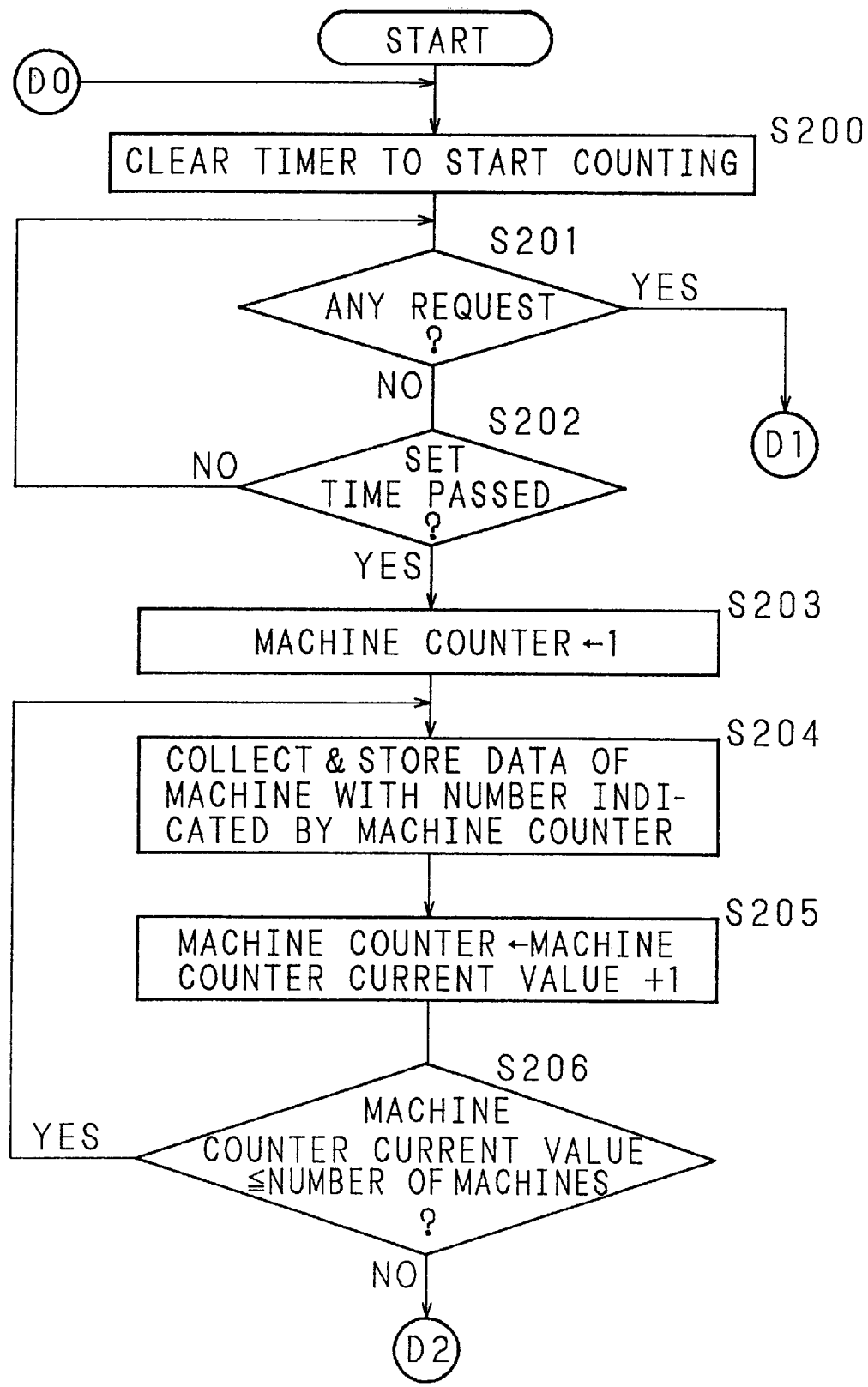
FIG. 33 is a flowchart of the operation in the DTC of the remote management system of the invention.
Figure 34:
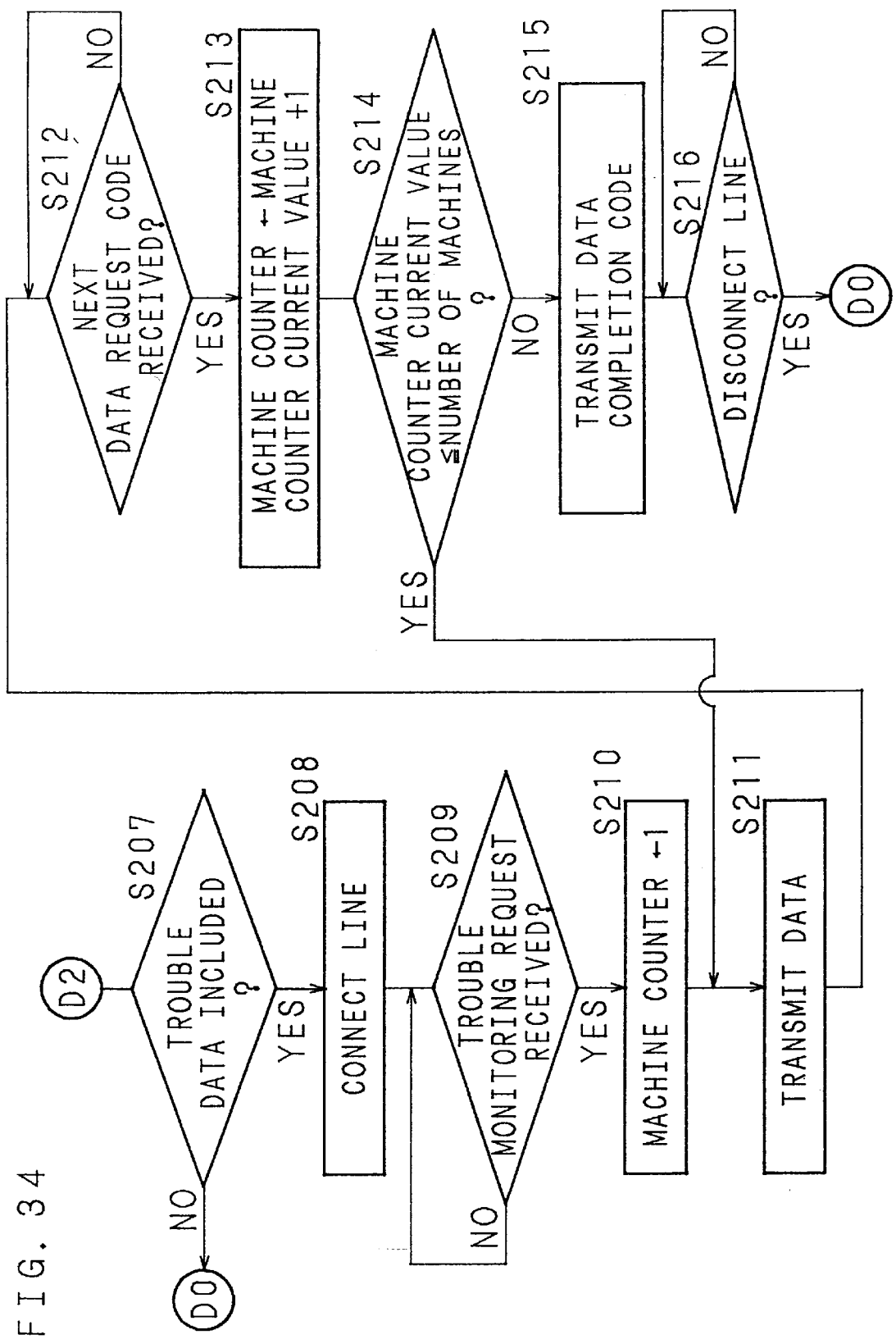
FIG. 34 is a flowchart of the operation in the DTC of the remote management system of the invention.
Figure 35:
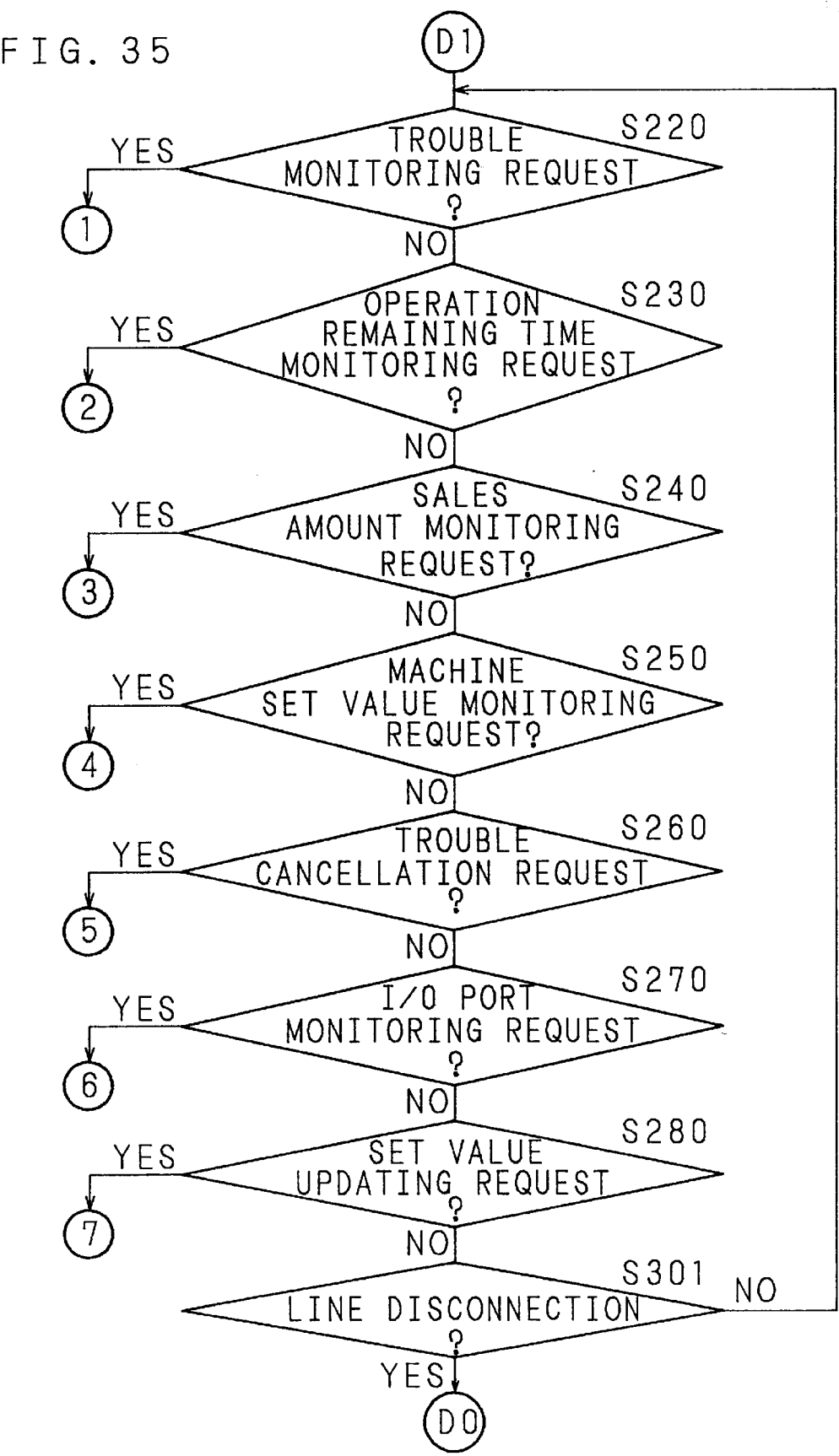
FIG. 35 is a flowchart of the operation in the DTC of the remote management system of the invention.

FIG. 33, FIG. 34 and FIG. 35 show flowcharts of the operation in the DTC 7 of the remote management system according to the invention. The DTC control unit 7a clears the timer 7e before starting to count (step S200) in order to make the microcomputer 8a of each dryer 8 connected thereto by the twisted pair 9 periodically transmit data. Then the DTC control unit 7a stands by to pass a preset period of time while monitoring to see whether a request (call) is generated from the central control apparatus 3 of the management company 1 (steps S201, S202). When the preset period of time has passed, the machine counter 7f is set to be one (step S203), and the sales amount, operation state, remaining operation time, presence/absence of troubles, trouble code and other data are transmitted from the dryer 8 of the same number as the value of the machine counter 7f and stored in the memory 7d (step S204), with the value of the machine counter 7f incremented by one (step S205). The steps S201 through S205 are repeated until the value of the machine counter 7f becomes equal to the total number of the dryers 8 in the laundrette 2 (step S206).

After the data transmitted from all dryers 8, 8, are completely stored, the DTC control unit 7a checks whether a trouble-related data is included in the data stored in the memory 7d (step S207). If such data is not included, the DTC control unit 7a returns to the step S200 and clears and starts the timer 7e. When the trouble-related data is included, the DTC control unit 7a connects the line 5 to transmit the data to the central control apparatus 3 of the management company 1 (step S208) and waits until the central control apparatus 3 transmits the trouble monitoring request (step S209). Upon receipt, of the trouble monitoring request from the central control apparatus 3, the DTC control unit 7a sets the machine counter 7f to be one (step S210), transmits the data related to the dryer 8 of the number corresponding to the value of the machine counter 7f to the central control apparatus 3 (step S211) and waits until the next data request is received from the central control apparatus 3 (step S212).

Upon receiving the next data request from the central control apparatus 3, the DTC control unit 7a increments the value of the machine counter 7f by one (step S213), compares the value of the machine counter 7f and the number of dryers 8 (step S214), and repeats the data transmission until the value of the machine counter 7f becomes equal to the number of the dryers 8. When the value of the machine counter 7f becomes equal to the number of dryers 8, the DTC control unit 7a transmits the data completion code (step S215) and, with confirming that the central control apparatus 3 disconnects the line 5 (step S216), the DTC control unit 7a returns to the step S200 and clears and starts the timer 7e.

On the other hand, in the step S201, when a call from the central control apparatus 3 is confirmed before starting of the data collection from each dryer 8 described previously, the following checking is conducted sequentially with higher priority to the data collection; checking of the presence/absence of the trouble monitoring request (step S220), checking of the presence/absence of the remaining operation time monitoring request (step S230), checking of the presence/absence of the sales amount monitoring request (step S240), checking of the presence/absence of the machine set value monitoring request (step S250), checking of the presence/absence of the trouble canceling request (step S260), checking the presence/absence of the I/O port monitoring request (step S270) and checking of the presence/absence of the machine set value updating request (step S280) those from the central control apparatus 3. When any of these requests is made, it is processed as follows.

Figure 36:
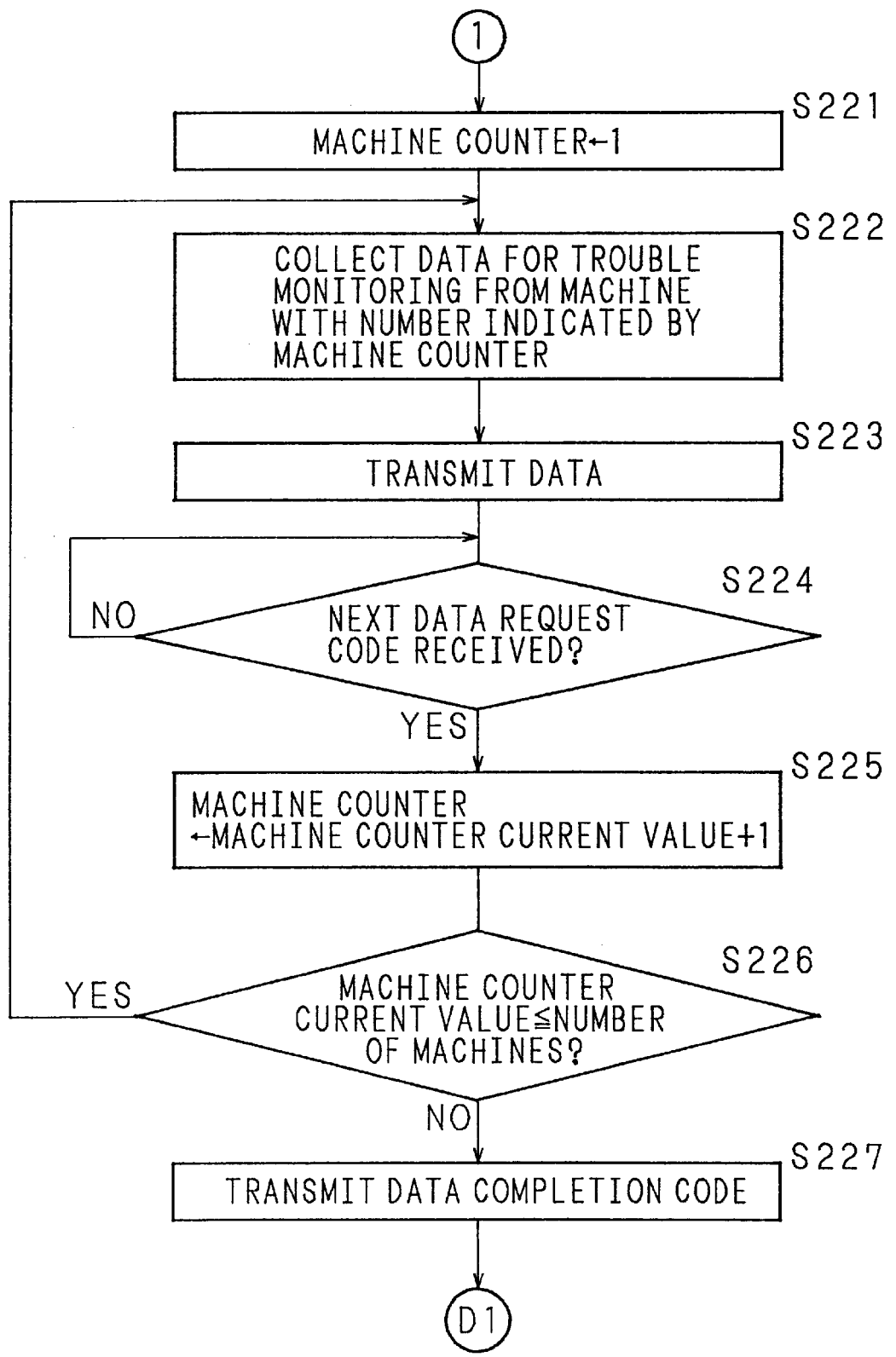
FIG. 36 is a flowchart of the operation of the DTC in response to a trouble monitoring request.

FIG. 36 is a flowchart of the operation by the DTC 7 in response to the trouble monitoring request. The DTC control unit 7a sets the machine counter 7f to be one (step S221) and collects data from the dryer 8 of the number corresponding to the value of the machine counter 7f (step S222). The DTC 7 transmits the collected data to the central control apparatus 3 (step S223) and is kept waiting until the next data request is received from the central control apparatus 3 (step S224). When receiving the next data request, the DTC control unit 7a increments the value of the machine counter 7f by 1 (step S225), compares the value of the machine counter 7f and the number of the dryers 8 (step S226) and repeats the transmission of the data (steps S222 through S226) until the counting value of the machine counter 7f becomes equal to the number of the dryers 8. When the value of the machine counter 7f becomes equal to the number of the dryers 8, the DTC control unit 7a transmits the data completion code (step S227) and returns to the step S220.

Figure 37:
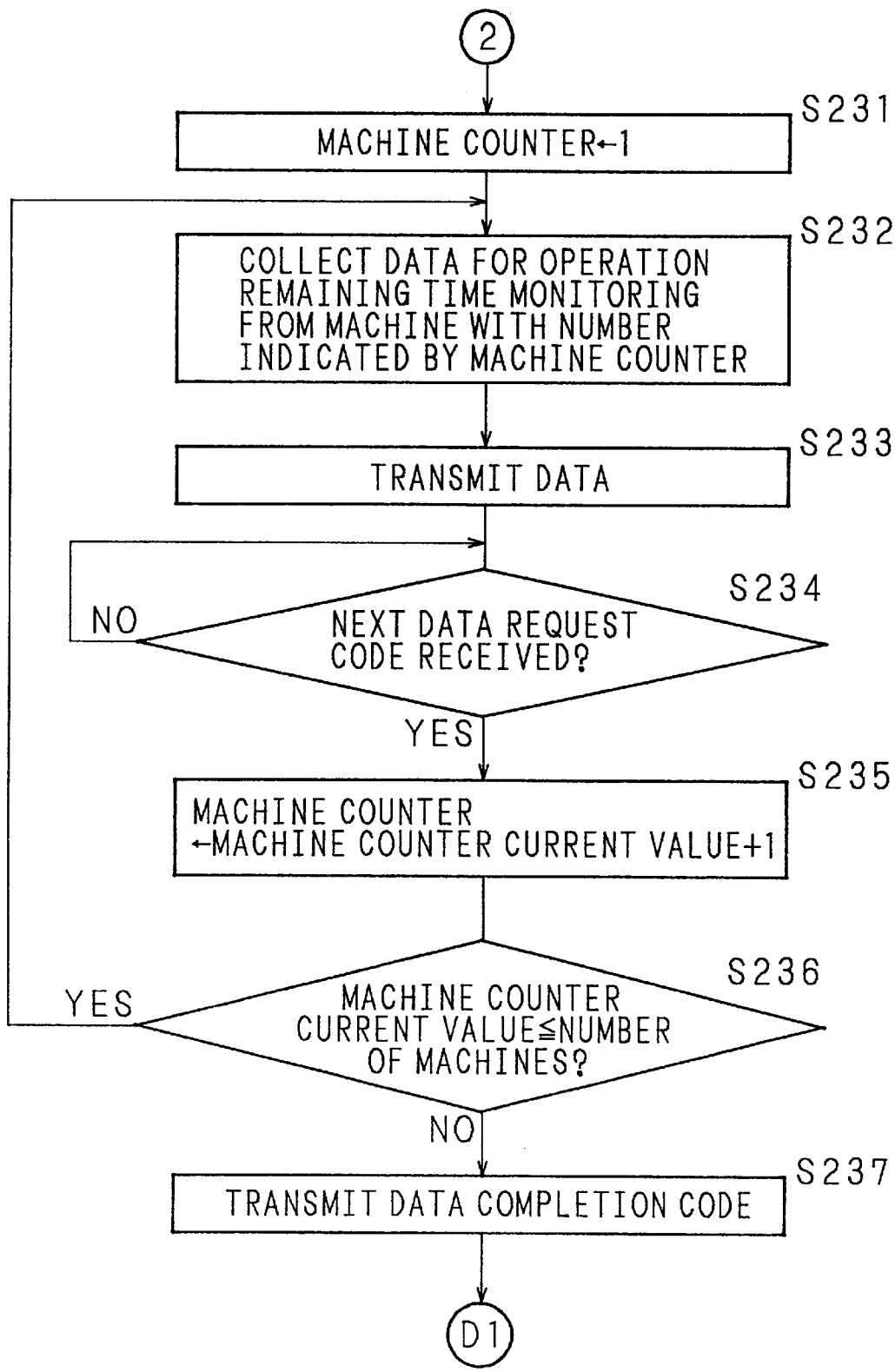
FIG. 37 is a flowchart of the operation of the DTC in response to a remaining operation time monitoring request.
Figure 38:
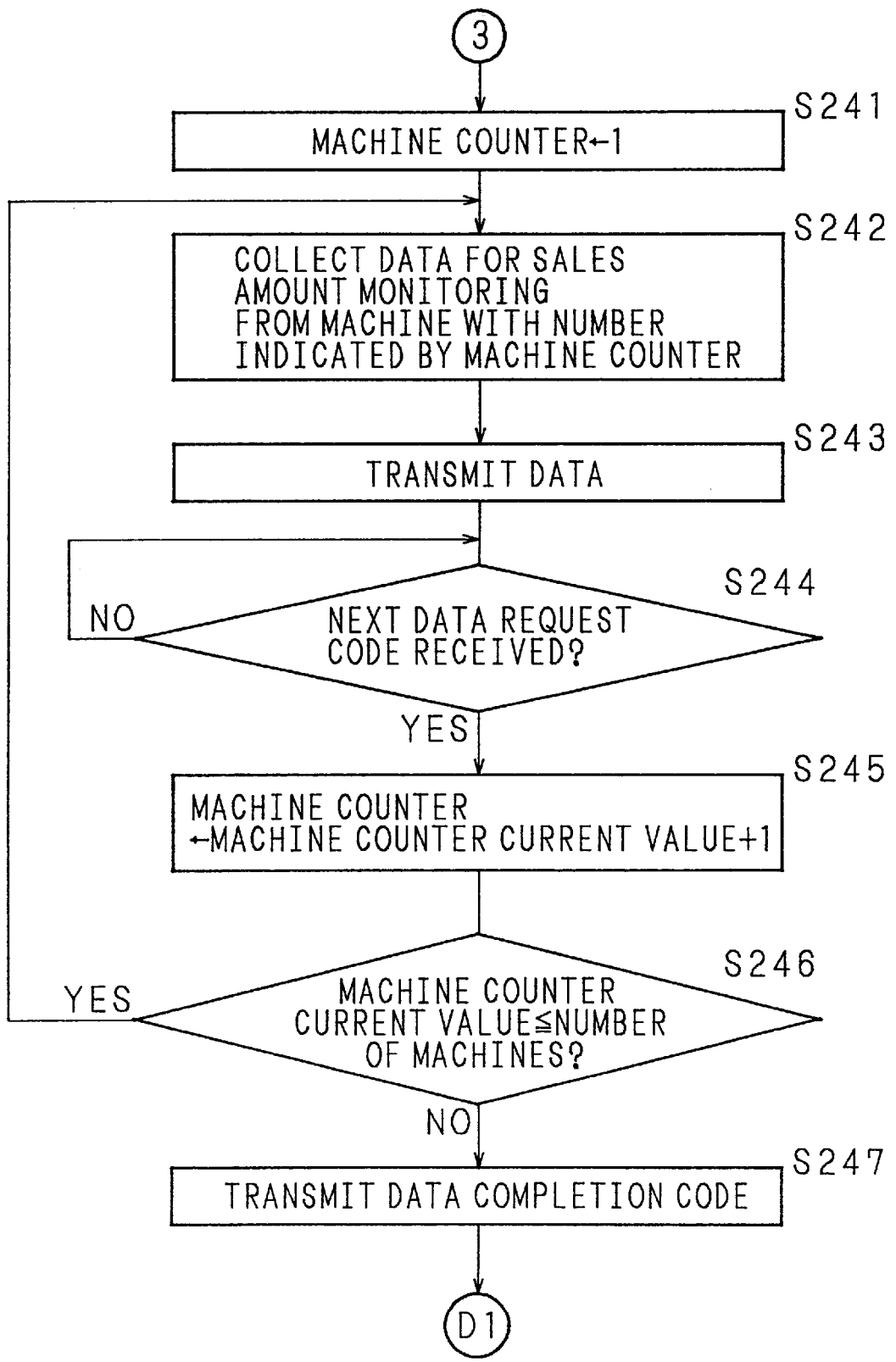
FIG. 38 is a flowchart of the operation of the DTC in response to a sales amount monitoring request.
Figure 39:
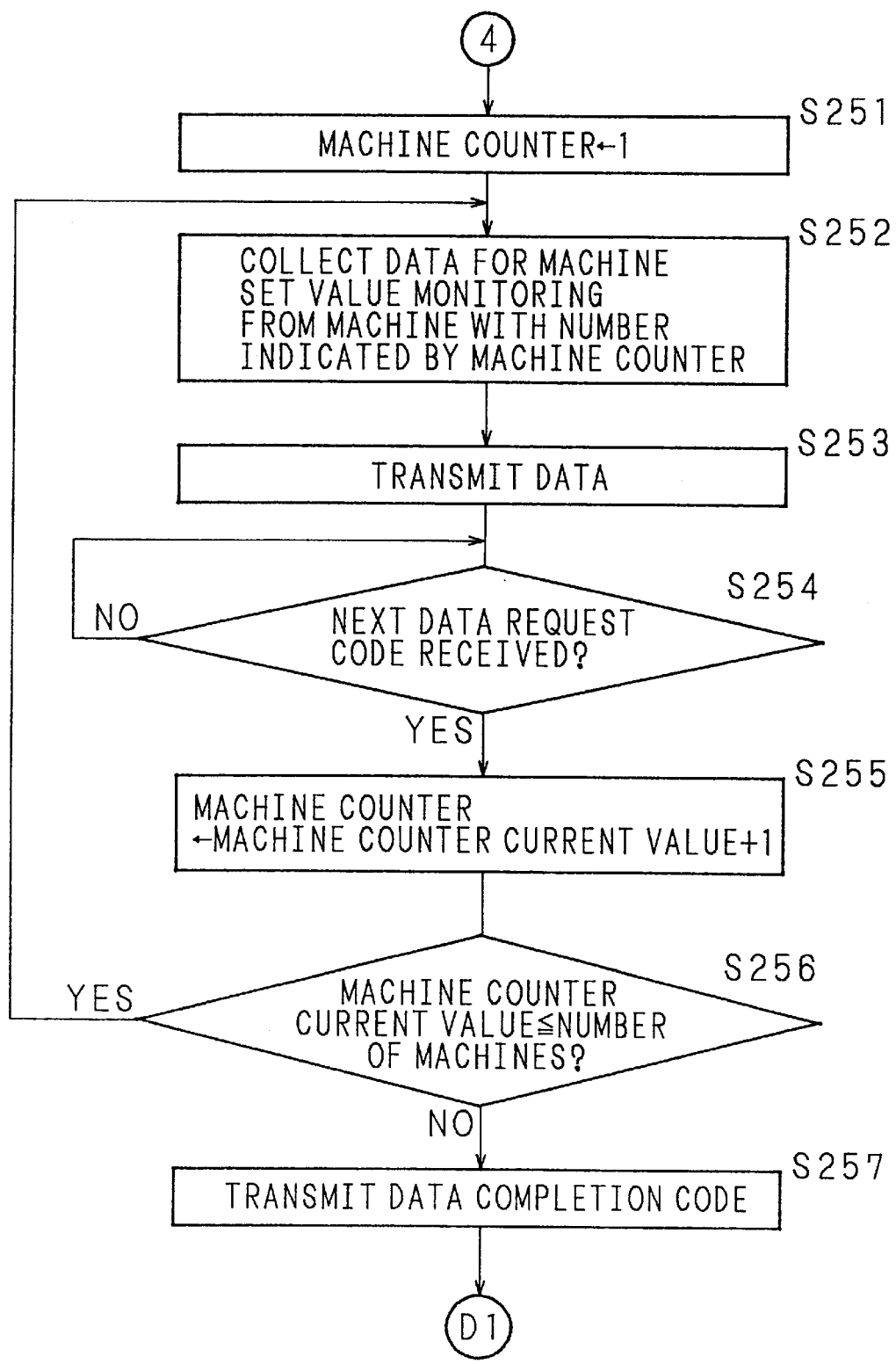
FIG. 39 is a flowchart of the operation of the DTC in response to a machine set value monitoring request.

FIG. 37, FIG. 38 and FIG. 39 are flowcharts of the operation of the DTC 7 in response to the remaining operation time monitoring request, sales amount monitoring request and machine set value monitoring request, respectively. Operation procedures for these requests are similar to the operation procedure for the trouble monitoring request shown in FIG. 36, and therefore the description thereof will be omitted.

Figure 40:
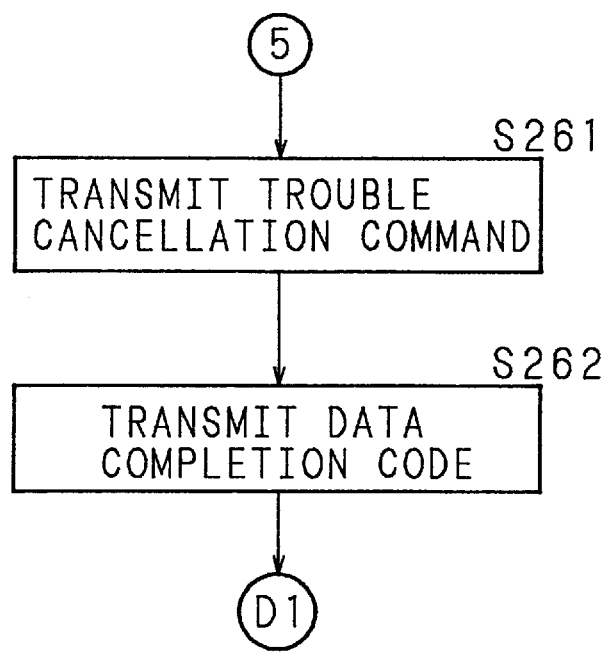
FIG. 40 is a flowchart of the operation of the DTC in response to a trouble canceling request.

FIG. 40 is a flowchart of the operation of the DTC 7 in response to the trouble canceling request. When the trouble canceling request is transmitted from the central control apparatus 3, the DTC 7 transmits the trouble canceling command (refer to Table 2) to the dryer 8 indicating the number included in the trouble canceling request code (step S261) and, when the dryer 8 responds to show the completion of the reception of data, transmits the data completion code to the central control apparatus 3 (step S262) and returns to the step S220.

Figure 41:
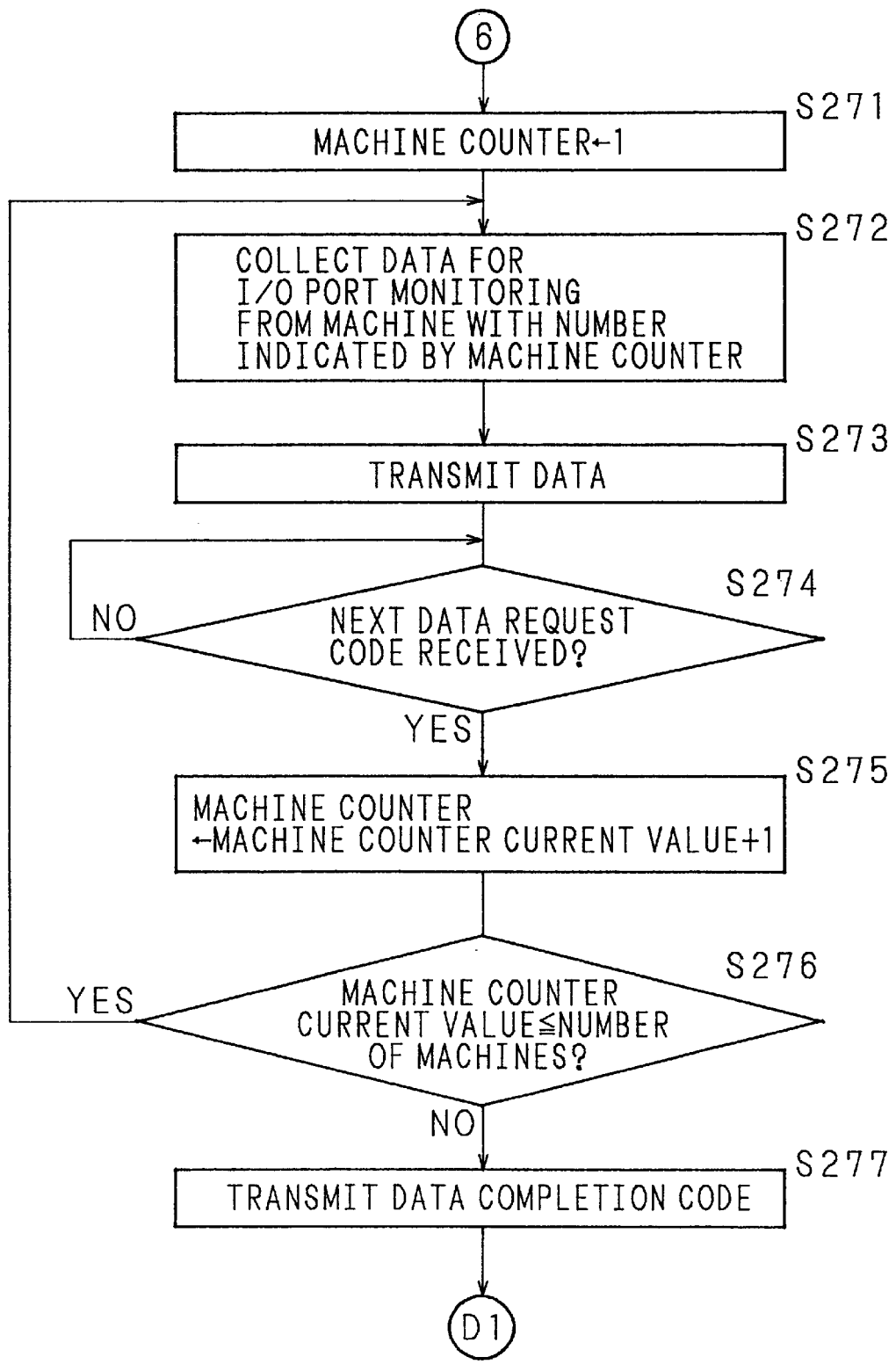
FIG. 41 is a flowchart of the operation of the DTC in response to an I/O port monitoring request.

FIG. 41 is a flowchart of the operation procedure of the DTC 7 in response to the I/O port monitoring request. The DTC control unit 7a sets the value of the machine counter 7f to one (step S271) and collects data from the dryer 8 of the number corresponding to the value of the machine counter 7f (step S272). The DTC 7 transmits the collected data to the central control apparatus 3 (step S273) and waits until the next data request is received from the central control apparatus 3 (step S274). When the next data request is received, the DTC control unit 7a increments the value of the machine counter 7f by one (step S275), comparing the value of the machine counter 7f with the number of the dryers 8 (step S276), and repeats the transmission of the data (steps S272 through S276) until the value of the machine counter 7f becomes equal to the number of the dryers 8. When the counting value of the machine counter 7f becomes equal to the number of the dryers 8, the DTC control unit 7a transmits the data completion code (step S277) and returns to the step S220.

Figure 42:
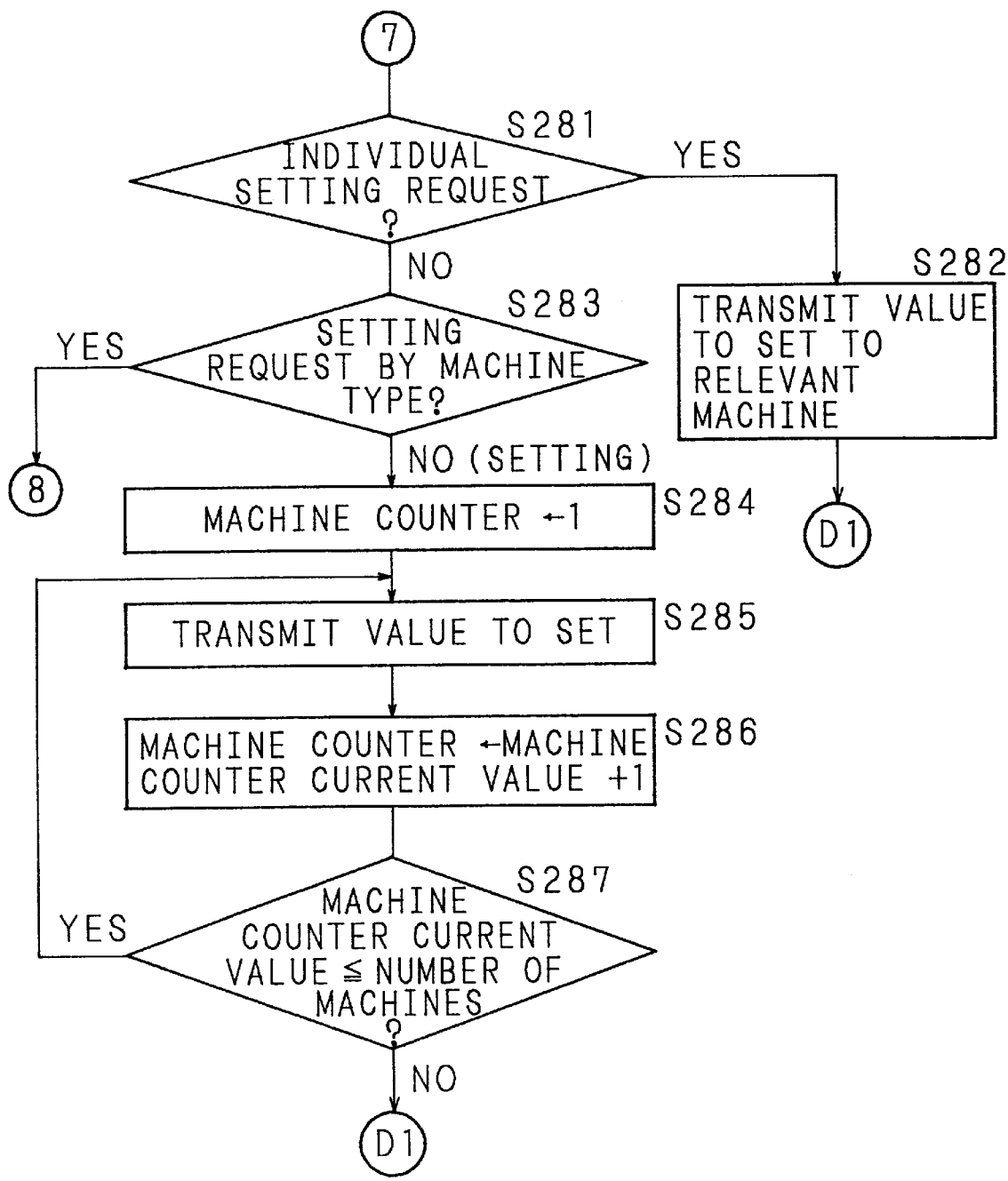
FIG. 42 is a flowchart of the operation of the DTC in response to a machine set value updating request.
Figure 43:
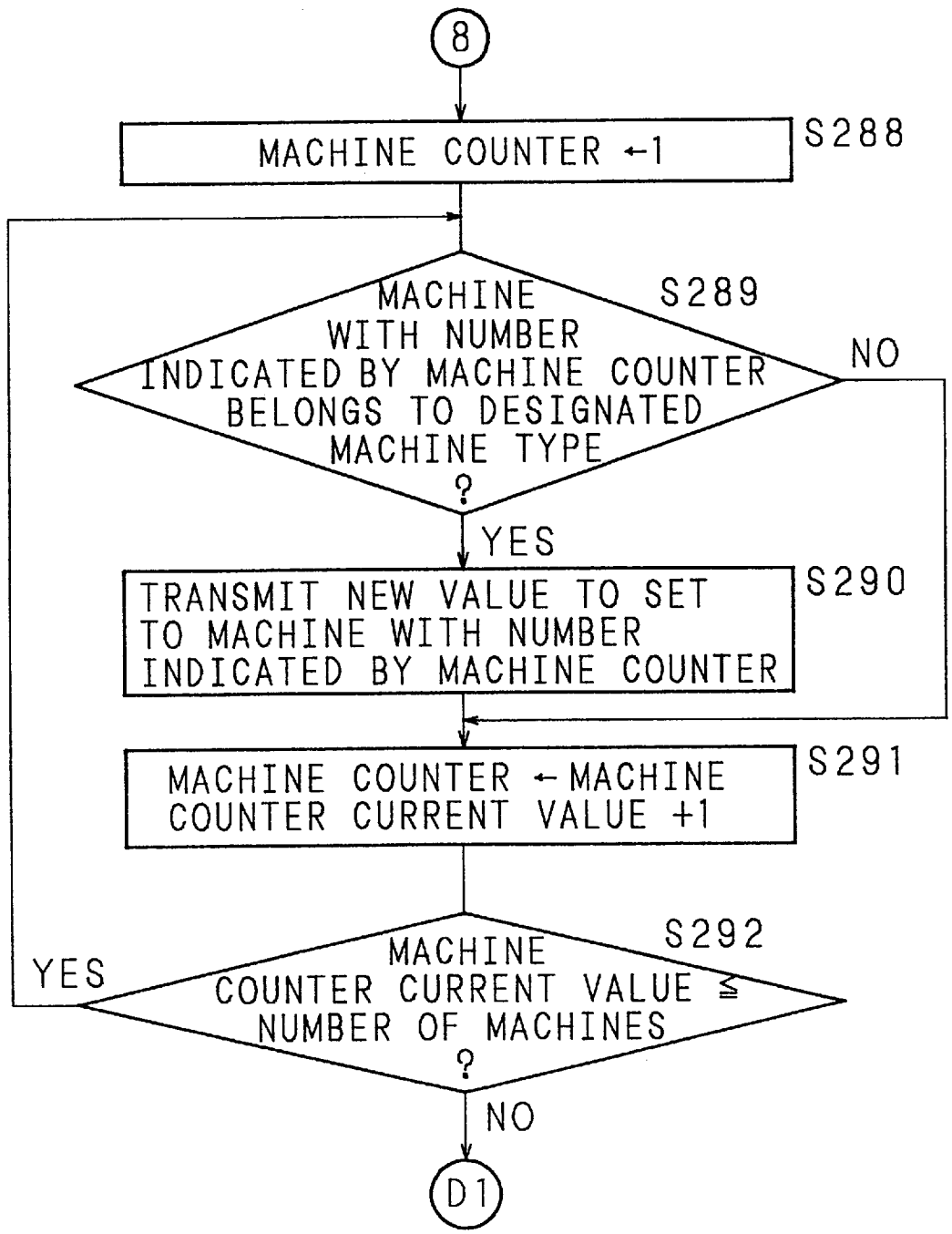
FIG. 43 is a flowchart of the operation of the DTC in response to a machine set value updating request.
Figure 44:
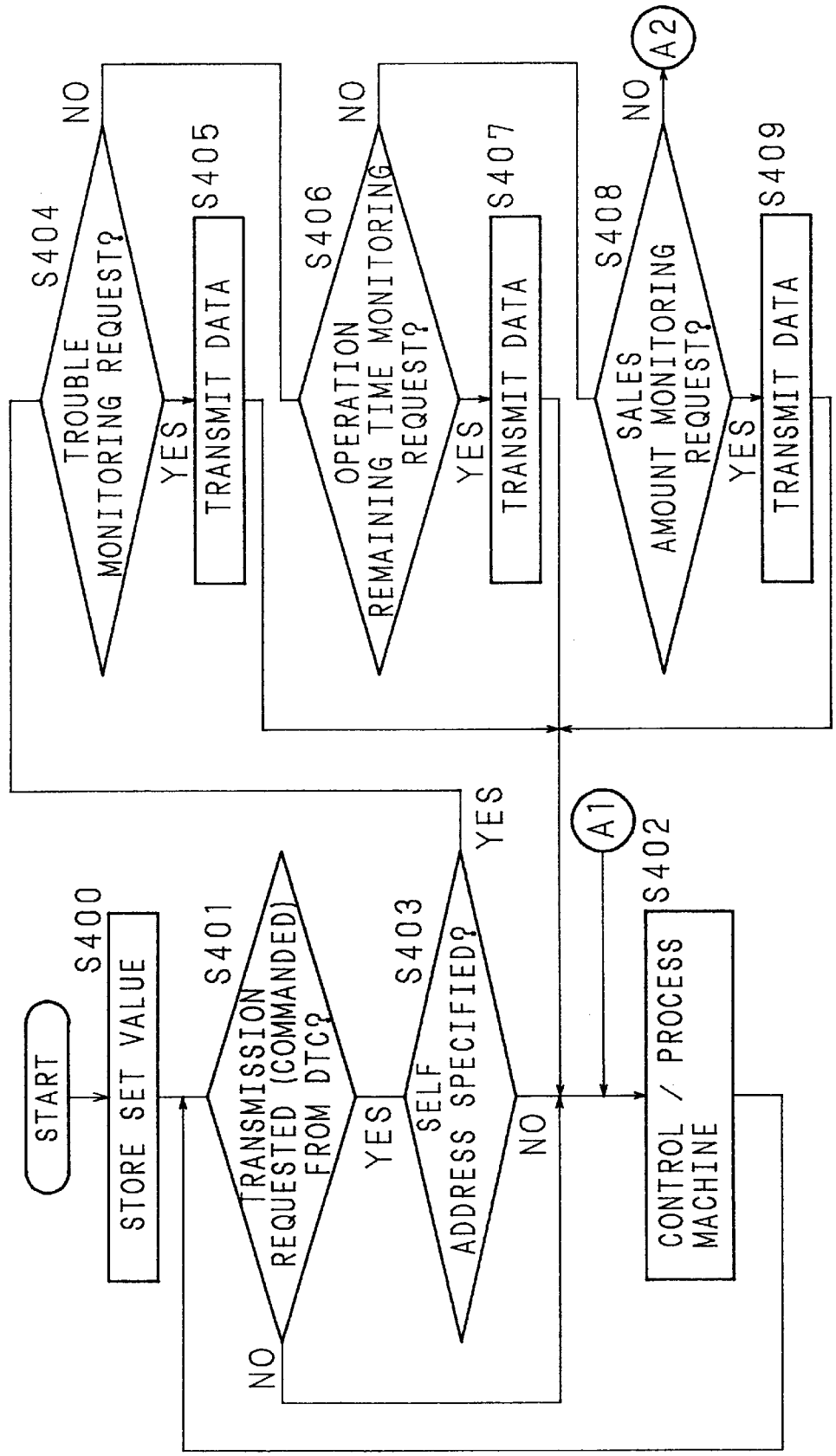
FIG. 44 is a flowchart of the operation of the microcomputer of a dryer of the remote management system of the invention.

FIG. 42 and FIG. 43 are flowcharts of the operation in the DTC 7 in response to the machine set value updating request. The DTC 7 detects whether the setting request from the central control apparatus 3 is the individual setting request or not (step S281) and, transmits the set value to the subject machine (step S282) in the affirmative case. In case where it is not, the individual setting request, the DTC 7 checks whether it is the setting request by the machine type (step S283). If it is not the setting request by the machine type, the DTC 7 determines that it is the collective setting request of all machines and carries out the following operations.

The DTC 7 sets the machine counter 7f to be one (step S284), transmits the set value to the machine of the number indicated by the machine counter 7f (step S285) and increments the value of the machine counter 7f by one (step S286). The DTC 7, comparing the value of the machine counter 7f and the number of the machines (step S287), repeats the transmission of the set value (steps S285 through S287) until the value of the machine counter 7f becomes equal to the number of the machines and, when the count value becomes equal to the number of the machines, returns to the step S200.

When judging the request is for the setting by the machine type in the step S283, the DTC 7 sets the machine counter 7f to be one (step S288), and checks whether the machine with the number indicated by the machine counter 7f comes under the requested machine type (step S289). If the machine comes under the requested type, the DTC 7 transmits the setting value to that machine (step S290). After transmitting the setting value, or if judging the machine does not come under the requested type in the step S289, the DTC 7 increments the value of the machine counter 7f by one (step S291), then compares the value of the machine counter 7f with the number of the machines (step S292). The DTC 7 repeats the transmission of the setting value to the machine of the requested type (steps S289 through S292) until the value of the machine counter 7f becomes equal to the number of the machines and, when the count value becomes equal to the number of the machines, returns to the step S220.

When the operations are completed, the connection of the line 5 is checked as shown in FIG. 35 (step S301) and, when the line 5 is disconnected by the central control apparatus 3, the operation returns to the step S200 and otherwise to the step S220.

Figure 45:
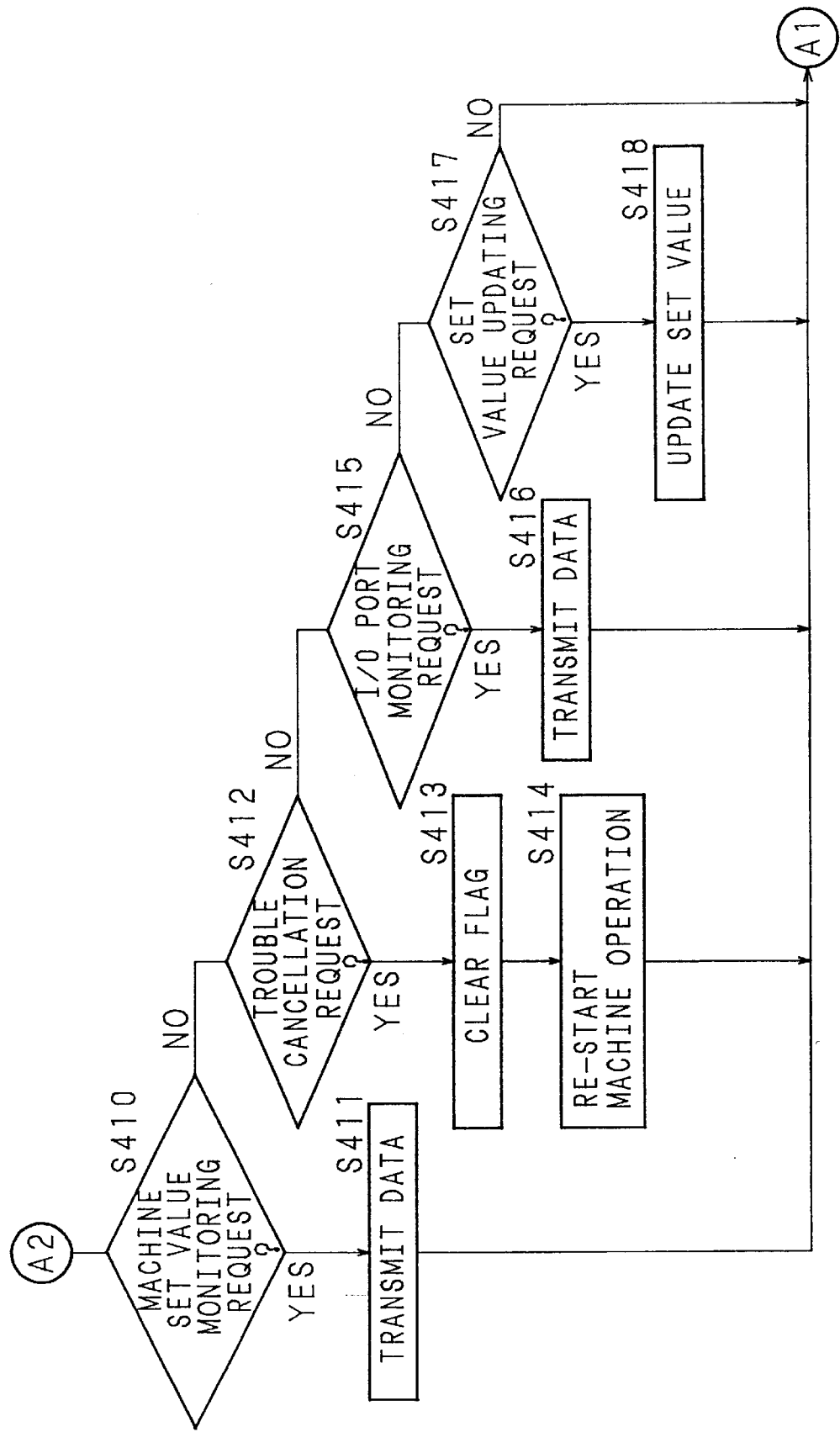
FIG. 45 is a flowchart of the operation of the microcomputer of a dryer of the remote management system of the invention.

FIG. 14 and FIG. 45 are flowcharts of the operation of the dryer 8 of the remote management system according to the invention. The microcomputer 8a of the dryer 8 reads the value set by the DIP switch 96 and stores the set value in the set value memory 82a (step S400). Then the microcomputer 8a judges whether the data transmission request from the DTC 7 is presents (step S401). If the request is not made, the microcomputer 8a controls the operation of the dryer 8 and processes the data taken from each sensor 8b (step S402), then returns to the step S401.

On the other hand, when receiving the data transmission request from the DTC 7, the microcomputer 8a detects whether the request includes the self address (step S403). When the address of the microcomputer 8a is included, the microcomputer 8a detects whether the command is the trouble monitoring request (step S404), remaining operation time monitoring request (step S406), sales amount monitoring request (step S408) or machine set value monitoring request (step S410). The microcomputer 8a transmits data of presence/absence of troubles such as the abnormality of the machine, stealing, or the like, trouble code and operation state, that is, whether it is running or stopping in response to the trouble monitoring request (step S405). In response to the remaining operation time monitoring request, the microcomputer 8a transmits the current remaining operation time (step S407). In response to the sales amount monitoring request, the microcomputer 8a transmits the current sales amount (step S409). In response to the machine set value monitoring request, the microcomputer 8a transmits the set values stored in the set value memory 82a (step S411). After transmitting the data, the microcomputer 8a clears the transmitted data from the memory 83a except the set values in the memory 82a and proceeds to step S402. Accordingly, it becomes possible to clear the transmitted data every time the DTC 7 outputs data transmission request, so that a memory of a small storage capacity suffices the microcomputer 8a.

The microcomputer 8a also detects whether the command from the DTC 7 which includes the self address is the trouble canceling request or not (step S412). When the command is the trouble canceling request, the microcomputer 8a clears the trouble detection flag 81a therein (step S413), thus restarting the operation of the dryer 8 (step S414). When it is found that the command is not the trouble canceling request in the step S412, the microcomputer 8a detects whether the command is the I/O port monitoring request and, if the result is affirmative, transmits the level data of the I/O port (step S416). Meanwhile, in case where it is determined that the command is not the I/O port monitoring request in step S415, the microcomputer 8a detects whether the command is the machine set value updating request (step S417). In the case of the affirmative result, the microcomputer 8a updates the value of the set value memory 82a to the value transmitted from the DTC 7 (step S418). After these operations are completed, the microcomputer 8a returns to the step S402.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| | | Higher Order Address | | | | | | | | | | | | | | | |
|---|---|---|---|---|---|---|---|---|---|---|---|---|---|---|---|---|---|
| | | 0 | 8 | 4 | C | 2 | A | 6 | E | 1 | 9 | 5 | D | 3 | B | 7 | F |
| Lower Order Address | 2 | DTC | | | | | | | | | | | | | | | |
| | A | | | | | | | | | | | | | | | | |
| | 6 | 00 | 08 | 04 | 0C | 02 | 0A | 06 | 0E | 01 | 09 | 05 | 0D | 03 | 0B | 07 | 0F |
| | E | 10 | 18 | 14 | 1C | 12 | 1A | 16 | 1E | 11 | 19 | 15 | 1D | 13 | 1B | 17 | 1F |

(MACHINES: rows 6 and E)

TABLE 2

| | Code (Data) | | | | | | | |
|---|---|---|---|---|---|---|---|---|
| Command | U0 | U1 | U2 | OPC | OPR1 | OPR2 | OPR3 | Direction |
| System Reset (Command) | 53(S) | 53(S) | 53(S) | 80 | — | — | — | Machine ←DTC |
| System Reset (Response) | 53(S) | 53(S) | 53(S) | 80 | — | — | — | Machine →DTC |
| Trouble Cancellation (Command) | 53(S) | 53(S) | 53(S) | 8E | 60 v 68 | — | — | Machine ←DTC |
| Mapping Confirmation (Command) | 53(S) | 53(S) | 53(S) | D2 | — | — | — | Machine ←DTC |
| Mapping Information (Response) | 53(S) | 53(S) | 53(S) | D2 | — | | | Machine →DTC |

TABLE 3

| Command | Code (Data) | | | | | | | | Direction |
|---|---|---|---|---|---|---|---|---|---|
| | U0 | U1 | U2 | OPC | OPR1 | OPR2 | OPR3 | | |
| Trouble Monitoring (Command) | 53(S) | 53(S) | 53(S) | 91 | 60<br>68 | — | — | Lower v Unit<br>Upper | Machine ←DTC |
| Trouble Data Return (Response) | 53(S) | 53(S) | 53(S) | 91 | 60 v 68 (Lower/Upper) | 20<br>10/18<br>11/19<br>12/1A<br>13/1B<br>14/1C<br>15/1D<br>16/1E<br>17/1F | — | Nonexistent (Non-Settled)<br>Stopping & Untroubled<br>Stopping & Troubled<br>Operating & Untroubled<br>Operating & Troubled<br>Stolen & Stopping & Untroubled<br>Stolen & Stopping & Troubled<br>Stolen & Operating & Untroubled<br>Stolen & Operating & Troubled | Machine →DTC |

Notes)
Use 60 for OPR1 when managing machines without distinction of upper/lower

TABLE 4

| Command | Code (Data) | | | | | | | | Direction |
|---|---|---|---|---|---|---|---|---|---|
| | U0 | U1 | U2 | OPC | OPR1 | OPR2 | OPR3 | | |
| Trouble Details Request (Command) | 53(S) | 53(S) | 58(S) | 96 | 60<br>68 | — | — | Lower v Unit<br>Upper | Machine ←DTC |
| Trouble Details Return (Response) | 53(S) | 53(S) | 53(S) | 96 | 60 v 68 (Upper/Lower) | 20<br>01–1F | — | Nonexistent (Non-Settled)<br>Trouble # (31 kinds) | Machine →DTC |

Notes)
Use 60 for OPR1 when managing machines without distinction of upper/lower

TABLE 5

| Command | Code (Data) | | | | | | | | Direction |
|---|---|---|---|---|---|---|---|---|---|
| | U0 | U1 | U2 | OPC | OPR1 | OPR2 | OPR3 | | |
| Sales Amount Request (Command) | 53(S) | 53(S) | 53(S) | 95 | 60<br>61<br>62<br>63<br>68<br>69<br>6A<br>6B | — | — | Lower & Coin<br>Lower & Standard Card<br>Lower & Member's Card<br>Lower & Monitor Card<br>Upper & Coin<br>Upper & Standard Card<br>Upper & Member's Card<br>Upper & Monitor Card | Machine ←DTC |
| Sales Amount Return (Response) | 53(S) | 53(S) | 53(S) | 95 | 60–63 V 68–6B | 20<br>BCD1.BCD0 | —<br>BCD3.BCD2 | Nonexistent (Non-Settled)<br>BCD0: Sales (Units Digit)<br>BCD1: Sales (Tens Digit)<br>BCD2: Sales (Hundreds Digit)<br>BCD3: Sales (Thousands Digit) | Machine →DTC |

Notes)
Use 60 for OPR1 when managing machines without distinction of upper/lower

TABLE 6

| Command | Code (Data) | | | | | | | | Direction |
|---|---|---|---|---|---|---|---|---|---|
| | U0 | U1 | U2 | OPC | OPR1 | OPR2 | OPR3 | | |
| Remaining Operation Time Request (Command) | 53(S) | 53(S) | 53(S) | 99 | 60 68 | — — | — — | Lower v Unit Upper | Machine ←DTC |
| Remaining Operation Time Return (Response) | 53(S) | 53(S) | 53(S) | 99 | 60 v 68 (Upper/ Lower) | 20 60–69 v 70–79 Notes 1) →Look1 | 00–99 | Nonexistent (Unsettled) | Machine →DTC |

Notes 1)
OPR2 High-order 3 bits: 011
OPR2 is 60–69 when BCD2 is hundreds digit of minutes
OPR2 is 70–79 when BCD2 is units digit of hours
NOTES 2)
0–3 bit: Remaining Operation Time BCD1 0–9 (Tens Digit of Min.) 4–7 bit: Remaining Operation Time BCD2 0–9 (Hours v Hundreds Digit of Min.)
Notes 3)
Use 60 for OPR1 when managing machines without distinction of upper/lower
Notes 4)
Max remaining operation time is 9 h. 59 min.

TABLE 7

| Command | Code (Data) | | | | | | | Direction |
|---|---|---|---|---|---|---|---|---|
| | U0 | U1 | U2 | OPC | OPR1 | OPR2 | OPR3 | |
| Set Value Request (Command) | 53(S) | 53(S) | 53(S) | D8 | — | — | — | Machine←DTC |
| Set Value Return (Response) | 53(S) | 53(S) | 53(S) | D8 | C0–E6 Notes 1) 0–5 bit: Initial Sum 0: 100 Yen 1: 150 Yen 2: 200 Yen 3: 250 Yen 4: 300 Yen 5: 350 Yen 6: 400 Yen 7: 450 Yen . . . 38: 2000 Yen Upper 2 Bits: 11 Fixed | 00–FF Notes 2) 0–5 bit: Operation Time 0–60 min/100 Yen 6–7 bit: COIN PORT 0: 100 Yen 1: 100 Yen +50 Yen 2: 100 Yen +50 Yen +500 Yen 3: 100 Yen +50 Yen +500 Yen +1000 Yen | 60–7F Notes 3) 0–1 bit: Upper/Lower Selection Switch 0: Both Usable 1: Lower Stop 2: Upper Stop 3: Both Unused 2–4 bit: Revolution Fine Adjustment 0: 0 Revolution 1: −1 Revolution 2: −2 Revolution 3: −3 Revolution 4: 0 Revolution 5: +1 Revolution 6: +2 Revolution 7: +3 Revolution 5–7 Bits: 011 Fixed | Machine→DTC |

TABLE 8

| Command | Code (Data) | | | | | | | | Direction |
|---|---|---|---|---|---|---|---|---|---|
| | U0 | U1 | U2 | OPC | OPR1 | OPR2 | OPR3 | OPR4 | |
| DIP SW Set Request (Command) | 53(S) | 53(S) | 53(S) | 97 | C0–E6 OPR1–3 is equal to set value return OPR4 is equal to OPR3 of section information | 00–FF | 60–7F | 60–63 | Machine←DTC |

TABLE 8-continued

| Command | U0 | U1 | U2 | OPC | OPR1 | OPR2 | OPR3 | OPR4 | Direction |
|---|---|---|---|---|---|---|---|---|---|
| I/O Port Request (Command) | 53(S) | 53(S) | 53(S) | 98 | — | — | — | — | Machine←DTC |
| I/O Port Return (Response) | 53(S) | 53(S) | 53(S) | 98 | 60<br>68<br>if OPR1 = 60 then Input Port Data else Output Port Data<br>OPR2: Bit Map of PORT 0–7<br>OPR3: Bit Map of PORT 8–15<br>OPR4: Bit Map of PORT 16–23 | 00–FF<br>00–FF | 00–FF<br>00–FF | 00–FF<br>00–FF | Machine→DTC |

TABLE 9

| Command | U0 | U1 | U2 | OPC | OPR1 | OPR2 | OPR3 | OPR4 | ... OPRn | Direction |
|---|---|---|---|---|---|---|---|---|---|---|
| Machine Code Request (Command) | 53(S) | 53(S) | 53(S) | D6 | — | — | — | — | | Machine←DTC |
| Machine Code Return (Response) | 53(S) | 53(S) | 53(S) | D6 | 60–6F<br>Notes 1 on OPR1)<br>0–3 Bits: Machine Type Code<br>0: SCD<br>1: SCW<br>2: CD<br>3: ASW<br>4: SCS<br>5–15: Undefined<br>Upper 4 Bits: '6' Fixed | 00–7F<br>Notes on OPR2–OPRn)<br>Each of n bytes (ordinary n > 4) represents a machine code by 7 bit ASCII code (ex. SCD6070GC) | 00–7F | 00–7F | ... | Machine→DTC |

TABLE 10

| Trouble No | Trouble Name | Trouble Cause & Control Sequence |
|---|---|---|
| E1 | Ignition Failure | In dryer operation mode, when detecting initial ignition failure 5 times continuously, stop operation immediately according to basic process. |
| E2 | Accidental Fire | In dryer operation mode, when detecting accidental fire 5 times continuously, or detecting ignition failure 5 times continuously in re-ignition after accidental fire, execute cooling operation till end of operation, then display E2. |
| E3 | Burner Overheat | In dryer operation mode, when thermistor at drum entrance working, execute cooling operation till end of operation, then display E3.<br>Different from E2, execute cooling operation at least 3 minutes even if operation time remains little. |
| E4 | Drum Overheat | In dryer operation mode, when detecting thermistor monitor level at exit of drum L, execute cooling operation till end of operation, then display E4.<br>Fundamentally, same as E3. |
| E5 | Drum Motor Overheat | During drum motor output being ON, when drum motor thermistor working, stop operation immediately according to basic process. |
| E6 | Fan Motor Overheat | During fan motor output being ON, when fan motor thermistor working, stop operation immediately according to basic process. |
| E7 | Irregular Drum Motor Rotation | During control of drum motor reversal rotation, when number of pulses from drum rotation number sensor being out of appropriate range, stop operation immediately according to basic process. |
| E8 | Coin Box Accident | In all operation modes, when micro switch working, continue current control and alarm. |

TABLE 11

| Trouble No | Trouble Name | Trouble Cause & Control Sequence |
|---|---|---|
| E9 | Coin Sensor Input Port Abnormality | When input port level (H/L) of coin switch circuit appearing abnormaly, allow operation if operable, but inhibit operation if disoperable.<br>(In operable condition, abnormal input is not recognized as trouble.) |
| E10 | Card System Accident | When start key invalid signal is L continuously, allow operation if operable, but inhibit operation if disoperable.<br>(In operable condition, card system accident is not recognized as trouble.) |

TABLE 11-continued

| Trouble No | Trouble Name | Trouble Cause & Control Sequence |
| --- | --- | --- |
| E11 | Gas Controller Abnormality | Due to abnormal control, when gas controller does not execute initial ignition (when either of ignition monitor or accidental fire monitor does not appear), and does not restore to normal condition even though retrying, stop operation immediately according to basic process. |

What is claimed is:

1. A remote management system with a plurality of machine control units, each of which respectively stores previously set operational condition data for each operation of a plurality of machines in a write permit memory, and detects a state of each of plural parts of the machines by a plurality of sensors, respectively, thereby to control the operations of the machines based on the operational condition data stored in said memory and the detected values inputted from said sensors, each said machine control unit being connected by communication means with a central control unit to manage the machines by remote control, said central control unit comprising:
means for inputting at least one updating instruction and value to collectively update the previously set operational condition data for the operations stored in the memory of the machine control units for a specified subset of the machines; and
means for transmitting said at least one inputted updating instruction and value to the machine control unit via said communication means;

each said machine control unit comprising:
means for updating the operational condition data stored in said memory according to the updating data transmitted from the central control unit.

2. The remote management system of claim 1, further comprising a data transmission controller for collecting data related to an operation of a machine from each said machine control unit, for transmitting the collected data to said central control unit, and further for supplying said machine control unit with the data transmitted from said central control unit, said data transmission controller comprising:
means for collecting the data related to the operation conditions of the machine at regular time intervals;
a memory for storing the data collected by said collecting means;
means for detecting whether data indicting occurrence of a trouble condition is included in the collected data from the machine control unit;
means for transmitting the data indicating the occurrence of the trouble condition and the data related to the trouble condition by calling said central control unit when the data indicating the occurrence of the trouble condition is included in the collected data from the machine control unit;
means for irregularly collecting the data related to the machine operating conditions from said machine control unit irrespective of the regular data collection time from the machine control unit when the transmission demanding instruction is transmitted; and
means for transmitting the irregularly collected data from the machine control unit to the central control unit.

3. The system as set forth in claim 2, wherein said machine control unit comprises:

a memory for storing the data related to the operation of the machine; and
means for erasing the already collected data in said memory after the data transmission controller collects the data.

4. The system as set forth in claim 3, wherein said central control unit comprises means for displaying the data indicating the occurrence of the trouble condition and the data related to the trouble condition.

5. The system as set forth in claim 4, wherein said machine is a laundry machine.

6. The system as set forth in claim 2, wherein said central control unit comprising means for displaying the data indicating the occurrence of the trouble condition and the data related to the trouble.

7. The system as set forth in claim 2, wherein said machine is a laundry machine.

8. The system as set forth in claim 1, wherein said machine is a laundry machine.

9. The system as set forth in claim 1, wherein said specified group of machines is classified by machine type, and said inputting means of the central control unit includes means for further inputting data to specify the machine type of the specified group to be updated.

10. The system as set forth in claim 9, wherein said machine is a laundry machine.

11. The system as set forth in claim 1, wherein said specified group of machines is classified by a site where the machines are installed, and said inputting means of the central control unit includes means for further inputting data to specify the site at which the machines of the specified group to be updated are installed.

12. A remote management system with a machine control unit which comprises a microcomputer having an I/O port, and which stores previously set operational condition data for operation of a machine in a write permit memory, and detects a state of each of plural parts of the machine by a plurality of sensors, respectively, thereby to control the operation of the machine based on the operational condition data stored in said memory and the detected values inputted from said sensors, said machine control unit being connected by communication means with a central control unit to manage the machine by remote control, said central control unit comprising:
means for inputting an instruction to transmit via said communication means an output level of the operational condition data outputted from the machine control unit to each part of the machine and an input level of the detected values inputted from said sensors to the machine control unit;
means for transmitting an instruction to the machine control unit to transmit the input and output levels therefrom;
a memory for storing the input and output levels associated with said microcomputer I/O port when each part of the machine performs normal operation;
means for comparing the input and output levels associated with said microcomputer I/O port of the machine parts normal operation stored in said memory with the input and output levels associated with said microcomputer I/O port which are transmitted from the machine control unit;
means for specifying a machine part with a trouble condition when the comparison result disagrees, based on the different phase portion of the input and output levels from the levels of normal operation; and means for informing a remote location of the machine part with a trouble condition as specified by said specifying means;

said machine control unit comprising:

means for transmitting the output level of the operational condition data for each part of the machine and the input level of the detected values from said sensors to the central control unit via said communication means.

13. The system as set forth in claim 12, wherein said machine is a laundry machine.

14. A remote management system with a machine control unit which stores previously set operational condition data for operation of a machine in a write permit memory, and detects a state of each of plural parts of the machine by a plurality of sensors, respectively, thereby to control the operation of the machine based on the operational condition data stored in said memory and the detected values inputted from said sensors, but stops the operation of the machine upon detecting occurrence of a trouble condition according to the values detected by said sensors, and calls to inform a central control unit for managing the machine by remote control of the occurrence of the trouble condition, said central control unit being connected by communication means with the machine control unit, said machine control unit comprising:

a memory for storing data which indicates occurrence of a trouble condition; and means for storing the data which indicates the occurrence of the trouble condition in said memory when detecting the occurrence of the trouble condition;

said central control unit comprising:

means for inputting an instruction to the machine control unit to transmit therefrom the data related to the trouble condition that has occurred, and for inputting an instruction to erase the data which indicates the occurrence of the trouble condition stored in said memory; and means for transmitting, to the machine control unit, the transmission instruction of the data related to the trouble condition, and erasing instruction of the trouble condition data;

a memory for storing the type of trouble condition for which the operation of the machine is allowed to be restarted immediately even when said machine control unit detects the occurrence of the trouble condition based on the detected value of the sensors;

means for comparing the type of trouble condition for which the erasing instruction is inputted from said inputting means with the type of trouble condition stored in said memory;

means for immediately transmitting said erasing instruction to the machine control unit when the comparison result agrees;

means for demanding outward to confirm whether to transmit said erasing instruction to the machine control unit when the comparison result disagrees;

means for inputting an instruction to confirm the transmission of said erasing instruction to the machine control unit when said demanding means demands to confirm whether to transmit said erasing instruction to the machine control unit; and means for transmitting said erasing instruction to the machine control unit on receipt of said confirming instruction by said inputting means, said machine control unit, further comprising:

means for collecting and transmitting the data related to the trouble condition that has occurred to the central control unit responsive to the transmission instruction transmitted from the central control unit; and means for erasing the data which indicates the trouble condition occurrence stored in said memory responsive to the erasing instruction transmitted from the central control unit, wherein said memory of the machine control unit is a memory for storing the data which indicates the occurrence of the trouble condition by the type of trouble, said storing means of the machine control unit includes means for storing the data which indicates the occurrence of the trouble condition and discriminating the type of the trouble upon the occurrence of the trouble condition being detected in an area assigned to the trouble type discriminated, said transmitting means of the machine control unit includes means for collecting and transmitting the type of the trouble condition occurring except for data related to the occurrence of a trouble condition responsive to the transmission instruction of the trouble condition related data transmitted from the central control unit, and said erasing means for the machine control unit includes means for erasing the trouble condition of the type corresponding to the erasing instruction.

15. The system as set forth in claim 14, wherein said machine control unit further comprises means for restarting the operation of the machine responsive to the erasing of the data which indicates the occurrence of the trouble condition.

16. The system as set forth in claim 15, wherein said central control unit further comprising means for displaying the trouble condition related data transmitted from the machine control unit.

17. The system as set forth in claim 16, wherein said means for storing or erasing said data which indicates the occurrence of the trouble condition comprises means for setting or resetting a flag.

18. The system as set forth in claim 17, wherein said machine is a laundry machine.

19. The system as set forth in claim 14, wherein said central control unit further comprises means for displaying the trouble condition related data transmitted from the machine control unit.

20. The system as set forth in claim 14, wherein said means for storing or erasing said data which indicates the occurrence of the trouble condition includes means for setting or resetting a flag.

21. The system as set forth in claim 14, wherein said machine is a laundry machine.

22. The system as set forth in claim 11, wherein said machine is a laundry machine.

* * * * *